United States Patent
Kim et al.

(10) Patent No.: US 12,407,378 B2
(45) Date of Patent: Sep. 2, 2025

(54) ELECTRONIC DEVICE HAVING ANTENNA MODULE

(71) Applicant: LG ELECTRONICS INC., Seoul (KR)

(72) Inventors: Uisheon Kim, Seoul (KR); Ilnam Cho, Seoul (KR); Kangjae Jung, Seoul (KR); Kukheon Choi, Seoul (KR); Byeongyong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 413 days.

(21) Appl. No.: 18/018,025

(22) PCT Filed: Sep. 7, 2020

(86) PCT No.: PCT/KR2020/012006
§ 371 (c)(1),
(2) Date: Jan. 25, 2023

(87) PCT Pub. No.: WO2022/050462
PCT Pub. Date: Mar. 10, 2022

(65) Prior Publication Data
US 2023/0275625 A1 Aug. 31, 2023

(51) Int. Cl.
*H04B 1/40* (2015.01)
*H01Q 1/22* (2006.01)
(Continued)

(52) U.S. Cl.
CPC ............ *H04B 7/0413* (2013.01); *H01Q 1/22* (2013.01); *H01Q 21/06* (2013.01); *H01Q 21/24* (2013.01); *H04B 1/40* (2013.01)

(58) Field of Classification Search
CPC ...... H04B 7/0413; H04B 1/40; H04B 1/0064; H04B 1/04; H04B 1/16; H04B 7/02;
(Continued)

(56) References Cited

U.S. PATENT DOCUMENTS 6,307,510 B1 * 10/2001 Taylor ..................... H01Q 9/16
343/790
10,714,837 B1 * 7/2020 Rumsey ............... H01Q 21/064
(Continued)

FOREIGN PATENT DOCUMENTS

CN 111615821 9/2020
JP 2012191406 10/2012
(Continued)

OTHER PUBLICATIONS

The State Intellectual Property Office of the People's Republic of China Application Serial No. 202080103630.5, Office Action dated Jun. 27, 2024, 10 pages.
(Continued)

*Primary Examiner* — Andrew Wendell
(74) *Attorney, Agent, or Firm* — LEE, HONG, DEGERMAN, KANG & WAIMEY

(57) ABSTRACT

An electronic device having an antenna, according to one embodiment, is provided. An antenna module of the electronic device is arranged on a side surface or at a display of the electronic device and can be configured to radiate a specific-directional polarized signal in the front or side direction of the electronic device. The antenna module comprises: a first array antenna arranged in a first region of a flexible substrate to radiate a signal of a millimeter wave band, and configured to form a beam in a first direction; and a second array antenna arranged in a second region adjacent to the first region, and configured to form a beam in a second direction, wherein the first region of the flexible substrate can be formed to be bent at a predetermined angle with respect to the second region.

18 Claims, 32 Drawing Sheets

(51) Int. Cl.
  *H01Q 21/06* (2006.01)
  *H01Q 21/24* (2006.01)
  *H04B 7/02* (2018.01)
  *H04B 7/0413* (2017.01)

(58) Field of Classification Search
  CPC ........ H04B 7/0404; H01Q 1/22; H01Q 21/06;
       H01Q 21/24; H01Q 1/2266; H01Q 1/243;
       H01Q 13/085; H01Q 19/10; H01Q 19/22;
       H01Q 21/08; H01Q 13/10; H01Q 1/24;
       H01Q 1/38; H01Q 21/28
  See application file for complete search history.

(56) References Cited

U.S. PATENT DOCUMENTS

| | | | | |
|---|---|---|---|---|
| 2002/0050950 | A1* | 5/2002 | Rawnick | H01Q 9/285 |
| | | | | 343/795 |
| 2017/0222325 | A1* | 8/2017 | Sudo | H01Q 9/16 |
| 2018/0188432 | A1* | 7/2018 | Choi | H10K 59/00 |
| 2019/0165454 | A1* | 5/2019 | Lee | H01Q 1/245 |
| 2019/0229413 | A1* | 7/2019 | Jong | H01Q 1/523 |
| 2019/0319341 | A1 | 10/2019 | Park et al. | |
| 2020/0021015 | A1* | 1/2020 | Yun | H01Q 1/2283 |
| 2020/0106181 | A1* | 4/2020 | Avser | H01Q 1/243 |
| 2020/0235463 | A1 | 7/2020 | Cha et al. | |
| 2020/0365973 | A1* | 11/2020 | Jeon | H01Q 21/08 |
| 2020/0381804 | A1* | 12/2020 | Park | H01Q 9/16 |
| 2021/0280964 | A1* | 9/2021 | Hong | H01Q 21/062 |
| 2021/0320395 | A1* | 10/2021 | Wang | H01Q 1/36 |
| 2021/0391641 | A1* | 12/2021 | Son | H04B 1/40 |

FOREIGN PATENT DOCUMENTS

| | | |
|---|---|---|
| JP | 2018067881 | 4/2018 |
| KR | 1020080018059 | 2/2008 |
| KR | 1020130122688 | 11/2013 |
| KR | 102060733 | 12/2019 |
| WO | 2019103398 | 5/2019 |

OTHER PUBLICATIONS

PCT International Application No. PCT/KR2020/012006, International Search Report dated Jun. 7, 2021, 4 pages.

* cited by examiner (a)

(b)

(a)

(b)

FRONT VIEW (a)

SIDE VIEW (b)

(a)

(b) (c)

(a)

(b)

(a)

(b)

(c)

(d)

(e)

(f)

(a)

(b)

(a)

(b)

(a)

(b)

(a)

(b)

(a)

(b)

ELECTRONIC DEVICE HAVING ANTENNA MODULE

CROSS-REFERENCE TO RELATED APPLICATIONS

This application is the National Stage filing under 35 U.S.C. 371 of International Application No. PCT/KR2020/012006, filed on Sep. 7, 2020, the contents of which are all incorporated by reference herein in their entirety.

TECHNICAL FIELD

The present disclosure relates to electronic device having antennas. A particular implementation relates to an electronic device including an antenna module to transmit or receive data to/from a peripheral device.

BACKGROUND ART

Electronic devices may be classified into mobile/portable terminals and stationary terminals according to mobility. Also, electronic devices may be classified into handheld types and vehicle mount types according to whether or not a user can directly carry.

Functions of electronic devices are diversified. Examples of such functions include data and voice communications, capturing images and video via a camera, recording audio, playing music files via a speaker system, and displaying images and video on a display. Some electronic devices include additional functionality which supports electronic game playing, while other terminals are configured as multimedia players. Specifically, in recent time, mobile terminals can receive broadcast and multicast signals to allow viewing of video or television programs.

As it becomes multifunctional, an electronic device can be allowed to capture still images or moving images, play music or video files, play games, receive broadcast and the like, so as to be implemented as an integrated multimedia player.

Efforts are ongoing to support and increase the functionality of electronic devices. Such efforts include software and hardware improvements, as well as changes and improvements in the structural components.

As an example of the electronic devices, an image display device has a function of receiving and processing a broadcast image viewable to a user. The image display apparatus displays, for example, a broadcast signal selected by a user, among broadcast signals transmitted from a broadcasting station.

Data needs to be transmitted or received between the electronic devices using a communication service therebetween in a mmWave band. In relation to this, a wireless audio-video (AV) service may be provided using a 5G communication service.

The 5G technology is the means for providing streams rated at hundreds of megabits per second to gigabits per second to compensate for a fiber-to-the home (FTTH) and a cable-based broadband (or a data over cable service interface specification (DOCSIS)). Such a high speed may be required to transmit an image with a resolution of 4K or higher (6K, 8K, or higher), as well as an image in virtual reality (VR) or augmented reality (AR) applications. VR and AR applications mostly include immersive sport games. Particular applications may require special network settings. For example, in a case of an VR game, a game company may need to integrate a core server with an edge network server of a network operator to minimize latency.

As described above, there is a problem in that there is no specific solution for an antenna and a radio frequency integrated chip (RFIC) that provide a wireless interface in an electronic device such as an image display device in order to transmit an image with a resolution of 4K or higher. In particular, in consideration of a situation in which an electronic device such as an image display device is arranged on a wall of a building or on a table, wireless AV data may need to be transmitted or received to/from another electronic device. To do so, it is needed to present a specific configuration of an area in which the antenna and the RFIC are to be arranged in the image display device, and an antenna structure.

DISCLOSURE OF INVENTION

Technical Problem

The present disclosure is directed to solving the aforementioned problems and other drawbacks. Another aspect of the present disclosure is to provide a configuration of an antenna configured to provide a wireless audio-video (AV) service to an electronic device, and an electronic device including the antenna.

Another aspect of the present disclosure is to provide an array antenna module capable of implementing antenna directivity in various directions to enhance transmitting and receiving coverage in consideration of characteristics of a millimeter wave band having strong linearity.

Another aspect of the present disclosure is to provide an ultra-thin low-profile antenna structure free from space and design restraints of an equipped device.

Another aspect of the present disclosure is to provide an orthogonally polarized (vertical/horizontal) MIMO antenna having a broadband antenna technology for large-capacity data transmission and configured to increase throughput.

Another aspect of the present disclosure is to provide an antenna module having vertical/horizontal/vertical and horizontal polarization and various radiation directions by using an RF module including an RFIC in common and replacing only an antenna and a feeding line.

Solution to Problem

To achieve the above or other aspects, an electronic device having an antenna according to one embodiment is provided. An antenna module of the electronic device may be arranged on a side surface or at a display of the electronic device and may be configured to radiate a specific-directional polarized signal in a front or side direction of the electronic device. The antenna module may include: a first array antenna arranged in a first region of a flexible substrate to radiate a signal of a millimeter wave band, and configured to form a beam in a first direction; and a second array antenna arranged in a second region adjacent to the first region, and configured to form a beam in a second direction, wherein the first region of the flexible substrate may be formed to be bent at a predetermined angle with respect to the second region.

According to one embodiment, the electronic device may include a display provided on a front surface of the electronic device and configured to display information on a screen; and an antenna module arranged on a side surface or the display of the electronic device and configured to radiate a specific-directional polarized signal in a front or side direction of the electronic device.

According to one embodiment, an antenna element of the first array antenna and an antenna element of the second array antenna may be end-fire radiating elements configured to provide an antenna beam in a direction parallel to the flexible substrate. and the first array antenna and the second array antenna may operate in horizontal polarization.

According to one embodiment, a first feeding portion arranged in the first region may be arranged in a bended region bended at a predetermined angle, the first array antenna arranged in the first region may provide a beam in a front direction, a second feeding portion arranged in the second region may be connected to the second array antenna arranged in the second region, and the second array antenna may provide a beam in a lower direction.

According to one embodiment, an antenna element of the first array antenna and an antenna element of the second array antenna may be slot radiating elements configured to provide an antenna beam in a direction vertical to the flexible substrate. and the first array antenna and the second array antenna may operate in vertical polarization.

According to one embodiment, a first feeding portion arranged in the first region may be arranged in a bended region bended at a predetermined angle, the first array antenna arranged in the first region may provide a beam in a front direction, a second feeding portion arranged in the second region may be connected to the second array antenna arranged in the second region, and the second array antenna may provide a beam in a lower direction.

According to one embodiment, the first feeding portion arranged in the first region may be arranged in a bended region bended twice substantially at 90 degrees, and the second feeding portion arranged in the second region may be arranged in a bended region bended substantially at 90 degrees.

According to one embodiment, an antenna element of the first array antenna and an antenna element of the second array antenna may be an end-fire radiating element and a slot radiating element, respectively, and the first array antenna and the second array antenna may operate in horizontal polarization and vertical polarization, respectively.

According to one embodiment, a third array antenna arranged adjacent to the first array antenna and a fourth array antenna arranged adjacent to the second array antenna may be further included. The third array antenna and the fourth array antenna may be an end-fire radiating element and a slot radiating element, respectively, and the third array antenna and the fourth array antenna may operate in horizontal polarization and vertical polarization, respectively.

According to one embodiment, the first array antenna and the second array antenna may provide a beam in a front direction. and the third array antenna and the fourth array antenna may radiate a beam in a lower direction.

According to one embodiment, the first array antenna and the fourth array antenna may be arranged in a bended region bended substantially at 90 degrees, and the second array antenna may be arranged in a region bended substantially at 90 degrees further with respect to the bended region in which the first array antenna is arranged.

According to one embodiment, the electronic device may include a transceiver circuit operably coupled to the first array antenna and the second array antenna through a first feeding portion and a second feeding portion, respectively; and a processor coupled to be operable with the transceiver circuit and configured to control the transceiver circuit.

According to one embodiment, when the first array antenna and the second array antenna generate different polarized signals, the processor controls the transceiver circuit to perform multiple-input-multiple-output (MIMO) through the first array antenna and the second array antenna.

According to one embodiment, the electronic device may include a transceiver circuit operably coupled to the first array antenna to the fourth array antenna; and a processor coupled to be operable with the transceiver circuit and configured to control the transceiver circuit, According to one embodiment, the processor may control the transceiver circuit to transmit or receive a signal through the second array antenna or the fourth array antenna while transmitting or receiving a signal through the first array antenna or the third array antenna.

According to one embodiment, the first array antenna and the second array antenna are both arranged on a front surface of the flexible substrate and provide a first beam and a second beam having horizontal polarization, respectively, and the processor may control the transceiver circuit to transmit a signal through one of the first array antenna and the second array antenna and receive a signal through another of the first array antenna and the second array antenna.

According to one embodiment, the electronic device may further include the third array antenna and the fourth array antenna arranged on a side surface of the flexible substrate, and configured to provide a third beam and a fourth beam having vertical polarization, respectively. The processor may control the transceiver circuit to perform MIMO through one of the first array antenna and the second array antenna and one of the third array antenna and the fourth array antenna.

According to one embodiment, the electronic device may be a mobile terminal, a signage, a display device, a transparent augmented reality (AR)/virtual reality (VR) device, a vehicle, or wireless audio/video apparatus, and a plurality of different array antennas constituting the antenna module may be arranged in a lower region or a side surface region of the electronic device.

An antenna module implemented as a multilayer substrate according to another aspect of the present disclosure may be provided. The antenna module may include: a first array antenna arranged in a first region of a flexible substrate to radiate a signal of a millimeter wave band, and configured to form a beam in a first direction; a second array antenna arranged in a second region adjacent to the first region, and configured to provide a beam in a second direction; and a transceiver circuit operably coupled to the first array antenna and the second array antenna through a first feeding portion and a second feeding portion, respectively, wherein the first region of the flexible substrate may be provided to be bended at a predetermined angle with respect to the second region.

According to one embodiment, an antenna element of the first array antenna and an antenna element of the second array antenna may be end-fire radiating elements configured to provide an antenna beam in a direction parallel to the flexible substrate. The first array antenna and the second array antennas may operate in horizontal polarization, and the transceiver circuit may transmit a signal through one of the first array antenna and the second array antenna and receive a signal through another of the first array antenna and the second array antenna.

According to one embodiment, an antenna element of the first array antenna and an antenna element of the second array antenna may be slot array antennas configured to provide a beam in a direction vertical to the flexible substrate. The first array antenna and the second array antennas may operate in vertical polarization, and the transceiver circuit may transmit a signal through one of the first array antenna and the second array antenna and receive a signal through another of the first array antenna and the second array antenna.

According to one embodiment, an antenna element of the first array antenna and an antenna element of the second array antenna may be an end-fire radiating element and a slot radiating element, respectively. The first array antenna and the second array antenna may operate in horizontal polarization and vertical polarization, respectively, and the transceiver circuit may perform multiple-input-multiple-output (MIMO) through the first array antenna and the second array antenna.

According to one embodiment, the antenna may a module further include a third array antenna arranged adjacent to the first array antenna and a fourth array antenna arranged adjacent to the second array antenna. The third array antenna and the fourth array antenna may be an end-fire radiating element and a slot radiating element, respectively, and operate in horizontal polarization and vertical polarization, respectively, and the transceiver circuit may perform MIMO with a first device through the first array antenna and the second array antenna, and perform MIMO with a second device through the third array antenna and the fourth array antenna.

Advantageous Effects of Invention

Hereinafter, a technical effect of the array antenna and the electronic device including the same will be described.

According to one embodiment, a configuration of a slot array antenna configured to provide wireless AV service to an electronic device, and an electronic device including the slot array antenna are provided.

According to one embodiment, an antenna module operating in a mmWave band may be implemented on a low-loss flexible substrate.

According to one embodiment, an antenna module operating in a mmWave band may be arranged on a non-conductive material surface of an electronic device.

According to one embodiment, antennas may be arranged on different bent surfaces of a substrate to implement antenna directivity toward front, rear, and side surfaces, According to one embodiment, an antenna module may be expanded to an antenna module having vertical/horizontal single polarization or vertical and horizontal dual polarization according to arrangement of antennas.

According to one embodiment, array antennas having different polarizations may be arranged to transmit or receive large-capacity data at a high speed, and thus, dual connection and/or MIMO may be provided.

Further scope of applicability of the present disclosure will become apparent from the following detailed description. It should be understood, however, that the detailed description and specific examples, such as the preferred embodiment of the present disclosure, are given by way of illustration only, since various modifications and alternations within the spirit and scope of the disclosure will be apparent to those skilled in the art.

MODE FOR THE INVENTION

Figure 1:
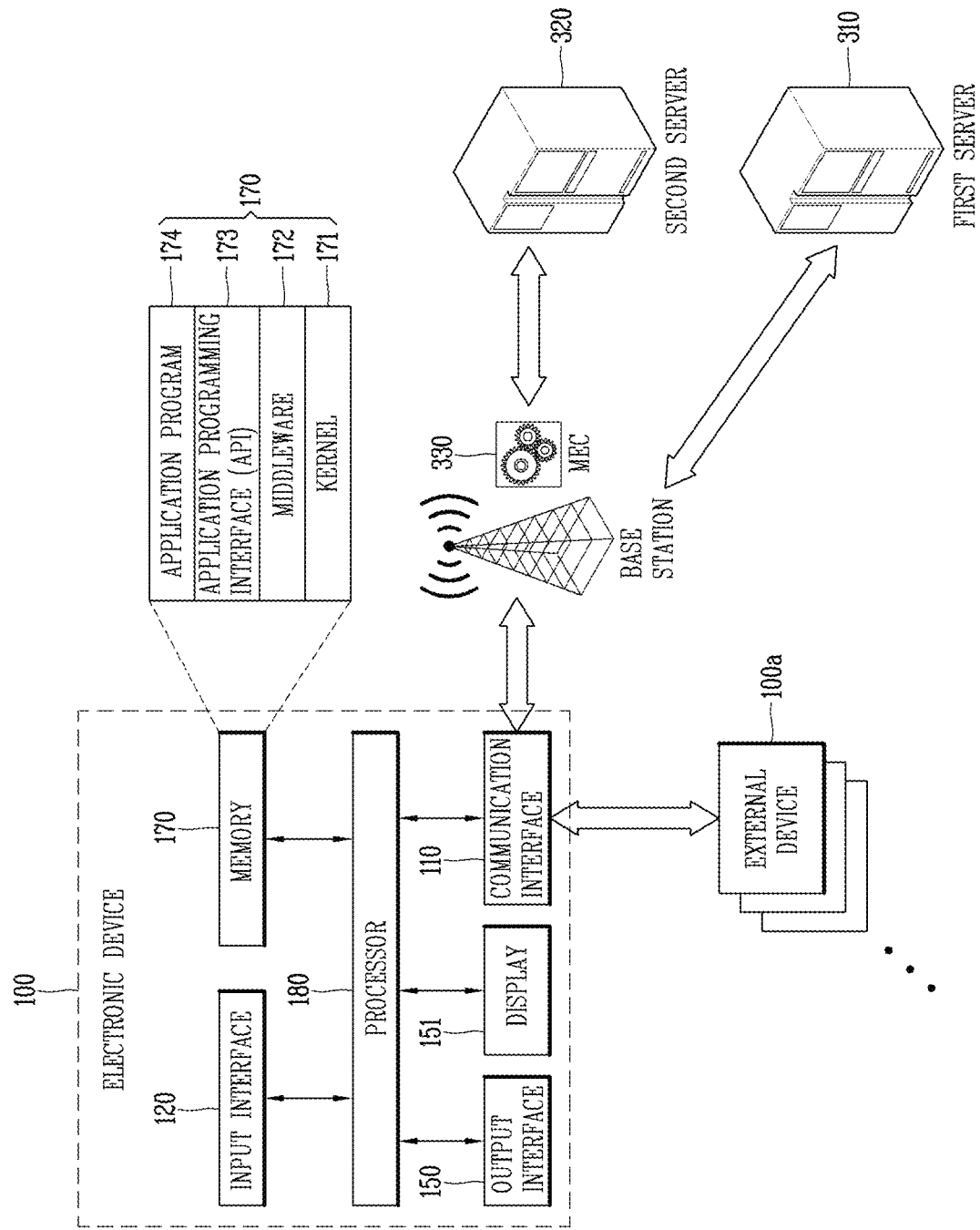
FIG. 1 is a view illustrating a configuration for describing an electronic device in accordance with one embodiment, and an interface between the electronic device and an external device or a server.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signages, and the like.

Figure 2A:
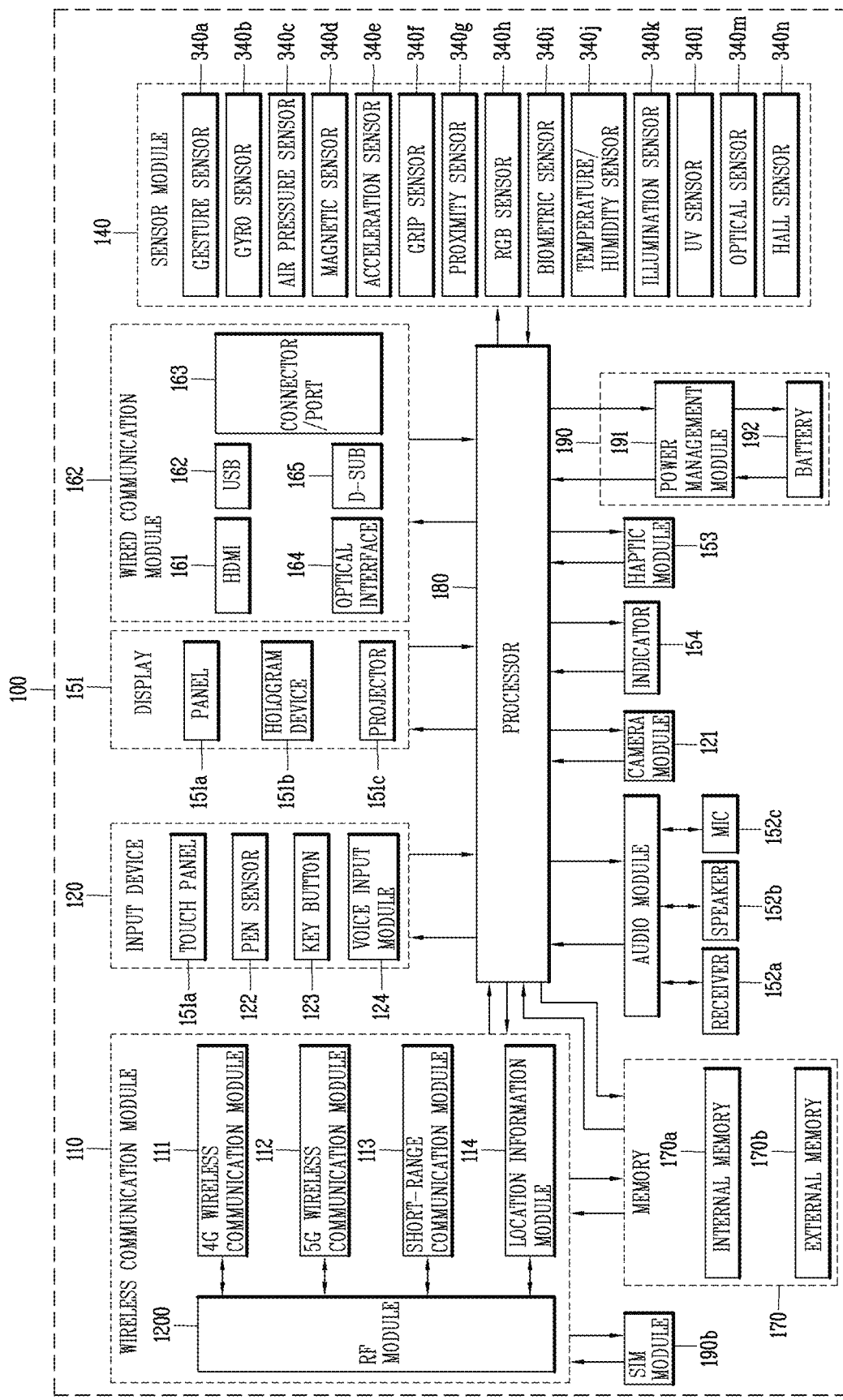
FIG. 2A is a view illustrating a detailed configuration of the electronic device of FIG. 1.

FIG. 1 is a view illustrating a configuration for describing an electronic device in accordance with one embodiment, and an interface between the electronic device and an external device or server. FIG. 2A is a view illustrating a detailed configuration of the electronic device of FIG. 1.

Referring to FIG. 1, the electronic device 100 may include a communication interface 110, an input interface (or input device) 120, an output interface (or output device) 150, and a processor 180. Here, the communication interface 110 may refer to the wireless communication module 110. The electronic device 100 may further include a display 151 and a memory 170. It is understood that implementing all of the illustrated components illustrated in FIG. 1 is not a requirement, and that greater or fewer components may alternatively be implemented.

In more detail, among others, the wireless communication module 110 may typically include one or more modules which permit communications such as wireless communications between the electronic device 100 and a wireless communication system, communications between the electronic device 100 and another electronic device, or communications between the electronic device 100 and an external server. Further, the wireless communication module 110 may typically include one or more modules which connect the electronic device 100 to one or more networks. Here, the one or more networks may be, for example, a 4G communication network and a 5G communication network.

Referring to FIGS. 1 and 2A, the wireless communication module 110 may include at least one of a 4G wireless communication module 111, a 5G wireless communication module 112, a short-range communication module 113, and a location information module 114. The 4G wireless communication module 111, the 5G wireless communication module 112, the short-range communication module 113, and the location information module 114 may be implemented as a baseband processor such as a modem. In one example, the 4G wireless communication module 111, the 5G wireless communication module 112, the short-range communication module 113, and the location information module 114 may be implemented as a transceiver circuit operating in an IF band and a baseband processor. The RF module 1200 may be implemented as an RF transceiver circuit operating in an RF frequency band of each communication system. However, the present disclosure may not be limited thereto. Each of the 4G wireless communication module 111, the 5G wireless communication module 112, the short-range communication module 113, and the location information module 114 may include an RF module.

The 4G wireless communication module 111 may perform transmission and reception of 4G signals with a 4G base station through a 4G mobile communication network. In this case, the 4G wireless communication module 111 may transmit at least one 4G transmission signal to the 4G base station. In addition, the 4G wireless communication module 111 may receive at least one 4G reception signal from the 4G base station. In this regard, Uplink (UL) Multi-input and Multi-output (MIMO) may be performed by a plurality of 4G transmission signals transmitted to the 4G base station. In addition, Downlink (DL) MIMO may be performed by a plurality of 4G reception signals received from the 4G base station.

The 5G wireless communication module 112 may perform transmission and reception of 5G signals with a 5G base station through a 5G mobile communication network.

Here, the 4G base station and the 5G base station may have a Non-Stand-Alone (NSA) structure. For example, the 4G base station and the 5G base station may be a co-located structure in which the stations are disposed at the same location in a cell. Alternatively, the 5G base station may be disposed in a Stand-Alone (SA) structure at a separate location from the 4G base station.

The 5G wireless communication module 112 may perform transmission and reception of 5G signals with a 5G base station through a 5G mobile communication network. In this case, the 5G wireless communication module 112 may transmit at least one 5G transmission signal to the 5G base station. In addition, the 5G wireless communication module 112 may receive at least one 5G reception signal from the 5G base station.

In this instance, 5G and 4G networks may use the same frequency band, and this may be referred to as LTE re-farming. In some examples, a Sub 6 frequency band, which is a range of 6 GHz or less, may be used as the 5G frequency band.

On the other hand, a millimeter-wave (mmWave) range may be used as the 5G frequency band to perform wideband high-speed communication. When the mmWave band is used, the electronic device 100 may perform beamforming for communication coverage expansion with a base station.

On the other hand, regardless of the 5G frequency band, 5G communication systems can support a larger number of multi-input multi-output (MIMO) to improve a transmission rate. In this instance, UL MIMO may be performed by a plurality of 5G transmission signals transmitted to a 5G base station. In addition, DL MIMO may be performed by a plurality of 5G reception signals received from the 5G base station.

On the other hand, the wireless communication module 110 may be in a Dual Connectivity (DC) state with the 4G base station and the 5G base station through the 4G wireless communication module 111 and the 5G wireless communication module 112. As such, the dual connectivity to the 4G base station and the 5G base station may be referred to as EUTRAN NR DC (EN-DC). Here, EUTRAN is an abbreviated form of "Evolved Universal Telecommunication Radio Access Network", and refers to a 4G wireless communication system. Also, NR is an abbreviated form of "New Radio" and refers to a 5G wireless communication system.

When the 4G base station and 5G base station are disposed in a co-located structure, throughput improvement can be achieved by inter-Carrier Aggregation (inter-CA). Accordingly, when the 4G base station and the 5G base station are disposed in the EN-DC state, the 4G reception signal and the 5G reception signal may be simultaneously received through the 4G wireless communication module 111 and the 5G wireless communication module 112, respectively.

The short-range communication module 113 is configured to facilitate short-range communications. Suitable technologies for implementing such short-range communications include Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the electronic device 100 and a wireless communication system, communications between the electronic device 100 and another electronic device, or communications between the electronic device and a network where another electronic device (or an external server) is located, via wireless area network. One example of the wireless area networks is a wireless personal area network.

Short-range communication between electronic devices may be performed using the 4G wireless communication module 111 and the 5G wireless communication module 112. In one embodiment, short-range communication may be performed between electronic devices in a device-to-device (D2D) manner without passing through base stations.

Meanwhile, for transmission rate improvement and communication system convergence, Carrier Aggregation (CA) may be carried out using at least one of the 4G wireless communication module 111 and the 5G wireless communication module 112 and a WiFi communication module. In this regard, 4G+WiFi CA may be performed using the 4G wireless communication module 111 and the Wi-Fi communication module 113. Or, 5G+WiFi CA may be performed using the 5G wireless communication module 112 and the Wi-Fi communication module 113.

The location information module 114 may be generally configured to detect, calculate, derive or otherwise identify a position (or current position) of the electronic device. As an example, the location information module 115 includes a Global Position System (GPS) module, a Wi-Fi module, or both. For example, when the electronic device uses a GPS module, a position of the electronic device may be acquired using a signal sent from a GPS satellite. As another example, when the electronic device uses the Wi-Fi module, a position of the electronic device can be acquired based on information related to a wireless Access Point (AP) which transmits or receives a wireless signal to or from the Wi-Fi module. If desired, the location information module 114 may alternatively or additionally function with any of the other modules of the wireless communication module 110 to obtain data related to the position of the electronic device. The location information module 114 is a module used for acquiring the position (or the current position) and may not be limited to a module for directly calculating or acquiring the position of the electronic device.

Specifically, when the electronic device utilizes the 5G wireless communication module, the position of the electronic device may be acquired based on information related to the 5G base station which performs radio signal transmission or reception with the 5G wireless communication module. In particular, since the 5G base station of the mmWave band is deployed in a small cell having a narrow coverage, it is advantageous to acquire the position of the electronic device.

The input device 120 may include a pen sensor 1200, a key button 123, a voice input module 124, a touch panel 151a, and the like. The input device 120 may include a camera module 121 or an image input unit for obtaining images or video, a microphone 152c or an audio input unit for inputting an audio signal, and a user input unit 123 (for example, a touch key, a mechanical key, and the like) for allowing a user to input information. Data (for example, audio, video, image, and the like) may be obtained by the input device 120 and may be analyzed and processed according to user commands.

The camera module 121 is a device capable of capturing still images and moving images. According to one embodiment, the camera module 121 may include one or more image sensors (e.g., a front sensor or a rear sensor), a lens, an image signal processor (ISP), or a flash (e.g., LED or lamp).

The sensor module 140 may typically be implemented using one or more sensors configured to sense internal information of the electronic device, the surrounding environment of the electronic device, user information, and the like. For example, the sensor module 140 includes at least one of a gesture sensor 340a, a gyro sensor 340b, an air pressure sensor 340c, a magnetic sensor 340d, an acceleration sensor 340e, a grip sensor 340f, and a proximity sensor 340g, a color sensor 340h (e.g., RGB (red, green, blue) sensor), a bio-sensor 340i, a temperature/humidity sensor 340j, an illuminance sensor 340k, an ultra violet (UV) sensor 340l, a light sensor 340m, and a hall sensor 340n. The sensor module 140 may also include at least one of a finger scan sensor, an ultrasonic sensor, an optical sensor (for example, camera 121), a microphone (see 152c), a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The electronic device disclosed herein may be configured to utilize information obtained from one or more sensors, and combinations thereof.

The output interface 150 may typically be configured to output various types of information, such as audio, video, tactile output, and the like. The output interface 150 may be shown having at least one of a display 151, an audio module 152, a haptic module 153, and an indicator 154.

The display 151 may have an inter-layered structure or an integrated structure with a touch sensor in order to implement a touch screen. The touch screen may function as the user input unit 123 which provides an input interface between the electronic device 100 and the user and simultaneously provide an output interface between the electronic device 100 and a user. For example, the display 151 may include a liquid crystal display (LCD), a light emitting diode (LED) display, an organic light emitting diode (OLED) display, a micro electromechanical systems (MEMS) display, or an electronic paper. For example, the display 151 may display various contents (e.g., text, images, videos, icons, and/or symbols, etc.). The display 151 may include a touch screen, and may receive, for example, a touch, gesture, proximity, or hovering input using an electronic pen or a part of the user's body.

Meanwhile, the display 151 may include a touch panel 151a, a hologram device 151b, a projector 151c, and/or a control circuit for controlling them. In this regard, the panel may be implemented to be flexible, transparent, or wearable. The panel may include the touch panel 151a and one or more modules. The hologram device 151b may display a stereoscopic image in the air by using light interference. The projector 151c may display an image by projecting light onto a screen. The screen may be located inside or outside the electronic device 100, for example.

The audio module 152 may interwork with the receiver 152a, the speaker 152b, and the microphone 152c. Meanwhile, the haptic module 153 may convert an electrical signal into a mechanical vibration, and generate a vibration or a haptic effect (e.g., pressure, texture). The electronic device may include a mobile TV supporting device (e.g., a GPU) that may process media data as per, e.g., digital multimedia broadcasting (DMB), digital video broadcasting (DVB), or mediaFlo™ standards. The indicator 154 may indicate a particular state of the electronic device 100 or a part (e.g., the processor 310) of the electronic device, including, e.g., a booting state, a message state, or a recharging state.

The wired communication module 160 which may be implemented as an interface unit may serve as a passage with various types of external devices connected to the electronic device 100. The wired communication module 160 may include an HDMI 162, a USB 162, a connector/port 163, an optical interface 164, or a D-subminiature (D-sub) 165. can do. The wired communication module 160, for example, may include any of wired or wireless ports, external power supply ports, wired or wireless data ports, memory card ports, ports for connecting a device having an identification module, audio input/output (I/O) ports, video I/O ports, earphone ports, and the like. The electronic device 100 may perform assorted control functions associated with a connected external device, in response to the external device being connected to the wired communication module 160.

The memory 170 is typically implemented to store data to support various functions or features of the electronic device 100. For instance, the memory 170 may be configured to store application programs executed in the electronic device 100, data or instructions for operations of the electronic device 100, and the like. At least some of these application programs may be downloaded from an external server (e.g., a first server 310 or a second server 320) through wireless communication. Other application programs may be installed within the electronic device 100 at the time of manufacturing or shipping, which is typically the case for basic functions of the electronic device 100 (for example, receiving a call, placing a call, receiving a message, sending a message, and the like). Application programs may be stored in the memory 170, installed in the electronic device 100, and executed by the processor 180 to perform an operation (or function) for the electronic device 100.

In this regard, the first server 310 may be referred to as an authentication server, and the second server 320 may be referred to as a content server. The first server 310 and/or the second server 320 may be interfaced with the electronic device through a base station. Meanwhile, a part of the second server 320 corresponding to the content server may be implemented as a mobile edge cloud (MEC) 330 in units of base stations. This can implement a distributed network through the second server 320 implemented as the mobile edge cloud (MEC) 330, and shorten content transmission delay.

The memory 170 may include a volatile memory and/or a non-volatile memory. The memory 170 may also include an internal memory 170a and an external memory 170b. The memory 170 may store, for example, commands or data related to at least one of other components of the electronic device 100. According to one embodiment, the memory 170 may store software and/or a program 240. For example, the program 240 may include a kernel 171, middleware 172, an application programming interface (API) 173, or an application program (or "application") 174, and the like. At least some of the kernel 171, the middleware 172, and the API 174 may be referred to as an operating system (OS).

The kernel 171 may control or manage system resources (e.g., the bus, the memory 170, or the processor 180) that are used for executing operations or functions implemented in other programs (e.g., the middleware 172, the API 173, or the application program 174). In addition, the kernel 171 may provide an interface to control or manage system resources by accessing individual components of the electronic device 100 in the middleware 172, the API 173, or the application program 174.

The middleware 172 may play an intermediary so that the API 173 or the application program 174 communicates with the kernel 171 to exchange data. Also, the middleware 172 may process one or more task requests received from the application program 247 according to priorities. In one embodiment, the middleware 172 may give at least one of the application programs 174 a priority to use the system resources (e.g., the bus, the memory 170, or the processor 180) of the electronic device 100, and process one or more task requests. The API 173 is an interface for the application program 174 to control functions provided by the kernel 171 or the middleware 1723, for example, at least one for file control, window control, image processing, or text control. Interface or function, for example Command).

The processor 180 may typically function to control an overall operation of the electronic device 100, in addition to the operations associated with the application programs. The processor 180 may provide or process information or functions appropriate for a user by processing signals, data, information and the like, which are input or output by the aforementioned various components, or activating application programs stored in the memory 170. Furthermore, the processor 180 may control at least part of the components illustrated in FIGS. 1 and 2A, in order to execute the application programs stored in the memory 170. In addition, the processor 180 may control a combination of at least two of those components included in the electronic device 100 to activate the application program.

The processor 180 may include one or more of a central processing unit (CPU), an application processor (AP), an image signal processor (ISP), a communication processor (CP), and a low power processor (e.g., sensor hub). For example, the processor 180 may execute a control of at least one of other components of the electronic device 100 and/or an operation or data processing related to communication.

The power supply unit 190 may be configured to receive external power or provide internal power in order to supply appropriate power required for operating elements and components included in the electronic device 100. The power supply unit 190 may include a power management module 191 and a battery 192, and the battery 192 may be a built-in battery or a replaceable battery. The power management module 191 may include a power management integrated circuit (PMIC), a charger IC, or a battery or fuel gauge. The PMIC may employ a wired and/or wireless charging method. The wireless charging method may include, for example, a magnetic resonance method, a magnetic induction method or an electromagnetic wave method, and may further include an additional circuit for wireless charging, for example, a coil loop, a resonance circuit, or a rectifier. The battery gauge may measure, for example, a remaining battery level, and voltage, current, or temperature during charging. For example, the battery 192 may include a rechargeable cell and/or a solar cell.

Each of the external device 100a, the first server 310, and the second server 320 may be the same or different type of device (e.g., external device or server) as or from the electronic device 100. According to one embodiment, all or some of operations executed on the electronic device 100 may be executed on another or multiple other electronic devices (e.g., the external device 100a, the first server 310 and the second server 320. According to one embodiment, when the electronic device 100 should perform a specific function or service automatically or at a request, the electronic device 100 may request another device (e.g., the external device 100a, the first server 310, and the second server 320) to perform at least some functions associated therewith, instead of executing the function or service on its own or additionally. The another electronic device (e.g., the external device 100a, the first server 310, and the second server 320) may execute the requested function or additional function and transfer a result of the execution to the electronic device 100. The electronic device 100 may provide the requested function or service by processing the received result as it is or additionally. For this purpose, for example, cloud computing, distributed computing, client-server computing, or mobile edge cloud (MEC) technology may be used.

At least part of the components may cooperably operate to implement an operation, a control or a control method of an electronic device according to various embodiments disclosed herein. Also, the operation, the control or the control method of the electronic device may be implemented on the electronic device by an activation of at least one application program stored in the memory 170.

Referring to FIG. 1, a wireless communication system may include an electronic device 100, at least one external device 100a, a first server 310, and a second server 320. The electronic device 100 may be functionally connected to at least one external device 100a, and may control contents or functions of the electronic device 100 based on information received from the at least one external device 100a. According to one embodiment, the electronic device 100 may use the servers 310 and 320 to perform authentication for determining whether the at least one external device 100 includes or generates information conforming to a predetermined rule. Also, the electronic device 100 may display contents or control functions differently by controlling the electronic device 100 based on the authentication result. According to one embodiment, the electronic device 100 may be connected to at least one external device 100a through a wired or wireless communication interface to receive or transmit information. For example, the electronic device 100 and the at least one external device 100a may transmit or receive information through near field communication (NFC), a charger (e.g., universal serial bus (USB)-C), ear jack, Bluetooth (BT), wireless fidelity (WiFi), or the like.

The electronic device 100 may include at least one of an external device authentication module 100-1, a content/function/policy information DB 100-2, an external device information DB 100-3, or a content DB 104. The at least one external device 100a which is an assistant device linked with the electronic device 100, may be a device designed for various purposes, such as convenience of use, more attractive appearance, enhancement of usability, etc. of the electronic device 100. At least one external device 100a may or may not be in physical contact with the electronic device 100. According to one embodiment, the at least one external device 100a may be functionally connected to the electronic device 100 using a wired/wireless communication module to control information for controlling content or a function in the electronic device 100.

Meanwhile, the first server 310 may include a server or a cloud device for services related to the at least one external device 100a or a hub device for controlling services in a smart home environment. The first server 310 may include at least one of an external device authentication module 311, a content/function/policy information DB 312, an external device information DB 313, and an electronic device/user DB 314. The first server 310 may be referred to as an authentication management server, an authentication server, or an authentication-related server. The second server 320 may include a server or a cloud device for providing a service or content, or a hub device for providing a service in a smart home environment. The second server 320 may include at least one of a content DB 321, an external device specification information DB 322, a content/function/policy information management module 323, and a device/user authentication/management module 324. The second server 130 may be referred to as a content management server, a content server, or a content related server.

Figure 2B:
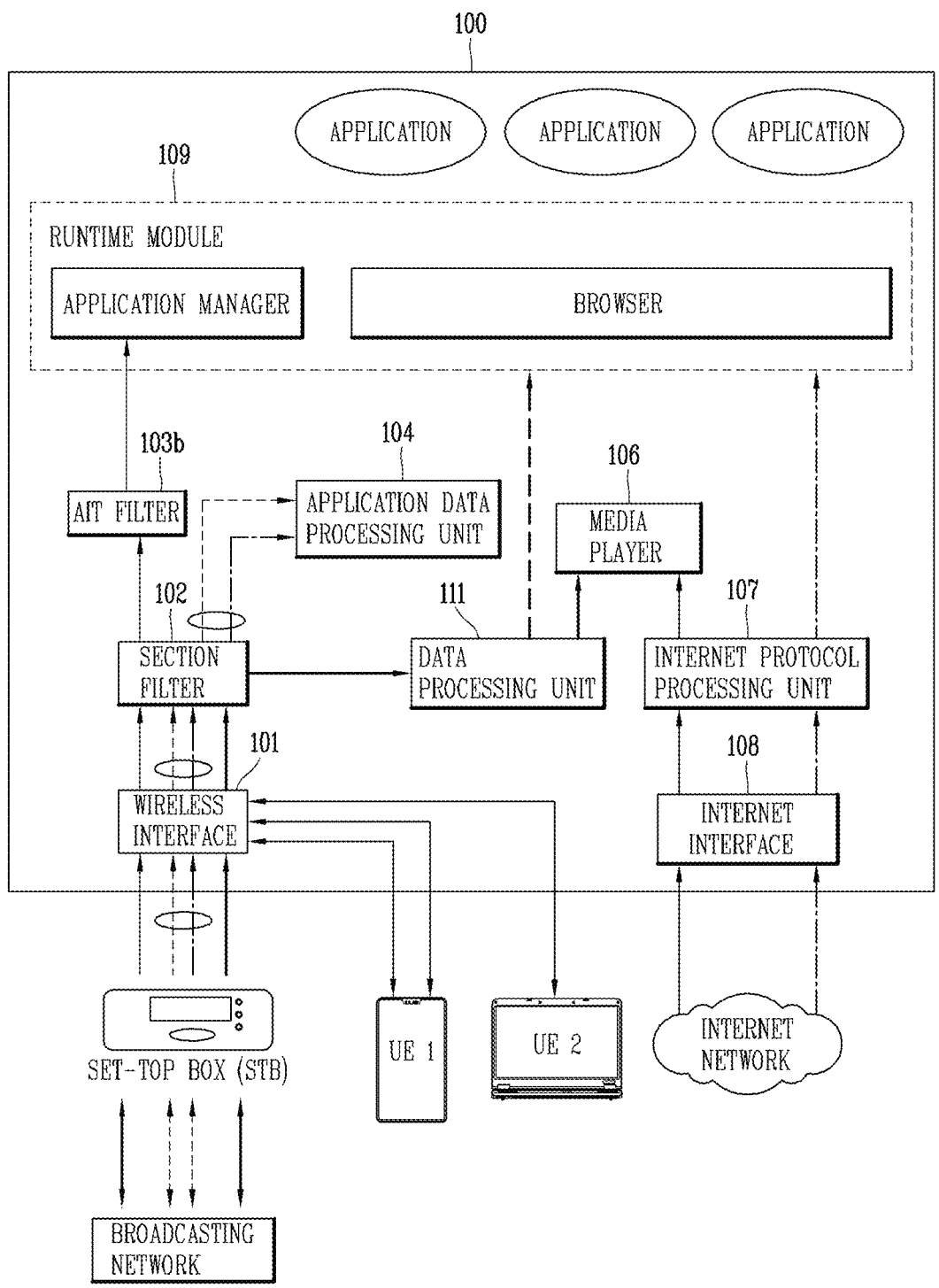
FIG. 2B is a diagram schematically illustrating an example of an entire wireless audio-video (AV) system including a video display device according to another embodiment of the present disclosure.

FIG. 2B is a diagram schematically illustrating an example of an entire wireless AV system including a video display device according to another embodiment of the present disclosure.

As illustrated in FIG. 2B, the image display device 100 according to another embodiment of the present disclosure is connected to the wireless AV system (or a broadcasting network) and an Internet network. The image display device 100 is, for example, a network TV, a smart TV, a hybrid broadcast broadband TV (HBBTV), or the like.

The image display device 100 may be wirelessly connected to the wireless AV system (or the broadcasting network) via a wireless interface, or wirelessly or wiredly connected to the Internet network via the Internet interface. In relation to this, the image display device 100 may be configured to be connected to a server or another electronic device via a 4G communication system or a 5G communication system. As an example, the image display device 100 needs to provide a 5G communication service operating in a mmWave band to transmit or receive large-capacity data at a high speed.

The image display device 100 may wirelessly transmit or receive data to/from an electronic device in a periphery of the image display device 100, e.g., a set-top box or another electronic device via a wireless interface. As an example, the image display device 100 may transmit or receive wireless AV data to/from a set-top box or another electronic device, e.g., a mobile terminal arranged in front of or below the image display device 100.

The image display device 100 includes, for example, a wireless interface 101b, a section filter 102b, an application information table (AIT) filter 103b, an application data processing unit 104b, a data processing unit 111b, a media player 106b, and an Internet protocol processing unit 107b, an Internet interface 108b, and a runtime module 109b.

AIT data, real-time broadcast content, application data, and a stream event are received through a broadcast interface, i.e., the wireless interface 101b. The real-time broadcast content may be referred to as linear audio/video (A/N) content.

The section filter 102b performs section filtering on four types of data received through the wireless interface 101b, and transmits the AIT data to the AIT filter 103b, the linear A/N content to the data processing unit 111b, and the stream events and the application data to the application data processing unit 104b.

The non-linear A/N content and the application data are received through the Internet interface 108b. The non-linear AV content may be, for example, a content on demand (COD) application.

The non-linear AV content is transmitted to the media player 106b, and the application data is transmitted to the runtime module 109b.

Further, the runtime module 109b includes, for example, an application manager and a browser as illustrated in FIG. 2B. The application manager controls a life cycle of an interactive application using, for example, the AIT data. In addition, the browser performs, for example, a function of displaying and processing the interactive application.

Hereinafter, embodiments related to an array antenna operating in an mmWave band and an electronic device including the array antenna will be described with reference to the accompanying drawings. It will be apparent to those skilled in the art that the present disclosure may be embodied in other specific forms without departing from the spirit or essential characteristics thereof.

Hereinafter, detailed operations and functions of an electronic device having a plurality of antennas according to one embodiment that includes the 4G/5G communication modules as illustrated in FIG. 2A will be discussed. In a 5G communication system according to one embodiment, a 5G frequency band may be a higher frequency band than a sub-6 band. For example, the 5G frequency band may be a millimeter wave band, but the present disclosure is not limited thereto and may be changed according to an application.

Figure 3A:
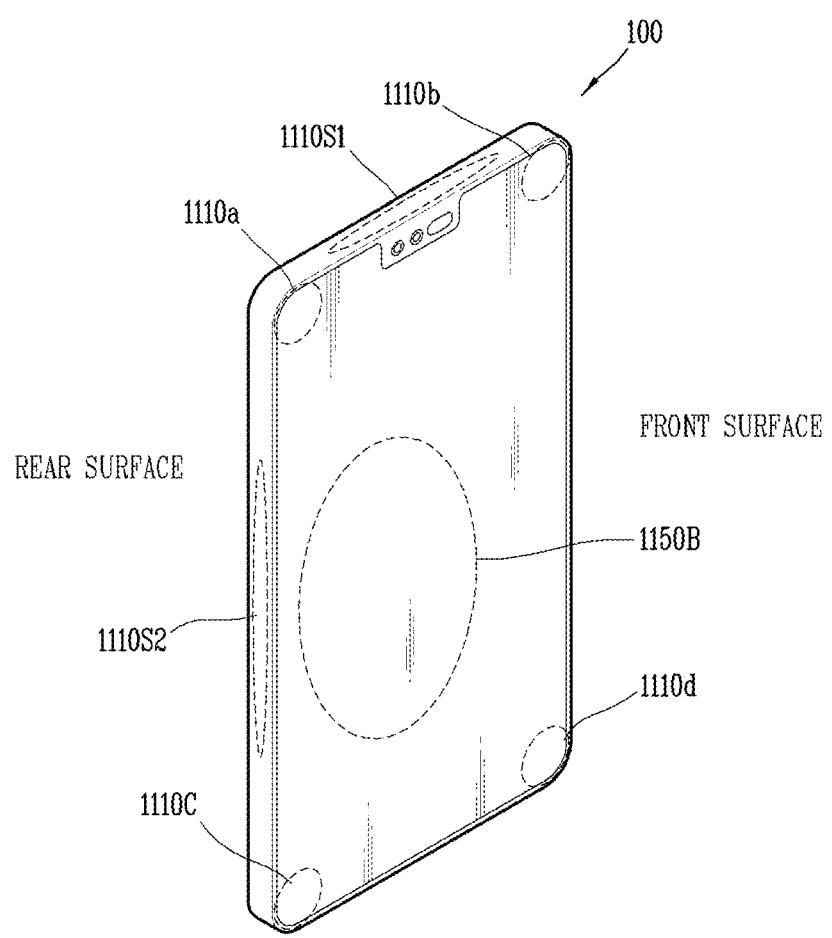
FIG. 3A illustrates an example of a configuration in which a plurality of antennas may in an electronic device according to one embodiment can be arranged.

FIG. 3A illustrates an exemplary configuration in which a plurality of antennas of the electronic device can be arranged. Referring to FIG. 3A, a plurality of antennas 1110a to 1110d may be arranged on an inner side of or a front surface of the electronic device 100. In this regard, the plurality of antennas 1110a to 1110d may be implemented in a form printed on a carrier inside the electronic device or may be implemented in a form of system-on-chip (Soc) together with an RFIC. The plurality of antennas 1110a to 1110d may be disposed on the front surface of the electronic device in addition to the inside of the electronic device. Here, the plurality of antennas 1110a to 1110d disposed on the front surface of the electronic device 100 may be implemented as transparent antennas embedded in the display.

A plurality of antennas 1110S1 and 1110S2 may also be disposed on side surfaces of the electronic device 100. In this regard, 4G antennas in the form of conductive members may be disposed on the side surfaces of the electronic device 100, and slots may be formed in conductive member regions such that the plurality of antennas 1110a to 1110d can radiate 5G signals through the slots. Antennas 1150B may additionally be disposed on the rear surface of the electronic device 100 to radiate 5G signals rearward.

In some examples, at least one signal may be transmitted or received through the plurality of antennas 1110S1 and 1110S2 on the side surfaces of the electronic device 100. In some examples, at least one signal may be transmitted or received through the plurality of antennas 1110a to 1110d, 1150B, 1110S1, and 1110S2 on the front surface and/or the side surfaces of the electronic device 100. The electronic device may communicate with a base station through any one of the plurality of antennas 1110a to 1110d, 1150B, 111051, and 1110S2. Alternatively, the electronic device may perform MIMO communication with a base station through two or more antennas among the plurality of antennas 1110a to 1110d, 1150B, 111051, 1110S2.

Figure 3B:
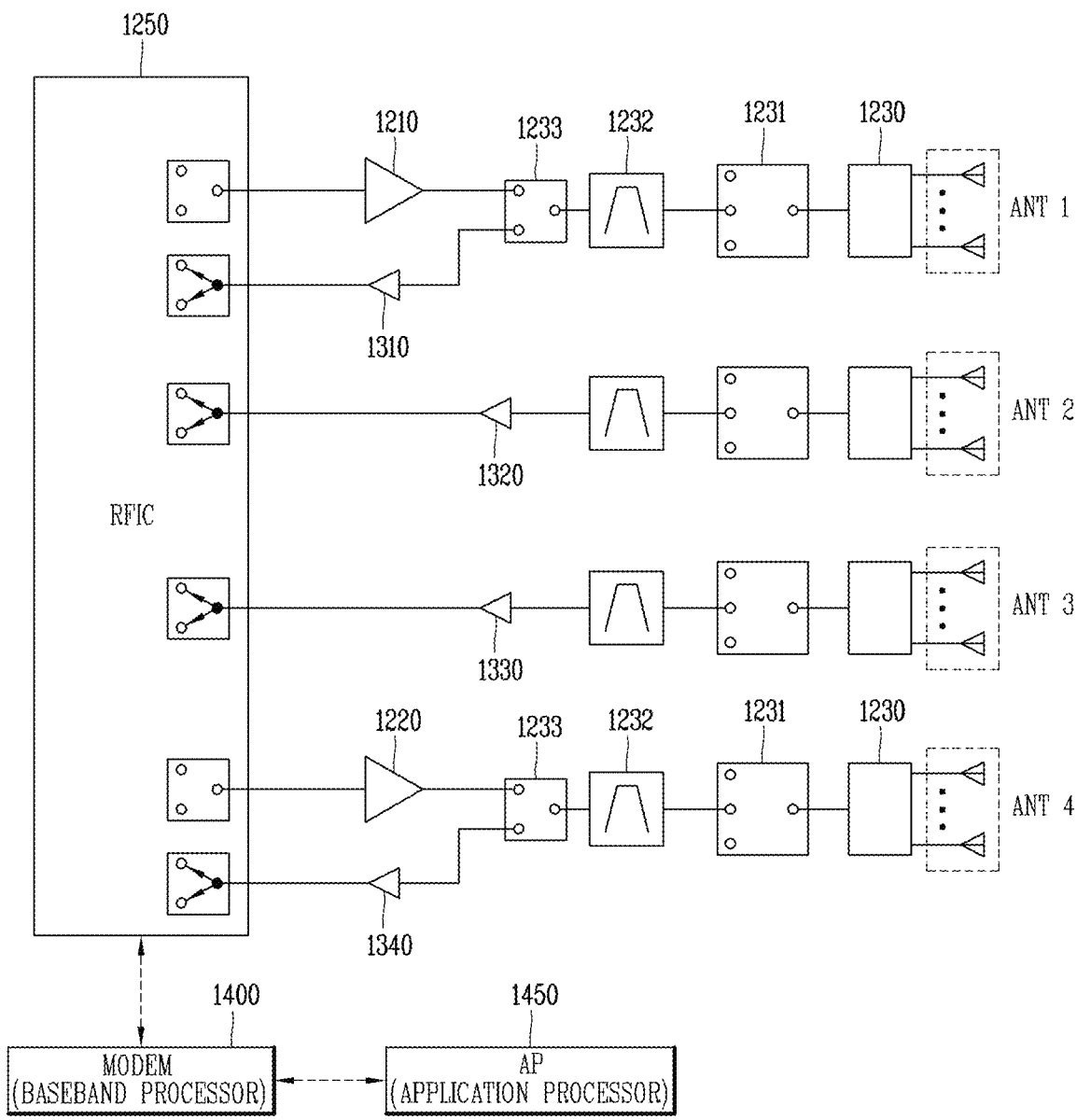
FIG. 3B is a block diagram illustrating a configuration of a wireless communication module of an electronic device operable in a 5G communication system according to one embodiment.

FIG. 3B is a diagram illustrating a configuration of a wireless communication module of an electronic device operable in a 5G communication system according to one embodiment. Referring to FIG. 3B, the electronic device includes a first power amplifier 1210, a second power amplifier 1220, and an RFIC 1250. In addition, the electronic device may further include a modem 1400 and an application processor (AP) 1450. Here, the modem 1400 and the application processor (AP) 1450 may be physically implemented on a single chip, and may be implemented in a logically and functionally separated form. However, the present disclosure may not be limited thereto and may be implemented in the form of a chip that is physically separated according to an application.

Meanwhile, the electronic device may include a plurality of low noise amplifiers (LNAs) 410 to 440 in the receiver. Here, the first power amplifier 1210, the second power amplifier 1220, the RFIC 1250, and the plurality of low noise amplifiers 1310 to 1340 are all operable in a first communication system and a second communication system. In this case, the first communication system and the second communication system may be a 4G communication system and a 5G communication system, respectively, but may not limited thereto.

As illustrated in FIG. 3B, the RFIC 1250 may be integrally configured to serve for 4G and 5G, but may not be limited thereto. The RFIC 250 may be configured to be separable into two parts, one for 4G and the other for 5G, depending on application. When the RFIC 1250 is integrally configured to serve for 4G and 5G, this configuration may be advantageous in terms of synchronization between 4G and 5G circuits as well as simplification of control signaling by the modem 1400.

On the other hand, when the RFIC 1250 is separable into two parts for 4G and 5G, respectively, these two parts may be referred to as a 4G RFIC and a 5G RFIC, respectively. In particular, when there is a great difference between the 5G band and the 4G band, such as when the 5G band is configured as a millimeter wave band, the RFIC 1250 may be configured to be separable into two parts for 4G and 5G, respectively. As such, when the RFIC 1250 is configured as a 4G/5G separation type, there is an advantage that the RF characteristics can be optimized for each of the 4G band and the 5G band.

Meanwhile, even when the RFIC 1250 is configured as the 4G/5G separated type, the 4G RFIC and the 5G RFIC may be logically and functionally separated from each other and may be implemented physically on one chip.

On the other hand, the application processor (AP) 1450 may be configured to control the operation of each component of the electronic device. Specifically, the application processor (AP) 1450 may control the operation of each component of the electronic device through the modem 1400.

For example, the modem 1400 may be controlled through a power management IC (PMIC) for low power operation of the electronic device. Accordingly, the modem 1400 may operate the power circuits of the transmitter and the receiver in a low power mode through the RFIC 1250.

In this regard, when it is determined that the electronic device is in an idle mode, the application processor (AP) 1450 may control the RFIC 1250 through the modem 300 as follows. For example, when the electronic device is in an idle mode, the application processor 280 may control the RFIC 1250 through the modem 400, such that at least one of the first and second power amplifiers 110 and 120 operates in the low power mode or is turned off.

According to another embodiment, the application processor (AP) 1450 may control the modem 300 to enable wireless communication capable of performing low power communication when the electronic device is in a low battery mode. For example, when the electronic device is connected to a plurality of entities among a 4G base station, a 5G base station, and an access point, the application processor (AP) 1450 may control the modem 1400 to enable wireless communication at the lowest power. Accordingly, even though a throughput is slightly sacrificed, the application processor (AP) 1450 may control the modem 1400 and the RFIC 1250 to perform short-range communication using only the short-range communication module 113.

According to another embodiment, when a remaining battery capacity of the electronic device is equal to or greater than a threshold value, the application processor 1450 may control the modem 300 to select an optimal wireless interface. For example, the application processor (AP) 1450 may control the modem 1400 to receive data through both the 4G base station and the 5G base station according to the remaining battery level and the available radio resource information. In this case, the application processor (AP) 1450 may receive the remaining battery capacity information from the PMIC and the available radio resource information from the modem 1400. Accordingly, when the remaining battery level and the available radio resources are sufficient, the application processor (AP) 1450 may control the modem 1400 and the RFIC 1250 to receive data through both the 4G base station and 5G base station.

Meanwhile, a multi-transceiving system of FIG. 3B may integrate a transmitter and a receiver of each radio system into one transceiver. This has an advantage of eliminating a circuitry part where two types of system signals are integrated with each other at an RF front-end.

In addition, since the front-end component can be controlled by the integrated transceiver, the front-end component can be more efficiently integrated than that in a case where the transceiving system is separated for each communication system.

In addition, when separated for each communication system, different communication systems cannot be controlled as needed, or because this may lead to a system delay, resources cannot be efficiently allocated. On the other hand, in the multi-transceiving system as illustrated in FIG. 2, different communication systems can be controlled as needed, system delay can be minimized, and resources can be efficiently allocated.

Meanwhile, the first power amplifier 1210 and the second power amplifier 1220 may operate in at least one of the first and second communication systems. In this regard, when the 5G communication system operates in the 4G band or the Sub-6 band, the first and second power amplifiers 1210 and 1220 can operate in both the first and second communication systems.

On the other hand, when the 5G communication system operates in the millimeter wave (mmWave) band, one of the first and second power amplifiers 1210 and 1220 may operate in the 4G band and the other may operate in the millimeter-wave band.

On the other hand, a transmitter and a receiver may be integrated to implement two different wireless communication systems using a single antenna using a dual transmit/receive antenna. In this case, 4×4 MIMO may be implemented using four antennas as illustrated in FIG. 2. In this case, 4×4 DL MIMO may be performed through downlink (DL).

Meanwhile, when the 5G band is a sub-6 band, first to fourth antennas ANT1 to ANT4 may be configured to operate in both the 4G band and the 5G band. On the contrary, when the 5G band is a millimeter wave (mmWave) band, the first to fourth antennas ANT1 to ANT4 may be configured to operate in either one of the 4G band and the 5G band. In this case, when the 5G band is a millimeter wave (mmWave) band, a plurality of antennas may be individually configured as an array antenna in the millimeter wave band.

Meanwhile, 2×2 MIMO may be implemented using two antennas connected to the first power amplifier 1210 and the second power amplifier 1220 among the four antennas. In this case, 2×2 UL MIMO (2 Tx) may be performed through uplink (UL). Alternatively, the present disclosure is not limited to 2×2 UL MIMO, and may also be implemented as 1 Tx or 4 Tx. In this case, when the 5G communication system is implemented with 1 Tx, only one of the first and second power amplifiers 1210, 1220 may operate in the 5G band. Meanwhile, when the 5G communication system is implemented with 4Tx, an additional power amplifier operating in the 5G band may be further provided. Alternatively, a transmission signal may be branched in each of one or two transmission paths, and the branched transmission signal may be connected to a plurality of antennas.

On the other hand, a switch-type splitter or power divider is embedded in RFIC corresponding to the RFIC 1250. Accordingly, a separate component does not need to be placed outside, thereby improving component mounting performance. In detail, a transmitter (TX) of two different communication systems can be selected by using a single pole double throw (SPDT) type switch provided in the RFIC corresponding to the controller 1250.

In addition, the electronic device capable of operating in a plurality of wireless communication systems according to an embodiment may further include a phase controller 1230, a duplexer 1231, a filter 1232, and a switch 1233.

In a frequency band such as a mmWave band, the electronic device needs to use a directional beam to secure coverage for communication with a base station. To this end, each of the antennas ANT1 to ANT4 needs to be implemented as an array antenna ANT1 to ANT4 including a plurality of antenna elements. Specifically, the phase controller 1230 may control a phase of a signal applied to each antenna element of each of the array antennas ANT1 to ANT4. Specifically, the phase controller 1230 may control both magnitude and phase of a signal applied to each antenna element of each of the array antennas ANT1 to ANT4. Since the phase controller 1230 controls both the magnitude and the phase of the signal, it may be referred to as a power and phase controller 230.

Therefore, by controlling the phase of the signal applied to each antenna element of each of the array antennas ANT1 to ANT4, beam-forming can be independently performed through each of the array antennas ANT1 to ANT4. In this regard, multi-input/multi-output (MIMO) may be performed through each of the array antennas ANT1 to ANT4. In this case, the phase controller 1230 may control the phase of the signal applied to each antenna element so that each of the array antennas ANT1 to ANT4 can form beams in different directions.

The duplexer 1231 may be configured to separate signals into a signal in a transmission band and a signal in a reception band. In this case, the signals in the transmission band that are transmitted through the first and second power amplifiers 1210 and 1220 are applied to the first and fourth antennas ANT1 and ANT4, respectively, through a first output port of the duplexer 1231. On the contrary, signals in a reception band received through the antennas ANT1 and ANT4 are received by the low noise amplifiers 310 and 340 through a second output port of the duplexer 1231.

The filter 1232 may be configured to allow a signal in the transmission band or the reception band to pass through and to block a signal in a band other than the transmission band or the reception band. In this case, the filter 1232 may include a transmission filter connected to the first output port of the duplexer 1231 and a reception filter connected to the second output port of the duplexer 1231. Alternatively, the filter 1232 may be configured to pass only the signal in the transmission band or only the signal in the reception band according to a control signal.

The switch 1233 may be configured to transmit only one of a transmission signal and a reception signal. In one embodiment of the present disclosure, the switch 1233 may be configured in a single-pole double-throw (SPDT) form to separate the transmission signal and the reception signal in a time division duplex (TDD) scheme. Here, the transmission signal and the reception signal are signals of the same frequency band, and thus the duplexer 1231 may be implemented in the form of a circulator.

In another embodiment, the switch 1233 may also be applied to a frequency division multiplex (FDD) scheme. In this case, the switch 1233 may be configured in a form of a double-pole double-throw (DPDT) to connect or block the transmission signal and the reception signal, respectively. On the other hand, the transmission signal and the reception signal may be separated by the duplexer 1231, and thus the switch 1233 is not necessarily required.

Meanwhile, the electronic device according to the embodiment may further include a modem 1400 corresponding to the controller. In this case, the RFIC 1250 and the modem 1400 may be referred to as a first controller (or a first processor) and a second controller (a second processor), respectively. The RFIC 1250 and the modem 1400 may be implemented as physically separated circuits. Alternatively, the RFIC 1250 and the modem 1400 may be logically or functionally distinguished from each other on one physical circuit.

The modem 1400 may perform control and signal processing for signal transmission and reception through different communication systems using the RFID 1250. The modem 1400 may acquire control information from the 4G base station and/or the 5G base station. Here, the control information may be received through a physical downlink control channel (PDCCH), but may not be limited thereto.

The modem 1400 may control the RFIC 1250 to transmit and/or receive signals through the first communication system and/or the second communication system at a specific time and frequency resources. Accordingly, the RFIC 1250 may control transmission circuits including the first and second power amplifiers 1210 and 1220 to transmit a 4G signal or a 5G signal in the specific time interval. In addition, the RFIC 1250 may control reception circuits including first through fourth low noise amplifiers 1310 to 1340 to receive 4G or 5G signals in a specific time interval.

Figure 4:
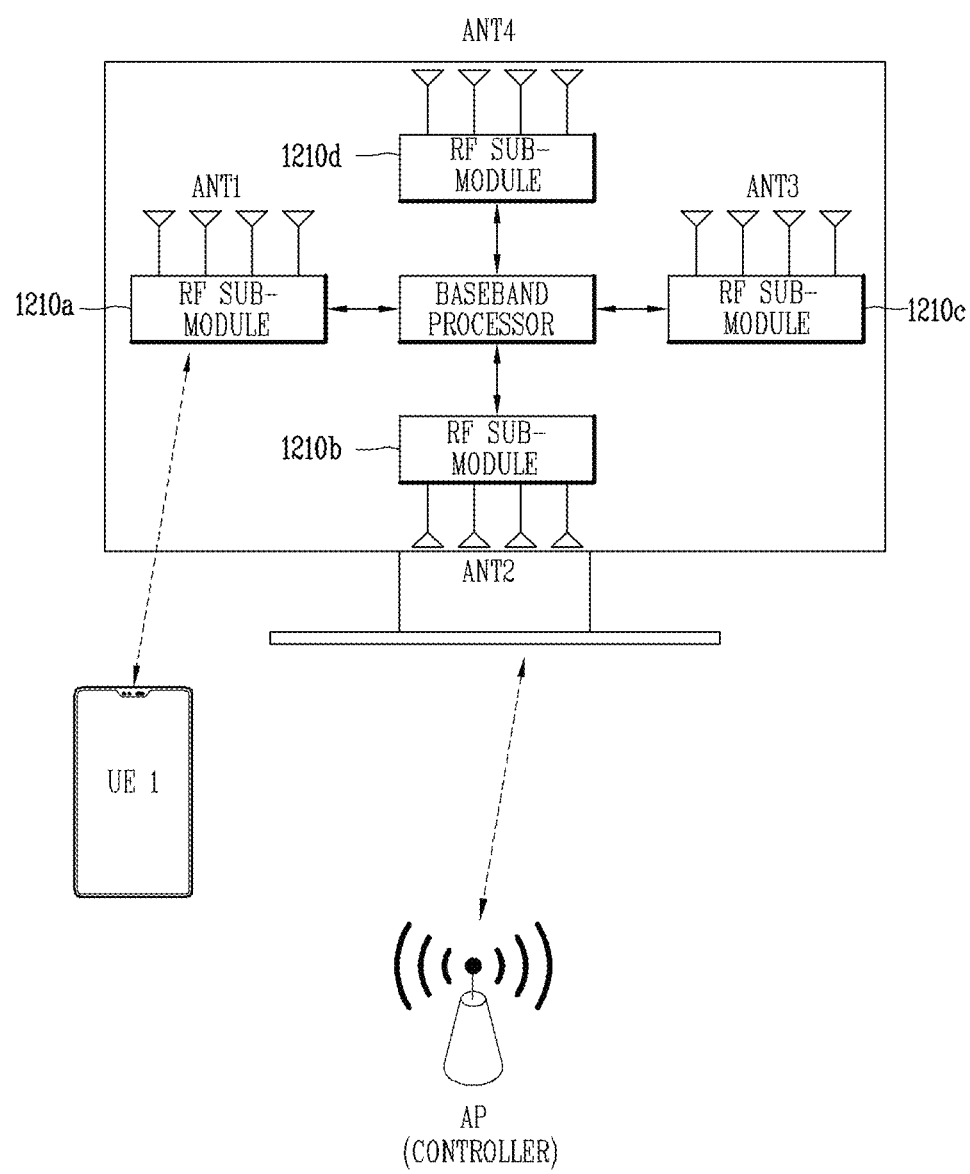
FIG. 4 illustrates an electronic device in which a plurality of antenna modules and a plurality of transceiver circuit modules according to one embodiment are arranged.

Hereinafter, an electronic device having an array antenna that may operate in a mmWave band will be described. In relation to this, FIG. 4 illustrates an electronic device in which a plurality of antenna modules and a plurality of transceiver circuit modules according to one embodiment are arranged. Referring to FIG. 4, a home appliance in which the antenna modules and the transceiver circuit modules are arranged may be a television, but is not limited thereto. Accordingly, in the present disclosure, the home appliance in which the antenna modules and the transceiver circuit modules are arranged may include any home appliance or a display device each configured to support a communication service in a millimeter wave band.

Referring to FIG. 4, an electronic device 1000 includes a plurality of antenna modules ANT1 to ANT4 and a plurality of transceiver circuit modules 1210*a* to 1210*d*. In relation to this, the transceiver circuit modules 1210*a* to 1210*d* may correspond to the transceiver circuit 1250 described above. Alternatively, the transceiver circuit modules 1210*a* to 1210*d* may be a partial configuration of the transceiver circuit 1250 or a partial configuration of a front-end module arranged between the antenna module and the transceiver circuit 1250.

Figure 16:
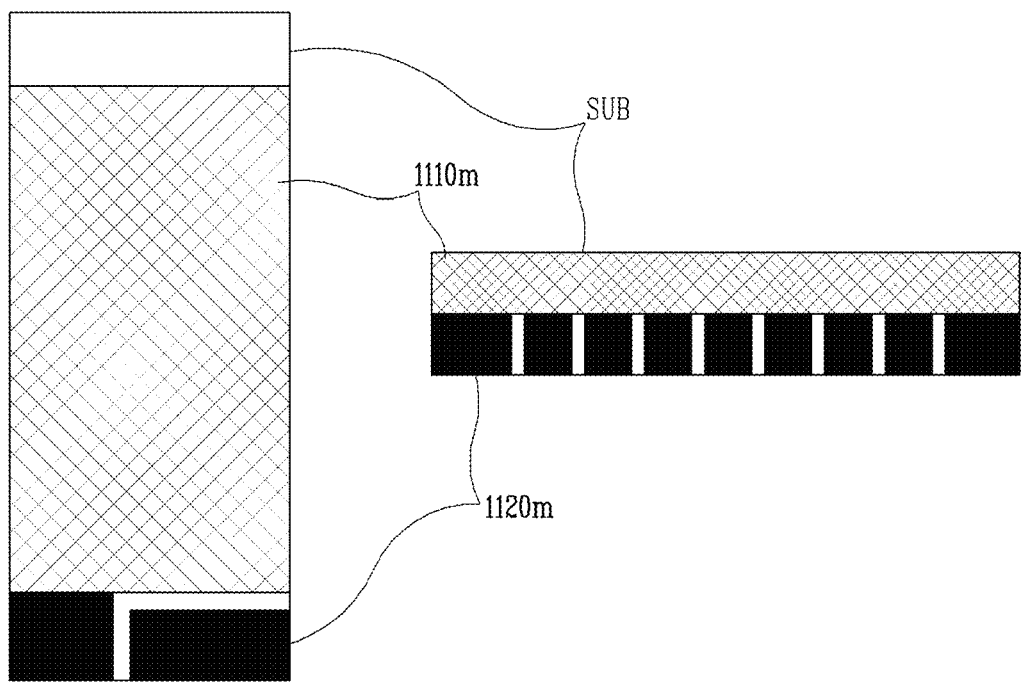
FIG. 16 illustrates a flexible-substrate transparent electrode antenna disclosed herein.
Figure 16:
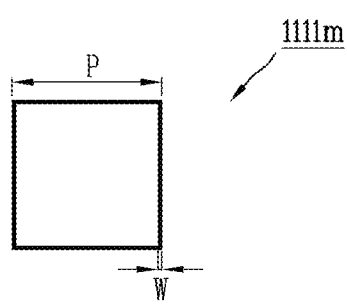

The antenna modules ANT 1 to ANT4 may be configured as array antennas, respectively, in which a plurality of antenna elements are arranged. A number of elements of the antenna modules ANT 1 to ANT4 is not limited to two, three, four, or the like as illustrated in the drawing. For example, the number of the elements of the antenna modules ANT1 to ANT4 may extend to 2, 4, 8, 16, or the like. In addition, the elements of the antenna modules ANT 1 to ANT4 may be selected in a same number or in different numbers. The plurality of antenna modules ANT1 to ANT4 may be arranged in different areas of a display. As illustrated in FIG. 16, the plurality of antenna modules ANT 1 to ANT4 may be arranged in an upper portion, a left portion, a lower portion, or a right portion of the display. However, an arrangement structure thereof is not limited thereto. As another example, the antenna modules ANT 1 to ANT4 may be arranged in an upper left portion, an upper right portion, a lower left portion, or a lower right portion of the display.

The antenna modules ANT 1 to ANT4 may be configured to transmit or receive a signal in a specific direction in any frequency band. For example, the antenna modules ANT 1 to ANT4 may operate in any one of a 28 GHz band, a 39 GHz band, and a 64 GHz band.

The electronic device may maintain a connection state with different entities through two or more of the antenna modules ANT 1 to ANT4 or perform a data transmitting or receiving operation to maintain the connection state described above. In this regard, the electronic device corresponding to a display device may transmit or receive data to/from a first entity through the first antenna module ANT1. Also, the electronic device may transmit or receive data to/from a second entity through the second antenna module ANT2. As an example, the electronic device may transmit or receive data to/from a mobile terminal UE through the first antenna module ANT1. The electronic device may transmit or receive data to/from a control device such as a set-top box or an access point via the second antenna module ANT2.

Data may be transmitted or received to/from other entities through other antenna modules, e.g., the third antenna module ANT3 and the fourth antenna module ANT4. As another example, dual connection or MIMO may be performed through at least one of the first and second entities both previously connected via the third antenna module ANT3 and the fourth antenna module ANT4.

The transceiver circuit modules 1210*a* to 1210*d* may operate to process a transmission signal and a reception signal in an RF frequency band. Here, the RF frequency band may be any frequency band of a millimeter band, such as a 28 GHz band, a 39 GHz band, and a 64 GHz band, as described above. The transceiver circuit modules 1210*a* to 1210*d* may be referred to as RF sub-modules 1210*a* to 1210*d*, respectively. In this case, the number of the RF sub-modules 1210*a* to 1210*d* is not limited to four, and may be changed to an arbitrary number of two or more according to applications.

In addition, the RF sub-modules 1210*a* to 1210*d* may include an up-conversion module and a down-conversion module each configured to convert a signal in the RF frequency band into a signal of in an intermediate frequency (IF) band or convert a signal in the IF frequency band into a signal in the RF frequency band. To this end, the up-conversion module and the down-conversion module may respectively include a local oscillator (LO) capable of performing up-frequency conversion and down-frequency conversion.

One of the plurality of RF sub-modules 1210*a* to 1210*d* may transmit a signal to an adjacent transceiver circuit module. Accordingly, the signal may be configured to be transmitted to all of the transceiver circuit modules 1210*a* to 1210*d* at least once.

To do so, a data transfer path having a loop structure may be added. In relation to this, the RF sub-modules 1210*b* and 1210*c* may bidirectionally transmit a signal to an adjacent RF sub-module through a transfer path P2 having the loop structure.

Alternatively, a data transfer path having a feedback structure may be added. In relation to this, at least one sub-module 1210*c* may transmit a signal to the remaining sub-modules 1210*a*, 1210*b*, and 1210*c* unidirectionally through the data transfer path having the feedback structure.

The plurality of RF sub-modules may include the first to fourth RF sub-modules 1210*a* to 1210*d*. In this regard, a signal from the first RF sub-module 1210*a* may be transmitted to the RF sub-module 1210*b* and the fourth RF sub-module 1210*d* both adjacent thereto. In addition, the second RF sub-module 1210*b* and the fourth RF sub-module 1210*d* may transmit the signal to the third RF sub-module 1210*c* adjacent thereto. In this case, when bidirectional transmission can be performed between the second RF sub-module 1210*b* and the third RF sub-module 1210*c* as shown in FIG. 4, this may be referred to as a loop structure. On the other hand, when only unidirectional transmission can be performed between the second RF sub-module 1210*b* and the third RF sub-module 1210*c*, this may be referred to as a feedback structure. In the feedback structure, at least two signals may be transmitted to the third RF sub-module 1210*c*.

However, the structure is not limited thereto, and a baseband module may be included only in a particular module among the first to fourth RF sub-modules 1210*a* to 1210*d* depending on an application. Alternatively, depending on an application, the baseband module may not be included in the first to fourth RF sub-modules 1210*a* to 1210*d*, but may be configured as a separate control unit, that is, a baseband processor 1400. For example, a control signal may be transmitted only by a separate control unit, that is, the baseband processor 1400.

Hereinafter, a specific configuration and function of the electronic device illustrated in FIGS. 1 to 2B and including the wireless interface of FIG. 3B and FIG. 4 are described. Data needs to be transmitted or received between electronic devices using a communication service therebetween in a mmWave band. In relation to this, a wireless AV service may be provided using a 5G communication service.

There is a problem in that there is no specific solution for an antenna and an RFIC that provide a wireless interface in an electronic device such as an image display device in order to transmit an image with a resolution of 4K or higher. In particular, in consideration of a situation in which an electronic device such as an image display device is arranged on a wall of a building or on a table, wireless AV data may need to be transmitted or received to/from another electronic device. To do so, it is needed to present a specific configuration of an area of the image display device in which the antenna and the RFIC are to be arranged, and an antenna structure.

Figure 5A:
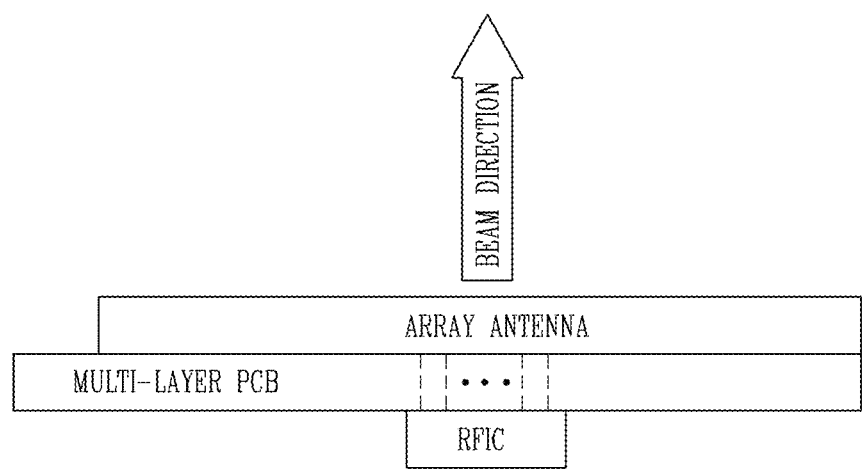
FIG. 5A illustrates an antenna in package (AIP) module structure and an antenna module structure implemented on a flexible substrate related to the present disclosure.
Figure 5A:
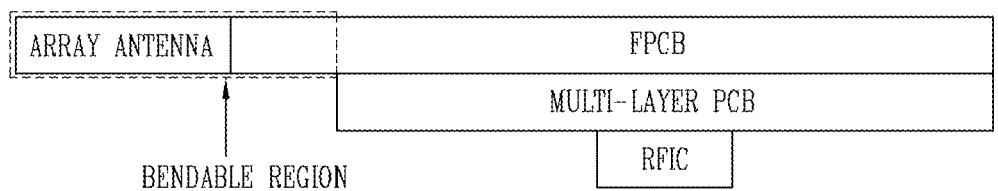

In relation to this, FIG. 5A illustrates an antenna in package (AIP) module structure and an antenna module structure implemented on a flexible substrate related to the present disclosure. Referring to (a) of FIG. 5A, the AIP module is configured as an RFIC-PCB-antenna integrated type for mmWave band communication. As illustrated in (a) of FIG. 5A, in the AIP module, an array antenna may be arranged on a same PCB as the API module to minimize a distance between the RFIC and the antenna. The antenna of the AIP module may be implemented using a multilayer PCB manufacturing process, and radiate a signal in a vertical/side direction of the PCB. A double polarization may be implemented using a patch antenna or a dipole/monopole antenna. On the other hand, referring to (b) of FIG. 5A, an antenna module structure implemented on a flexible substrate may be such that an array antenna is implemented in one side region of a flexible printed circuit board (FPCB).

A material of the flexible substrate may be implemented as one of cyclo olefin polymer (COP, transparent), polyethylene terephthalate, (PET, transparent), polyimide (PI, transparent/non-transparent), modified polyimide (MPI, non-transparent), and polyphenylene sulfide (PPS, non-transparent).

Figure 5B:
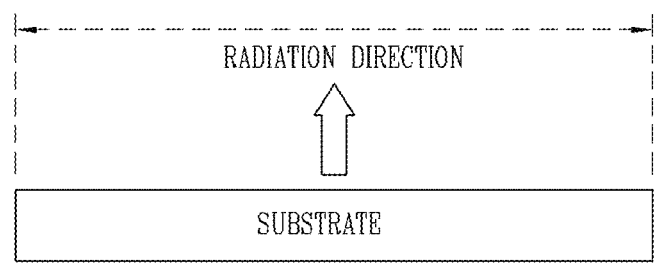
FIG. 5B is a conceptual diagram illustrating antenna structures having different radiation directions.
Figure 5B:
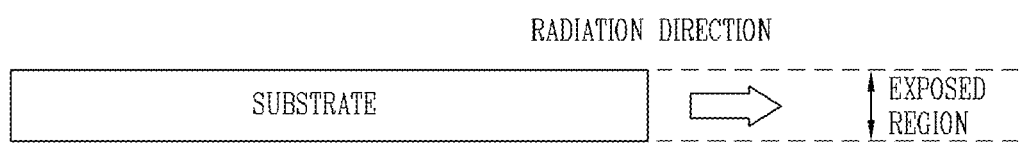

FIG. 5B is a conceptual diagram illustrating antenna structures having different radiation directions. Referring to (a) of FIG. 5A and (a) of FIG. 5B, an antenna radiation direction of the AIP module corresponds to a front direction. In relation to this, antennas arranged on the AIP substrate may be configured as a radiating element such as a patch antenna. That is, the antennas arranged in the AIP module may be broadside antenna elements radiating in the broadside direction.

In this regard. broadside radiation may be implemented by an antenna radiating in a vertical direction to the substrate. Such a broadside antenna may be a patch antenna or a reflector dipole/monopole antenna. It may be assumed that, in the mmWave band, the broadside antenna may be used in a loss of signal (LOS) environment, and a radiation surface of an antenna may be an exposed portion of the antenna. Since a transmission line loss is great in the mmWave band, a circuit part such as an RFIC may be mounted in a lower portion of a substrate. In a case of a 60 GHz band, an exposed portion of an antenna module may increase due to a problem such as a size of a part, etc. rather than a size of the antenna.

On the other hand, referring to (b) of FIG. 5A and (b) of FIG. 5B, a radiation direction of the antenna module implemented on the flexible substrate corresponds to a side surface direction. In this regard, the antenna implemented on the flexible substrate may be configured as a radiating element such as a dipole/monopole antenna. That is, antennas implemented on the flexible substrate may be end-fire antenna elements.

In this regard. end-fire radiation may be implemented by an antenna radiating in a direction horizontal to the substrate. The end-fire antenna may be implemented as a dipole/monopole antenna, a Yagi-dipole antenna, a Vivaldi antenna, a substrate integrated waveguide (SIW) horn antenna, or the like. In this regard, the Yagi-dipole antenna and the Vivaldi antenna have horizontal polarization characteristics. One of the antenna modules arranged in the image display device disclosed herein needs a vertically polarized antenna. Accordingly, there is a need to present an antenna structure capable of minimizing an antenna exposure area while operating as a vertically polarized antenna.

Figure 6:
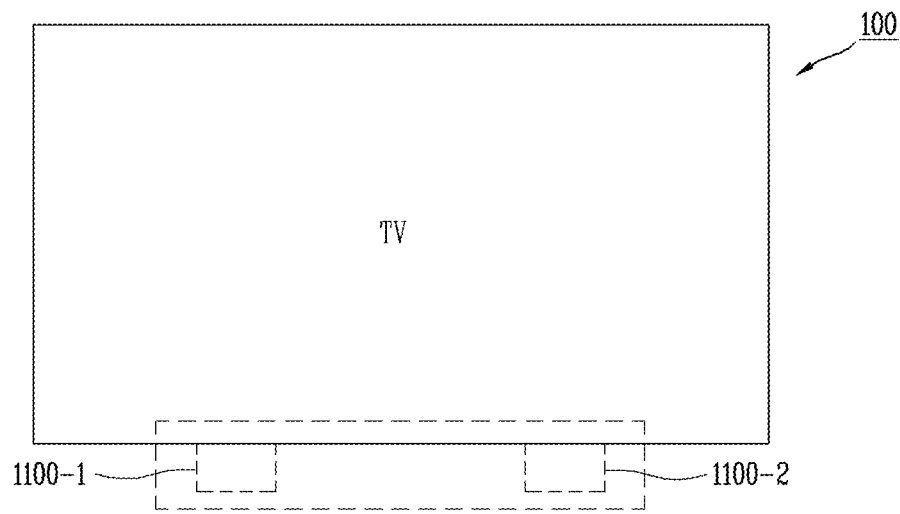
FIG. 6 is a conceptual diagram illustrating a plurality of communication modules arranged under an image display device, a configuration of the corresponding communication modules, and communication performed with other communication modules arranged in a front direction.
Figure 6:
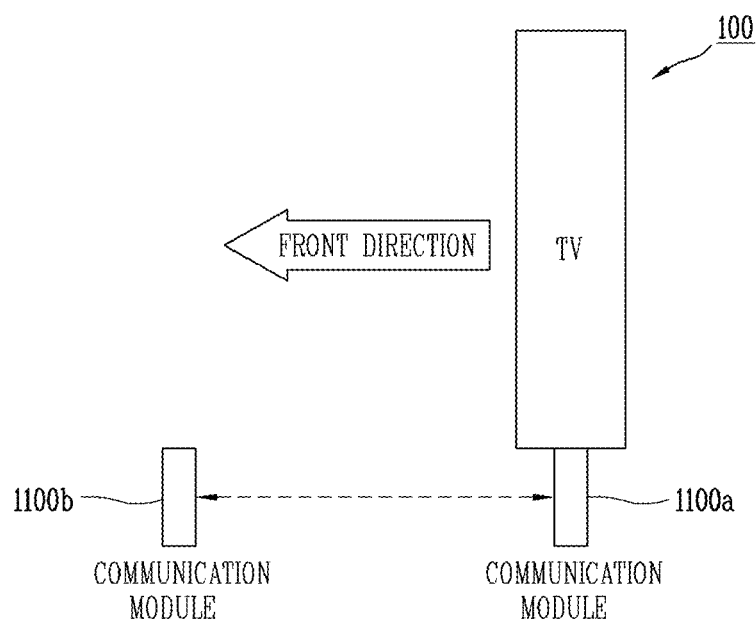

When the AIP module of (a) of FIG. 5A is arranged under an electronic device such as an image display device, communication needs to be performed with other communication modules arranged in a front direction. In this regard, FIG. 6 is a conceptual diagram illustrating a plurality of communication modules arranged under an image display device, a configuration of the corresponding communication modules, and communication performed with other communication modules arranged in a front direction. Referring to (a) of FIG. 6, communication modules 1100-1 and 1100-2 different from each other may be disposed under the image display device 100. Referring to (b) of FIG. 6, a communication module arranged under the image display device 100, i.e., an antenna module 1100 may perform communication with a communication module 1100b arranged in front of the image display device 100.

Accordingly, when communication is performed with a communication module 1100-3 arranged in a front direction of the image display device 100, the AIP module may be configured to be exposed in the front direction. An arrangement structure of the antenna module may cause deterioration of a design of the image display device. In relation to this, even though communication performance of the image display device with another communication module is important, a design should be regarded as one of important factors when a product such as the image display device is selected.

Additionally, in the antenna module structure implemented on the flexible substrate as illustrated in (b) of FIG. 5A, an antenna may be implemented to have a low-profile shape. On the other hand, in the AIP module structure as illustrated in (a) of FIG. 5A, an antenna height may increase according to an RFIC driving circuit and a heat dissipation structure. Also, depending on a type of an antenna that is being used, an antenna height may increase in the AIP module structure as shown in (a) of FIG. 5A.

Figure 7:
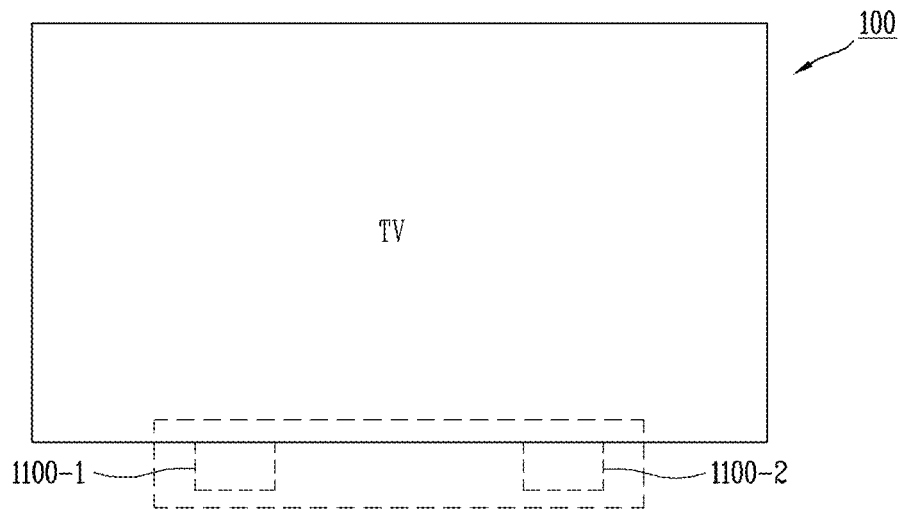
FIG. 7 illustrates a structure of an antenna module arranged below the image display device according to one embodiment.
Figure 7:
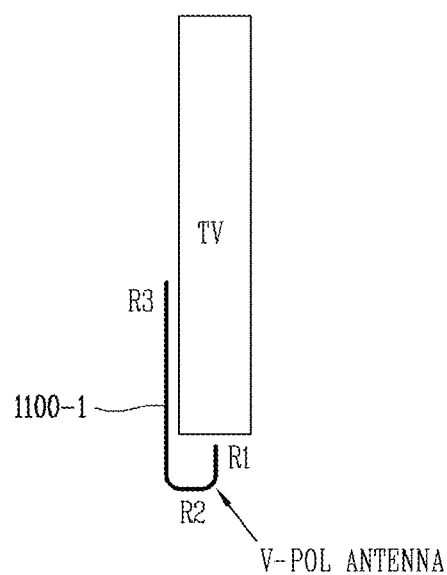
Figure 7:
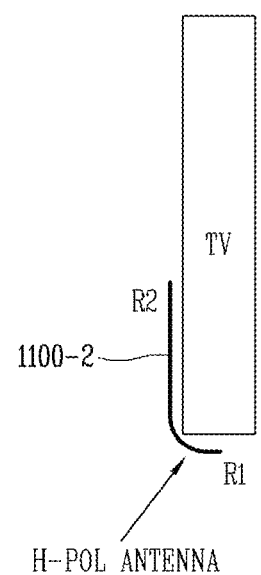

As described above, the antenna module 1100 that may be implemented to have a low-file shape may be configured as illustrated in FIG. 7. In relation to this, a broadband double polarized antenna is required to transmit or receive large-capacity data in a mmWave band at a high speed. In addition, a low-profile antenna structure having a very small height may be provided to apply the broadband double polarized antenna to an electronic product. In relation to this, there is a limitation in providing a vertically polarized antenna to have a low profile antenna height due to structural characteristics. Accordingly, the present disclosure proposes a mmWave band low profile antenna structure that is suitable for a mmWave communication environment and may implement double polarization.

In relation to this, an antenna module implemented on a flexible substrate disclosed herein has technical characteristics described below.

Two or more MIMO antenna modules having orthogonal polarization characteristics are required to transmit or receive large-capacity data at a high speed in a mmWave band. An array antenna is to be used in a mmWave band to compensate for a high free-space path-loss due to high frequency band characteristics.

Hereinafter, constraint conditions on a mmWave antenna implemented on a flexible film is described. In an application requiring a slim structure, it may not be easy to configure arrangement of an antenna having orthogonal double polarization characteristics in an electronic device. In relation to this, when a double polarized antenna is implemented using an array antenna to have a low-profile shape, an antenna bandwidth issue may occur.

Accordingly, a Yagi-dipole antenna, a Vivaldi antenna, a slot antenna, or the like may be taken into account as a candidate group of array antennas that may be implemented using a flexible film material. However, the Yagi-dipole antenna/the Vivaldi antenna have same polarization characteristics, i.e., end-fire radiation characteristics. Accordingly, the present disclosure provides a slot array antenna that may be implemented using a vertically polarized antenna having a low-profile shape.

The slot array antenna is a low-profile antenna, and may be implemented using a flexible substrate. The slot array antenna may have polarization characteristics orthogonal to a vertically polarized antenna such as a dipole antenna, and may be implemented to have a slim and low-profile shape. Due to bi-directional beam characteristics of the slot array antenna, an additional reflector or director may be required to direct a beam toward one direction. However, the present disclosure provides a vertically polarized antenna structure capable of directing a beam toward one direction based on flexibility of a film by providing a best mode of an antenna configuration disclosed herein, without having to require an additional reflector structure.

FIG. 7 illustrates a structure of an antenna module arranged below an image display device according to one embodiment. Referring to (a) of FIG. 7, the antenna module 1100 may be configured to include a vertically polarized antenna module 1100-1 and/or a horizontally polarized antenna module 1100-2. In relation to this, the vertically polarized antenna module 1100-1 and the horizontally polarized antenna module 1100-2 may be referred to as a first antenna module 1100-1 and a second antenna module 1100-2, respectively. Accordingly, the first antenna module 1100-1 and the second antenna module 1100-2 are not limited to vertical polarization and horizontal polarization, respectively. Accordingly, the first antenna module 1100-1 and the second antenna module 1100-2 may be any antenna modules configured to radiate signals having any polarization orthogonal to each other.

Referring to (b) of FIG. 7, the vertically polarized antenna module 1100-1 may be arranged in a first region R1 of a flexible substrate (FPCB). Accordingly, the first antenna module 1100-1 may radiate a vertically polarized signal in a front direction of an electronic device. When the vertically polarized antenna module is applied to an image display device, only a portion corresponding to an antenna portion is exposed. Accordingly, a small portion of an antenna module structure implemented on a flexible substrate in the image display device is exposed to outside, compared to an AIP antenna module structure. In relation to this, an exposed portion of the antenna module implemented on the flexible substrate may correspond to about one-wavelength level at an operating frequency. As an example, an exposed height of the antenna module at 60 Hz inclusive of a cover of an instrument may correspond to a level of about 5 mm.

Referring to (c) of FIG. 7, a horizontally polarized antenna in the horizontally polarized module 1100-2 may be arranged in a first region R1 of a second flexible substrate. Accordingly, the second antenna module 1100-2 may radiate a horizontally polarized signal in a front direction of the electronic device.

In relation to this, both the first antenna module 1100-1 and the second antenna module 1100-2 may be used to perform MIMO with a set-top box and/or another electronic device arranged in a periphery or perform a configuration of dual connectivity (DC). Accordingly, the image display device needs to simultaneously use both the first antenna module 1100-1 and the second antenna module 1100-2. In relation to this, unlike a mobile terminal, the image display device has a spare space in which different antenna modules are arranged. Accordingly, the MIMO and/or DC configuration may be provided through a plurality of antenna modules using different polarizations, instead of a single antenna module using a double feeding method. By providing the MIMO and/or DC configuration through the antenna modules using different polarizations, a level of interference between different polarized signals may be reduced. Particularly, a level of interference between different polarized signals may be further reduced using different types of antennas.

Figure 8A:
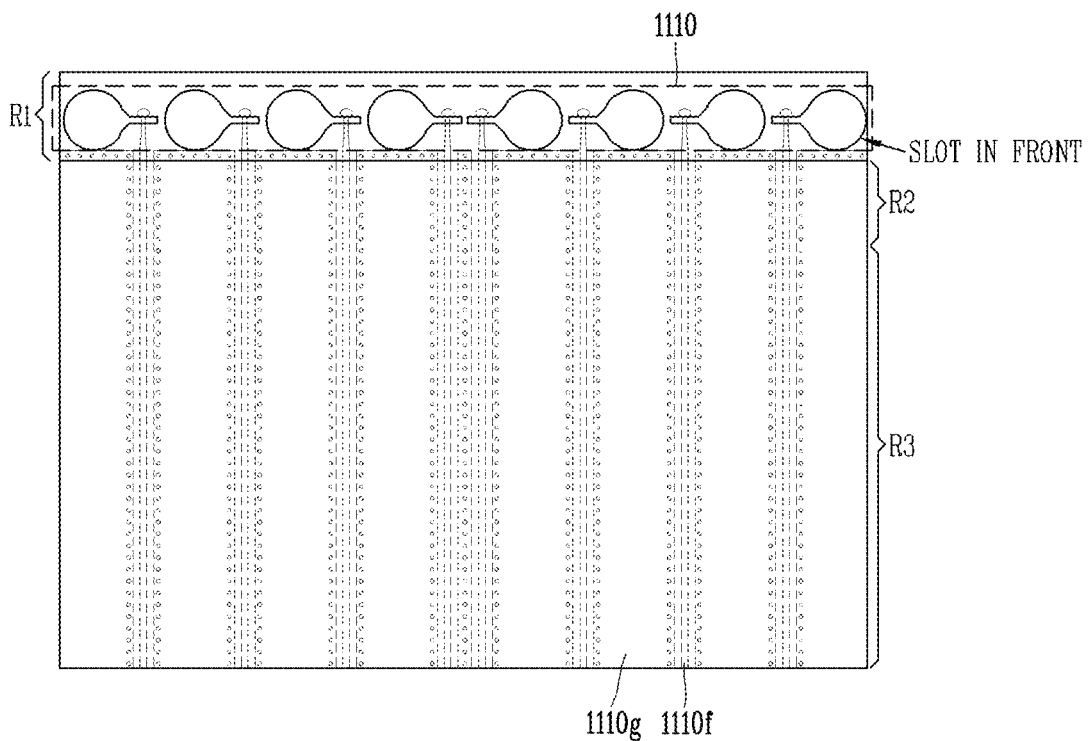
FIG. 8A illustrates a structure of a slot array antenna according to one embodiment.
Figure 8A:
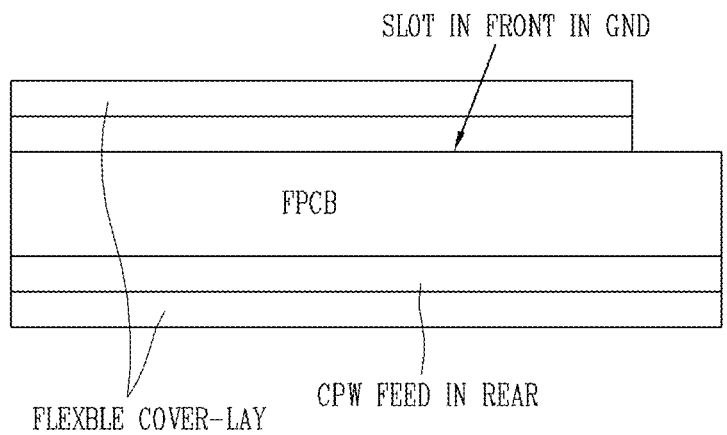

In the present disclosure, a slot array antenna may be used as a vertically polarized antenna. In relation to this, FIG. 8A illustrates a structure of a slot array antenna according to one embodiment. Referring to FIG. 8A, the slot array antenna 1110 in which a plurality of slot radiating elements are arranged may be provided on a front surface of a flexible substrate. On the flexible substrate, a ground pattern 1110g may be provided in a region other than a first region R1 in which the slot array antenna 1110 is arranged.

Accordingly, a slot array antenna structure described herein may be a slot antenna having a coupled feeding structure. In relation to this, the coupled feeding structure may be provided as a structure having a transmission line feeding structure+a feeding structure in non-contact with a radiator. The slot array antenna 1110 may be configured as a plurality of slot radiating elements provided on a ground surface facing a transmission line corresponding to a feeding portion 1110f. In relation to this, an electric field direction provided in the slot radiating elements may match a direction of a signal line corresponding to the feeding portion 1110f. Accordingly, respective radiating elements of the slot array antenna 1110 may be configured to radiate a vertically polarized signal.

Referring to FIGS. 5 to 8A, the electronic device 100 corresponding to an image display device may include the display 151 and the antenna module 1100. The display 151 is provided on a front surface of the electronic device 100 and configured to display information on a screen. The antenna module 1100 is arranged below the electronic device 100, and may be configured to radiate a vertically polarized signal toward the front surface of the electronic device 100. The antenna module 1100 may further include the second antenna module 1100-2 to radiate a horizontally polarized signal toward the front surface of the electronic device 100.

The antenna module 1100 may be configured to include the slot array antenna 1110 and the feeding portion 1110f. The slot array antenna 1110 may be arranged in the first region R1 of the flexible substrate to radiate a vertically polarized signal in a mmWave band. As illustrated in (b) of FIG. 7, the first region R1 is a partial region of the flexible substrate facing a front direction of the electronic device.

The feeding portion 1110f may be configured as a transmission line to apply a signal to the respective slot radiating elements of the slot array antenna 1110. The feeding portion 1110f is arranged on a rear surface of the flexible substrate, and a signal from an end of the feeding portion 1110f may be radiated in a front direction of the flexible substrate through the slot array antenna 1110.

The feeding portion 1110f may be provided to have a coplanar waveguide (CPW) structure in which a ground region is arranged at both sides of the signal line to reduce a signal loss in the mmWave band. A plurality of vias may be arranged in the ground regions having the CPW structure to be electrically connected to a ground region on a rear surface of the flexible substrate. The feeding portion 1110f may be arranged in a second region R2 provided to be bent with respect to the first region R1, and a third region R3 provided to be bent with respect to the second region R2. In addition, an end of the feeding portion 1110f may be provided in the first region R1 to couple a signal to be radiated toward a slot radiating element. In relation to this, the first region R1 and the third region R3 of the flexible substrate may correspond to a front surface region and a rear surface region of the electronic device, respectively.

Figure 8B:
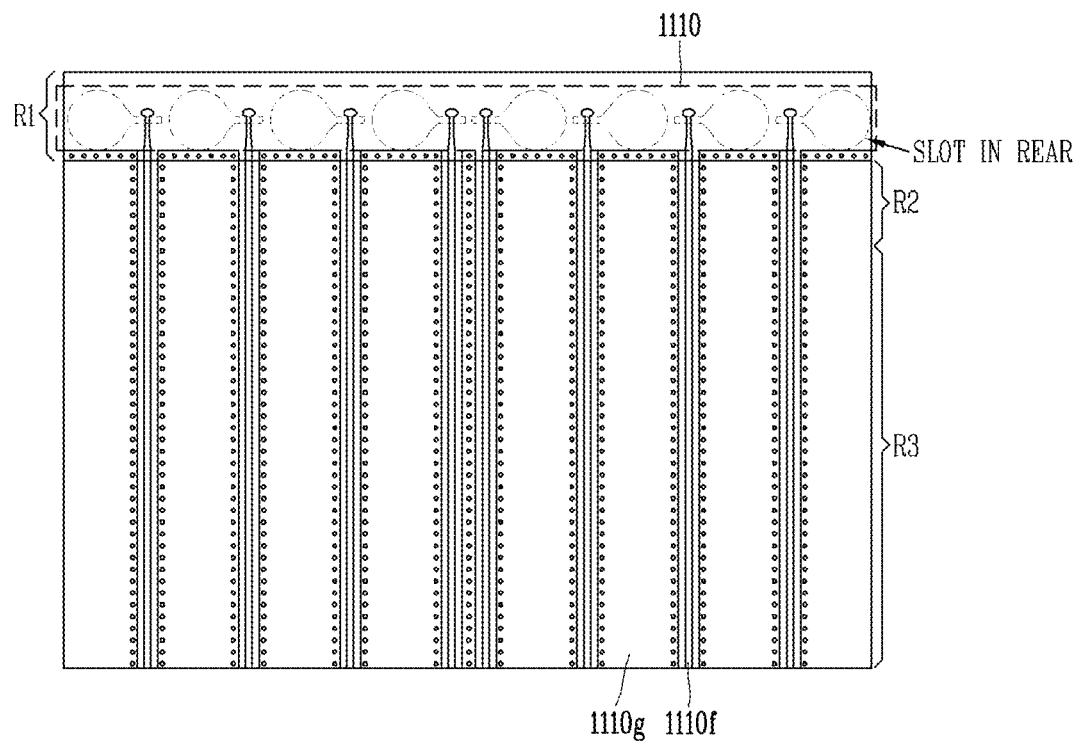
FIG. 8B illustrates a structure of a slot array antenna according to another embodiment.
Figure 8B:
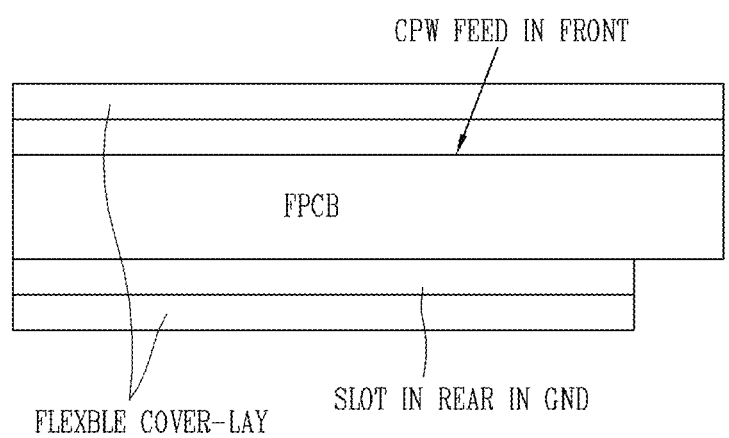

According to another embodiment, a slot array antenna and a ground may be arranged on a rear surface of the flexible substrate, and a feeding portion may be provided on a front surface of the flexible substrate. In relation to this, FIG. 8B illustrates a structure of a slot array antenna according to another embodiment. Referring to FIG. 8B, a slot array antenna 1110b in which a plurality of slot radiating elements are arranged may be provided on a rear surface of a flexible substrate. A ground pattern 1110gb may be provided in a remaining region other than the first region R1 in which the slot array antenna 1110b is arranged.

Referring to FIGS. 5 to 7 and 8B, the antenna module 1100 may be configured to include a slot array antenna 1110b and a feeding portion 1110fb. The slot array antenna 1110b may be arranged in the first region R1 of the flexible substrate to radiate a vertically polarized signal in a mmWave band. As illustrated in (b) of FIG. 7, the first region R1 is a partial region of the flexible substrate facing a front direction of the electronic device.

The feeding portion 1110f may be arranged in the second region R2 provided to be bent with respect to the first region R1, and the third region R3 provided to be bent with respect to the second region R2 to apply a signal to the respective slot radiating elements of the slot array antenna 1110. The feeding portion 1110f may be arranged on a front surface of the flexible substrate, and a signal from an end of the feeding portion 1110fb may be radiated in a front direction of the flexible substrate through the slot array antenna 1110b. In relation to this, a signal is radiated in a rear direction through the slot array antenna 1110b provided on a rear surface of the flexible substrate. However, a signal is reflected onto the ground pattern 1110gb provided in the third region R3 to be radiated toward a front direction.

Referring to FIGS. 5 to 8B, the first region R1 of the flexible substrate may be provided from the second region R2 in an upward direction to overlap at least a part of the third region R3 of the flexible substrate. Accordingly, the flexible substrate provided to include the first to third regions R1 to R3 may be provided in a U-shape.

A rear radiation signal radiated toward the third region R3 through the respective slot radiating elements of the slot array antenna 1100 may be reflected by a metal pattern provided in the third region R3, i.e., the ground pattern 1110g to be radiated toward a front region. In a configuration illustrated in FIG. 8B, a rear radiation signal radiated toward the third region R3 through the respective slot radiating elements of the slot array antenna 1110b may be reflected by a metal pattern provided in the third region R3, i.e., a ground region having a CPW structure to be radiated toward a front region.

A separation distance between a front surface portion and a rear surface portion of the flexible substrate, i.e., a distance between the first region R1 and the third region R3 of the flexible substrate may be determined within a certain range of an operation wavelength of a signal. In relation to this, FIG. 9 is a conceptual diagram illustrating a phase change according to a distance between an antenna and a metal reflector according to the present disclosure.

Figure 9:
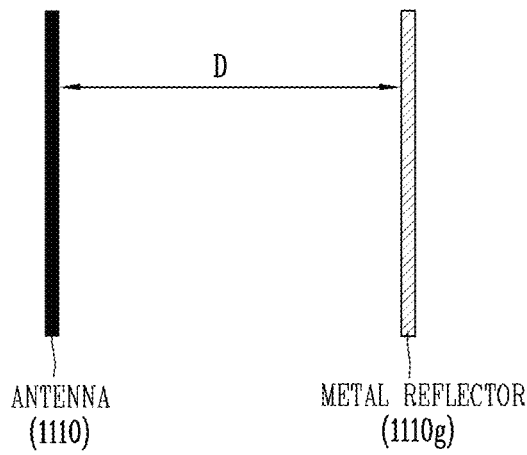
FIG. 9 is a conceptual diagram illustrating a phase change according to a distance between an antenna and a metal reflector according to the present disclosure.
Figure 9:
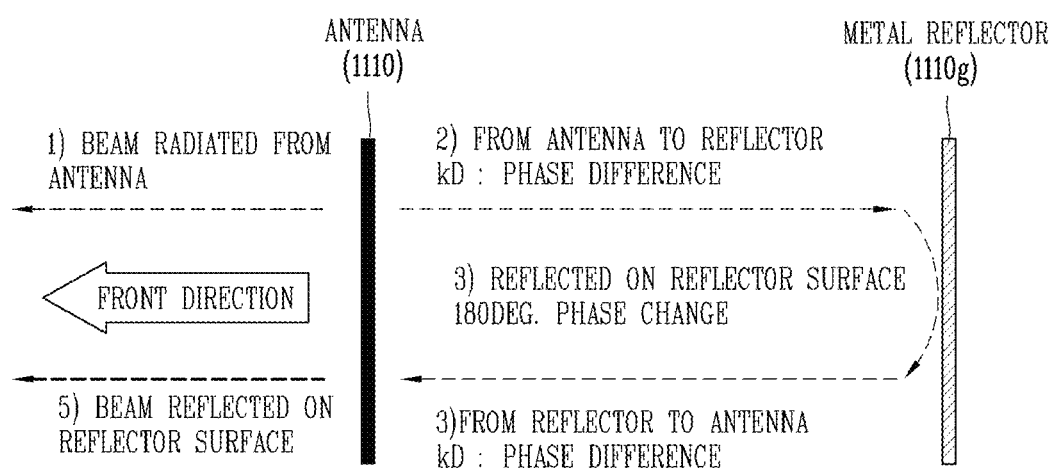

Referring to (a) of FIG. 9, a phase change according to a distance between an antenna, i.e., the slot array antenna 1110 and the metal reflector 1110g may be expressed as k×D. In relation to this, k denotes a propagation constant of a medium, and may be expressed as $2\pi/\lambda$. Here, l denotes a wavelength in a medium filled between the antenna 1110 and the metal reflector 1110g. c denotes a speed of light, and corresponds to $3\times10^8$ m/s. F corresponds to a frequency, Dk corresponds to a dielectric constant, and Dk in air=1. A reflection coefficient ($\Gamma$) of a metal reflector equals to $-1$. Here, a reflection coefficient, i.e., "1" represents full reflec-tion, and a symbol "-" represents a phase change by 180 degrees. When a signal radiated from the antenna 1110 is reflected on the metal reflector, a phase of the signal is changed by 180 degrees.

Referring to (b) of FIG. 9, a gain of a beam radiated toward a front direction of the antenna 1110 may be determined by a distance between the antenna 1110 and the metal reflector 1110g. In relation to this, a value of a total phase change according to a distance between the antenna 1110 and the metal reflector 1110g may be expressed as a value of 2 kD+180 degrees.

In detail, when a distance between the antenna 1110 and the metal reflector 1110g is $\lambda/4+n\lambda/2$ (n=0, 1, 2, 3, . . . ), a reflection signal becomes in-phase. Accordingly, a sum of phases of beams reflected on the metal reflector 1110g and returned is (n+1)×360 degrees, and the beams become in-phase and synthesized. Thus, a gain in the front direction increases. On the other hand, when a distance between the antenna 1110 and the metal reflector 1110g is $n\lambda/2$ (n=1, 2, 3, . . . ), a reflection signal becomes out-of-phase. Accordingly, a sum of phases of beams reflected on the metal reflector 1110g and returned is 180+(n+1)×360 degrees, and the beam becomes out-of-phase. Thus, a gain in the front direction decreases. In relation to a wavelength change according to a medium, when a dielectric (an antenna carrier) having a Dk (a dielectric constant) greater than 1 is inserted, a distance between the antenna 1110 and the metal reflector 1110g may be decreased.

Referring to FIGS. 5 to 9, a separation distance between the first region R1 and the third region R3 of the flexible substrate may be determined as being within a certain range of ¼ of a cycle of an operation wavelength of a mmWave band signal. Here, "¼ of a cycle of an operation wavelength" means that a distance between the slot array antenna 1110 or 1110b and the ground pattern 1110g or 1110gb is $\lambda/4+n\lambda/2$ (n=0, 1, 2, 3, . . . ). Accordingly, a rear radiation signal radiated toward the third region R3 and a front radiation signal radiated toward the first region R1 may be propagated in-phase with each other, the first region R1 and the third R3 being located in the flexible substrate on which the slot array antenna 1110 or 1110b is provided.

Figure 10:
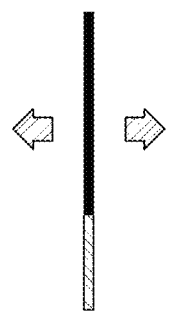
FIG. 10 illustrates slot antenna structures having various shapes according to the present disclosure.
Figure 10:
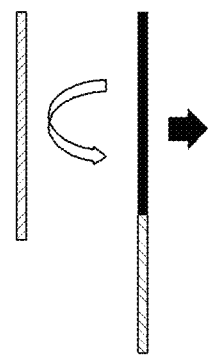
Figure 10:
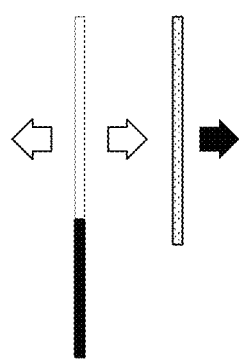
Figure 10:
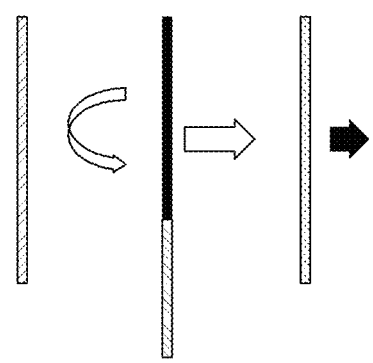
Figure 10:
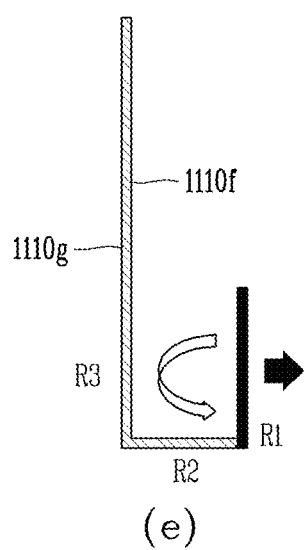
Figure 10:
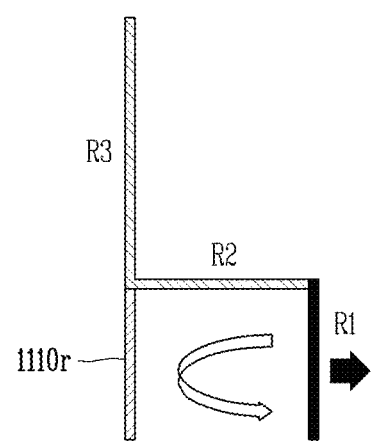

An antenna module implemented on a flexible substrate disclosed herein may be provided to have a J-shape other than a U-shape as described above. In relation to this, FIG. 10 illustrates slot antenna structures having various shapes disclosed herein. In relation to this, (a) of FIG. 10 illustrates a slot antenna and a feeding portion both arranged on one plane. Accordingly, an antenna beam may be bidirectionally dispersed through the slot antenna. Accordingly, when the slot antenna is used without a separate metal reflector/director in a mmWave band, an antenna beam may be bidirectionally dispersed. Accordingly, when a slot antenna structure shown in (a) of FIG. 10 is arranged on an electronic device, a beam may be radiated toward a front direction and a rear direction of the electronic device.

Referring to (b) of FIG. 10, a metal reflector may be located at one side of the slot antenna to concentrate an antenna beam in one direction. Referring to (c) of FIG. 10, a director may be located at one side of the slot antenna to concentrate an antenna beam in one direction. In addition, referring to (d) of FIG. 10, a metal reflector may be located at one side of the slot antenna and a director at another side to further concentrate an antenna beam in one direction.

Referring to FIGS. 5 to 9 and (e) of FIG. 10, a flexible substrate may be provided to have a bending structure including the first to third regions R1 to R3, and the feeding portion 1110f or the ground surface 1110g of a surface facing the feeding portion 1110f may be provided as a metal reflector. Accordingly, a rear radiation signal of the slot array antenna 1100 may be radiated by a ground region near the feeding portion 1110f provided in the third region R3 of the flexible substrate. Accordingly, a rear radiation signal of the slot array antenna 1100 may become a signal in phase with a front radiation signal, and thus, an antenna beam gain in a front direction may be increased. That is, a U-shape antenna structure disclosed herein is provided to use a structural advantage of a dielectric film such as a flexible substrate. Accordingly, a beam having bidirectional characteristics may be concentrated in one direction using a ground region near the feeding portion 1110f as a reflector by bending an FPCB.

Referring to FIGS. 5 to 9 and (f) of FIG. 10, the first region R1 on the flexible substrate may be provided from the second region R2 in a downward direction not to overlap the third region R3 of the flexible substrate. In relation to this, a rear radiation signal radiated toward the third region R3 through respective slot radiation elements of the slot array antenna may be reflected by a reflector 1100r to be radiated toward the first region R1, the reflector 1100r being provided in a rear region separately from the third region R3.

In relation to this, a separation distance between the first region R1 and the reflector 1100r of the flexible substrate may be determined as being within a certain range of ¼ of a cycle of an operation wavelength of a mmWave band signal. Here, "¼ of a cycle of an operation wavelength" means that a distance between the slot array antenna 1110 or 1110b and the ground pattern 1110g or 1110gb is $\lambda/4 + n\lambda/2$ (n=0, 1, 2, 3, . . . ). Accordingly, a rear radiation signal radiated toward the third region R3 and a front radiation signal radiated toward the first region R1 may be propagated in-phase with each other, the first region R1 and the third R3 being located in the flexible substrate on which the slot array antenna 1110 or 1110b is provided.

An antenna module disclosed herein may be configured to have a beam radiation direction different from that of a horizontally/vertically polarized antenna to enable communication regardless of a location and a direction of other electronic devices. In addition, the antenna module disclosed herein may be configured to have a beam radiation direction different from that of a horizontally/vertically polarized antenna to perform dual connectivity (DC) and/or MIMO.

Figure 11A:
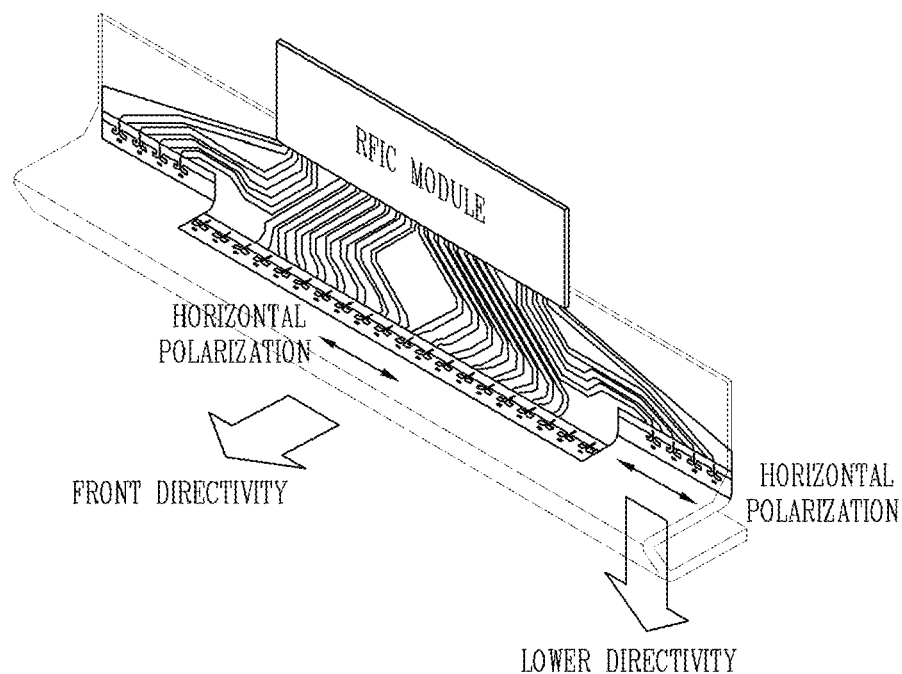
FIGS. 11A to 11O illustrate configurations of antenna modules according to other embodiments.
Figure 11A:
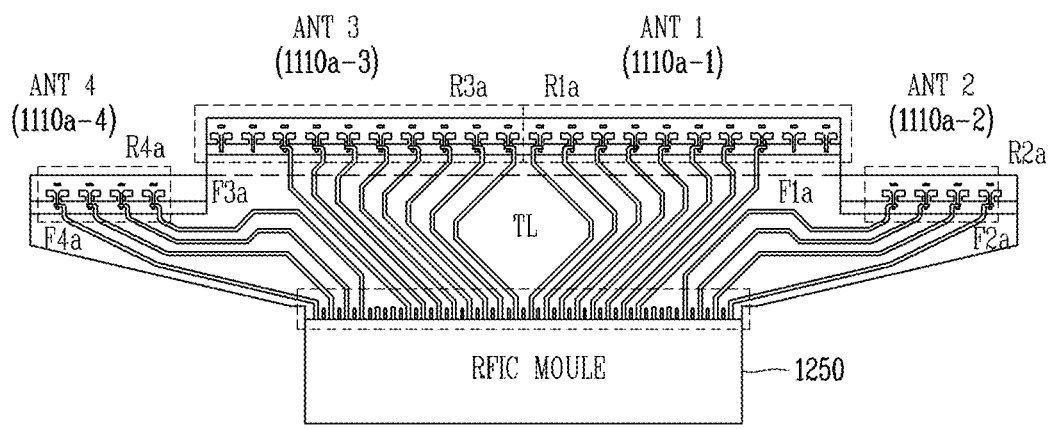
Figure 11B:
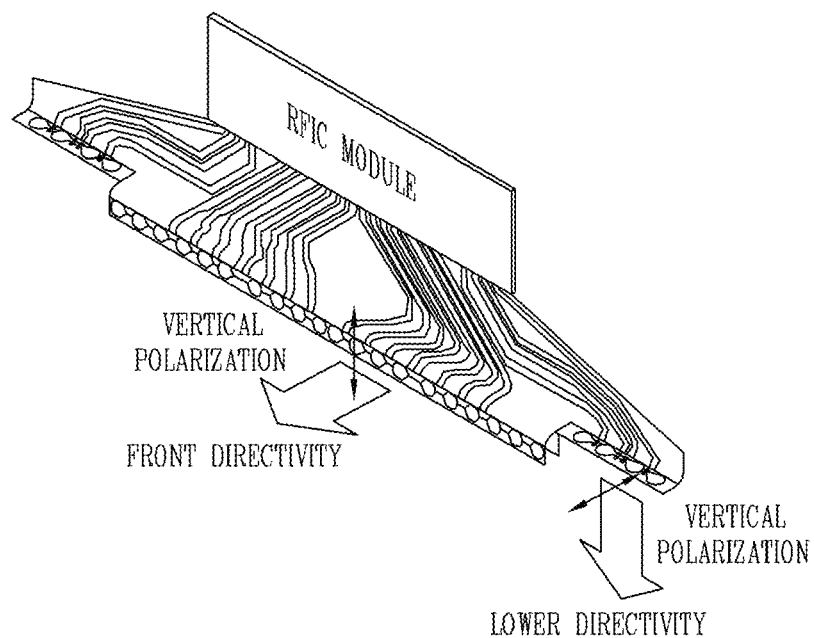
Figure 11B:
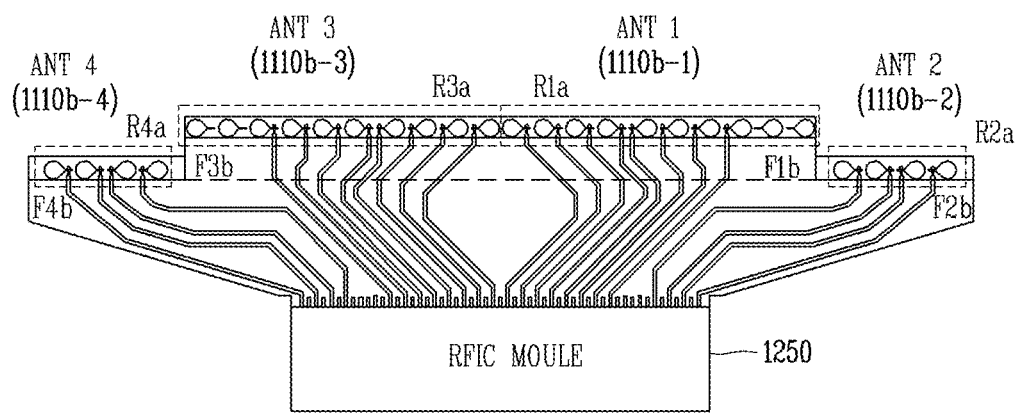
Figure 11C:
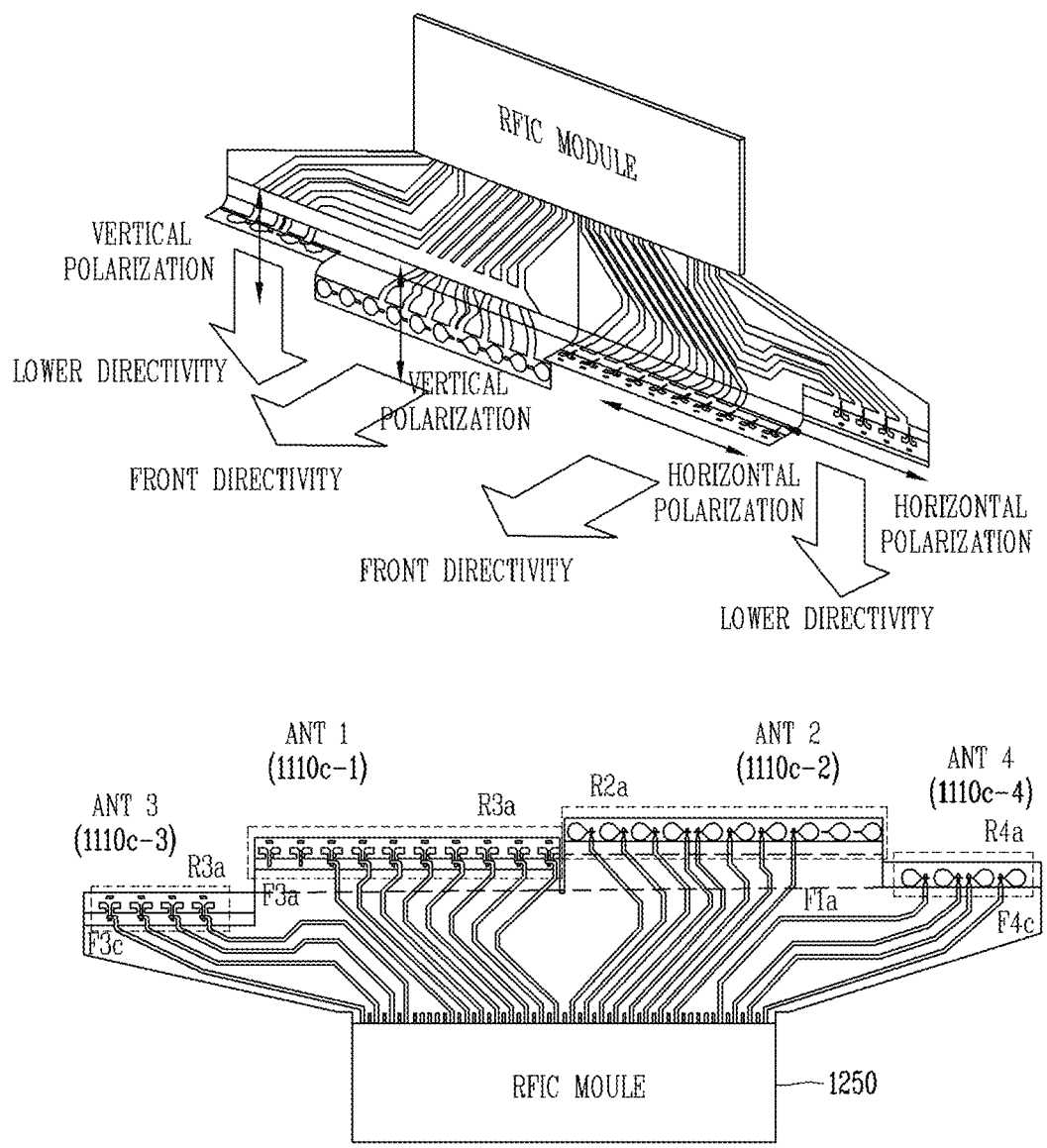

In relation to this, the antenna module 1100 disclosed herein may be configured such that a plurality of array antennas are arranged on a flexible substrate corresponding to an antenna substrate. In relation to this, FIGS. 11A to 11C illustrate configurations of antenna modules according to other embodiments. That is, FIGS. 11A to 11C illustrate configurations of a plurality of antenna modules coupled to an RFIC module according to other embodiments.

In detail, FIG. 11A illustrates a flexible substrate having a bent shape so that a plurality of array antennas configured to radiate a horizontally polarized signal direct a beam in a front direction or a lower direction. FIG. 11B illustrates a flexible substrate having a bent shape so that a plurality of array antennas configured to radiate a vertically polarized signal direct a beam in a front direction or a lower direction. FIG. 11C illustrates a flexible substrate having a bent shape so that a plurality of array antennas configured to radiate a horizontally polarized signal and a vertically polarized signal direct a beam in a front direction or a lower direction.

Figure 12A:
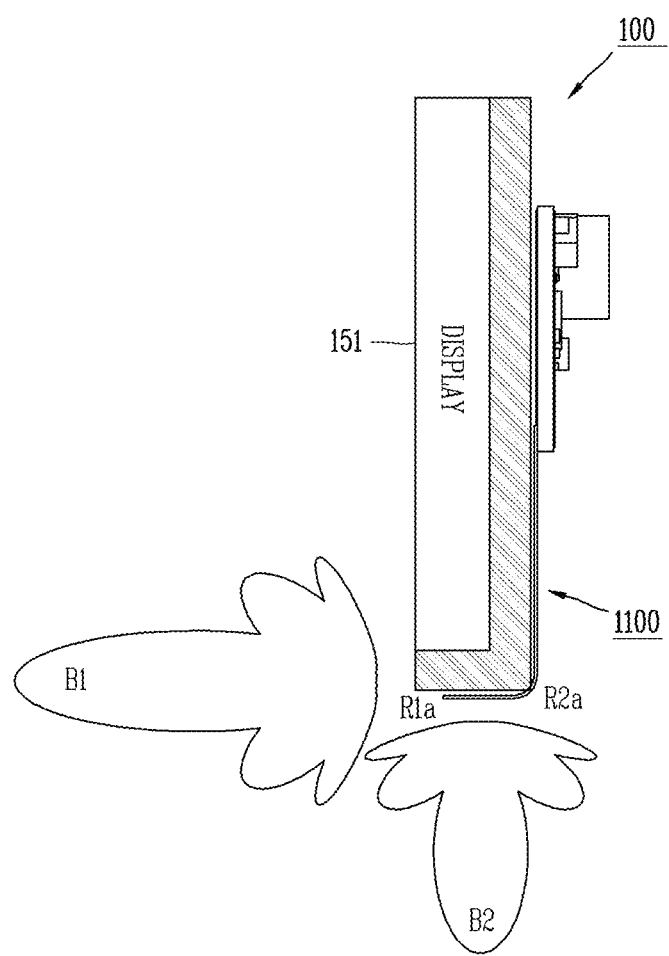
FIGS. 12A to 12C illustrate configurations in which the antenna modules of FIGS. 11A to 11C are arranged in an electronic device through a circuit substrate.
Figure 12B:
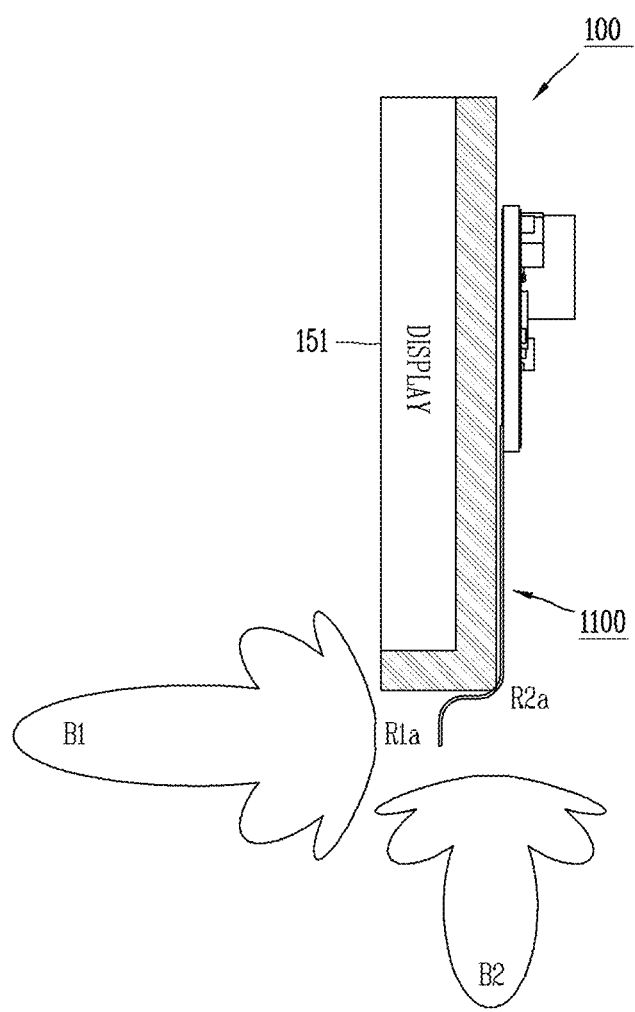
Figure 12C:
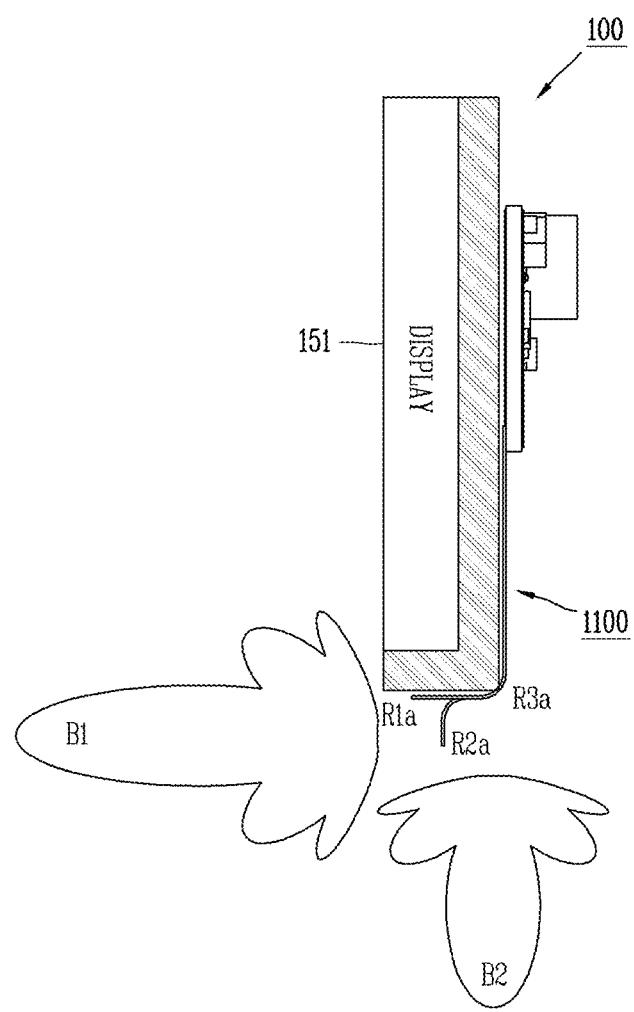

FIGS. 12A to 12C illustrate configurations in which the antenna modules of FIGS. 11A to 11C are arranged in an electronic device through a circuit substrate. Referring to FIG. 12A, a first beam B1 in a front direction and a second beam B2 in a lower direction may be generated through the antenna module of FIG. 11A. In relation to this, the antenna module 1100 may be arranged in a frame supporting the display 151. In other words, the antenna module 1100 may be arranged to be directed toward a rear surface of the electronic device 100. Referring to FIGS. 11A and 12A, the first beam B1 may be generated through a first array antenna ANT1 (1110a-1) on a first region R1a that is bent. In addition, the second beam B2 may be generated through a second array antenna ANT2 (1110a-2) in a second region R2a.

Accordingly, array antennas having end-fire radiation characteristics and operating in horizontal polarization are arranged in a stepped portion of one side/both sides of a low-loss flexible substrate. In relation to this, the array antennas operating in horizontal polarization may be transparent Yagi (dipole or Vivaldi (tapered slot antennas)) array antennas. An antenna module may be arranged on a first surface obtained by being bent at a right angle along a bending line to be vertical to a front surface, and a second surface horizontal to the front surface. An antenna arranged on the first surface shows front directivity, and an antenna arranged on a second surface shows lower directivity. The first and second array antennas ANT1 (1110a-1) and ANT2 (1110a-2) are configured as horizontally polarized array antenna modules.

Referring to FIG. 12B, the first beam B1 in a front direction and the second beam B2 in a lower direction may be generated through the antenna module of FIG. 11B. In relation to this, the antenna module 1100 may be arranged in a frame supporting the display 151. In other words, the antenna module 1100 may be arranged to be directed toward a rear surface of the electronic device 100. Referring to FIGS. 11B and 12B, the first beam B1 may be generated through the first array antenna ANT1 (1110b-1) in the bended first region R1a. In addition, the second beam B2 may be generated through the second array antenna ANT2 (1110b-2) in the second region R2a.

Accordingly, array antennas having broadside radiation characteristics and operating in vertical polarization are arranged in a stepped portion of one side/both sides of a low-loss flexible substrate. In relation to this, array antennas operating in vertical polarization may be transparent slot array antennas (or patch array antennas). A three-dimensional (3D) antenna module may be configured to be provided with a first surface vertical to a front surface and a second surface horizontal to the front surface by performing bending by 90 degrees along a first bending line and by −90 degrees along a second bending line. An array antenna arranged on the first surface may be configured as a vertically polarized array antenna module showing front directivity, and an array antenna arranged on the second surface may be configured as a vertically polarized antenna module showing lower directivity.

Referring to FIG. 12C, the first beam B1 in a front direction and the second beam B2 in a lower direction may be generated through the antenna module of FIG. 11C. In relation to this, the antenna module 1100 may be arranged in a frame supporting the display 151. In other words, the antenna module 1100 may be arranged to be directed toward a rear surface of the electronic device 100. Referring to FIGS. 11C and 12C, the first beam B1 may be generated through the first array antenna ANT1 (1110b-1) in the bended first region R1a. In addition, the second beam B2 may be generated through the second array antenna ANT2 (1110b-2) in the second region R2a that is bent.

Accordingly, an array antenna having end-fire radiation characteristics and operating in a horizontal polarization, and an array antenna having broadside radiation characteristics and operating in vertical polarization are arranged in a stepped portion of one side/both sides of a low-loss flexible substrate. A 3D antenna module may be configured to be provided with a first surface vertical to a front surface and a second surface horizontal to the front surface by performing bending by 90 degrees along a first bending line and by −90 degrees along a second bending line, and a third surface horizontal to the front surface and a fourth surface vertical to the front surface by performing bending by −90 degrees along a third bending line. An antenna arranged on the first surface has vertical polarization characteristics having front directivity. An antenna arranged on the second surface has vertical polarization characteristics having lower directivity. In addition, an antenna arranged on the third surface has horizontal polarization characteristics having front directivity, and an antenna arranged on the fourth surface has lower directivity characteristics. Accordingly, an antenna module configured to cover a front surface and a lower portion simultaneously and support vertical and horizontal polarizations simultaneously.

The antenna module of FIGS. 5 to 12C described herein is provided to achieve purposes of the present disclosure described below.

An array antenna module capable of implementing antenna directivity in various directions may be provided to enhance transmitting and receiving coverage in consideration of characteristics of a millimeter wave band having strong linearity.

An ultra-thin low-profile antenna structure free from space and design restraints of an equipped device may be provided.

An orthogonally polarized (vertical/horizontal) MIMO antenna having a broadband antenna technology for large-capacity data transmission and configured to increase throughput may be implemented.

An antenna module having vertical/horizontal/vertical and horizontal polarization and various radiation directions may be provided by using an RF module including an RFIC in common and replacing only an antenna and a feeding line.

Referring to FIGS. 5 to 12C, the electronic device 100 may be configured to include the display 151 and the antenna module 1100. The display 151 is provided on a front surface of the electronic device 100 and configured to display information on a screen. The antenna module 1100 is arranged on a side surface of the electronic device 100 or on the display 151, and may be configured to radiate a specific-directional polarized signal in the front or side direction of the electronic device 100.

The antenna module 1100 may be configured to include the first array antenna ANT1 and the second array antenna ANT2.

The first array antenna ANT1 may be arranged in a first region of a flexible substrate to radiate a signal in a mmWave band, and configured to provide a beam in a first direction. The second array antenna ANT2 may be arranged in a second region adjacent to the first region, and configured to provide a beam in a second direction. The first region of the flexible substrate may be provided to be bent with respect to the second region at a predetermined angle.

Referring to FIGS. 11A to 12C, the antenna module described herein may be configured such that an antenna may be mounted on a non-conductive material surface of an electronic device where it is difficult to ensure a space. The antenna module is implemented on one flexible substrate and provided by performing bending along one or more lines. Accordingly, the antenna module may be implemented as a horizontally/vertically/horizontally and horizontally polarized antenna module having an extended coverage according to a direction of a bent surface and a radiation pattern of an antenna. In addition, the antenna module may implement directivity of an antenna toward front, rear, and side surfaces by arranging an antenna on different bent surfaces of a flexible substrate using characteristics of the flexible substrate that may be easily bent.

Technical effects that may be achieved using the antenna module described herein are described below, but are not limited thereto. The antenna module described herein may have an extended coverage toward front, rear, and side surfaces, and simultaneously, be implemented to have double (horizontal/vertical) polarization to embody improved transmitting and receiving performances. Since an antenna element of the antenna module is transparent and the antenna module is arranged in a curved region according to a shape of a device, the antenna module may be equipped on a non-conductive material surface (glass, a dielectric cover, etc.) of the device to minimize a design change. In addition, since an antenna may be manufactured separately on a flexible substrate and coupled to another module, the antenna may be variously modified and implemented according to applications.

To achieve the purpose, technical features, and technical effects described above, the antenna module described herein may be configured as illustrated in FIGS. 11A to 12C.

Referring to FIGS. 11A and 12A, the first array antenna ANT1 (1110a-1) may be arranged in the first region R1a and provide a first beam directed toward a first direction (a front direction) and having horizontal polarization. The second array antenna ANT2 (1110a-2) may be arranged in a second region R2a and provide a second beam directed toward a second direction (a lower direction) and having horizontal polarization.

Radiating elements, i.e., antenna elements of the first array antenna ANT1 (1110a-1) and the second array antenna ANT2 (1110a-2) may be end-fire radiating elements configured to provide an antenna beam in a direction parallel to a flexible substrate. An end-fire radiating element may be a dipole/monopole antenna or a Yagi-dipole/monopole antenna, but is not limited thereto. As described above, the first array antenna ANT1 (1110a-1) and the second array antenna ANT2 (1110a-2) may operate in horizontal polarization.

A first feeding portion Fla arranged in the first region R1a is arranged in a bended region obtained by bending at a predetermined angle, and the first array antenna ANT1 (1110a-1) arranged in the first region R1a may provide a beam in a front direction. A second feeding portion F2a arranged in the second region R2a may be connected to the second array antenna ANT2 (1110a-2) arranged in the second region R2a, and the second array antenna ANT2 (1110a-2) may provide a beam in a lower direction.

The antenna module 1100 may be configured to further include a third array antenna ANT3 (1110a-3) and a fourth array antenna ANT4 (1110a-4). The third array antenna ANT3 (1110a-3) may be arranged in the first region Ria of the flexible substrate and provide a third beam directed toward the first direction (the front direction) and having horizontal polarization. The fourth array antenna ANT4 (1110a-4) may be arranged in the second region R2a and provide a fourth beam directed toward the second direction (the lower direction) and having horizontal polarization.

Radiating elements, i.e., antenna elements of the third array antenna ANT3 (1110a-3) and the fourth array antenna ANT4 (1110a-4) may be end-fire radiating elements configured to provide an antenna beam in a direction parallel to the flexible substrate. An end-fire radiating element may be a dipole/monopole antenna or a Yagi-dipole/monopole antenna, but is not limited thereto. As described above, the third array antenna ANT3 (1110a-3) and the fourth array antenna ANT4 (1110a-4) may operate in horizontal polarization.

The third array antenna ANT3 (1110a-3) and the fourth array antenna ANT4 (1110a-4) may be arranged to have a form symmetrical to that of the first array antenna ANT1 (1110a-1) and the second array antenna ANT2 (1110a-2) with reference to the RFIC module 1250.

MIMO may be performed with a peripheral device through the first array antenna ANT1 (1110a-1) and the second array antenna ANT2 (1110a-2). Alternatively, MIMO may be performed with a peripheral device through the third array antenna ANT3 (1110a-3) and the fourth array antenna ANT4 (1110a-4). As an example, when the first array antenna ANT1 (1110a-1) and the second array antenna ANT2 (1110a-2) transmit a signal, the third array antenna ANT3 (1110a-3) and the fourth array antenna ANT4 (1110a-4) may receive the signal. As another example, when the first array antenna ANT1 (1110a-1) and the second array antenna ANT2 (1110a-2) receive a signal, the third array antenna ANT3 (1110a-3) and the fourth array antenna ANT4 (1110a-4) may transmit a signal. In relation to this, the RFIC module 1250 may be controlled not to receive a signal while the RFIC module 1250 is transmitting a signal.

A state of connection with a plurality of peripheral electronic devices may be maintained through a plurality of array antennas. In relation to this, a state of connection with a first device is maintained using a beam directed toward in a front direction, and a state of connection with a second device may be maintained using a beam directed toward a lower direction. As an example, communication with the first device may be performed through the first array antenna ANT1 (1110a-1) or the third array antenna ANT3 (1110a-3). Communication with the second device may be performed through the second array antenna ANT2 (1110a-2) or the fourth array antenna ANT4 (1110a-4).

Meanwhile, while a state of connection with a plurality of peripheral electronic devices is maintained through a plurality of array antennas, MIMO may be performed with each of the peripheral electronic devices. As an example, MIMO with a first device may be performed through the first array antenna ANT1 (1110a-1) and the third array antenna ANT3 (1110a-3). Alternatively, MIMO may be performed with a second device through the second array antenna ANT2 (1110a-2) and the fourth array antenna ANT4 (1110a-4).

In relation to dual connectivity (DC)+MIMO operations, a peripheral electronic device may provide a plurality of beams in different directions. Accordingly, an electronic device may perform DC+MIMO operation with the first device through antenna beams in different directions. In addition, the electronic device may perform DC+MIMO operation with the second device through antenna beams in different directions. As an example, while MIMO is performed with the first device through the first array antenna ANT1 (1110a-1) and the second array antenna ANT2 (1110a-2), MIMO may be performed with the second device through the third array antenna ANT3 (1110a-3) and the fourth array antenna ANT4 (1110a-4). As another example, a configuration of an array antenna may be changed to enhance isolation between MIMO streams. In relation to this, while MIMO is performed with the first device through the first array antenna ANT1 (1110a-1) and the fourth array antenna ANT4 (1110a-4), MIMO may be performed with the second device through the second array antenna ANT2 (1110a-2) and the third array antenna ANT3 (1110a-3).

Referring to FIG. 11B, the first array antenna ANT1 (1110b-1) may be arranged in a first region R1b and provide a first beam directed toward a first direction (a front direction) and having vertical polarization. The second array antenna ANT2 (1110b-2) may be arranged in a second region R2b and provide a second beam directed toward a second direction (a lower direction) and having vertical polarization.

Radiating elements, i.e., antenna elements of the first array antenna ANT1 (1110b-1) and the second array antenna ANT2 (1110b-2) may be broadside radiating elements configured to provide an antenna beam in a direction vertical to a flexible substrate. A broadside radiating element may be a slot radiating element, but is not limited thereto. As described above, the first array antenna ANT1 (1110a-1) and the second array antenna ANT2 (1110a-2) may operate in vertical polarization.

The first feeding portion F1a arranged in the first region R1b is arranged in a bended region bended at a predetermined angle, and the first array antenna ANT1 (1110b-1) arranged in the first region R1b may provide a beam in a front direction. The second feeding portion F2b arranged in the second region R2a may be connected to the second array antenna ANT2 (1110b-2) arranged in the second region R2b, and the second array antenna ANT2 (1110a-2) may provide a beam in a lower direction.

In relation to this, the first region R1b and the second region R2b may be provided to be bent with respect to the flexible substrate at different angles. In detail, the first feeding portion F1b in the first region R1b may be arranged in a bended region bended twice substantially at 90 degrees. The second feeding portion F2b in the second region R2b may be arranged in a bended region bended substantially at 90 degrees.

The third array antenna ANT3 (1110b-3) and the fourth array antenna ANT4 (1110b-4) may be arranged to have a form symmetrical to that of the first array antenna ANT1 (1110b-1) and the second array antenna ANT2 (1110b-2) with reference to the RFIC module 1250.

MIMO may be performed with a peripheral device through the first array antenna ANT1 (1110b-1) and the second array antenna ANT2 (1110b-2). Alternatively, MIMO may be performed with a peripheral device through the third array antenna ANT3 (1110b-3) and the fourth array antenna ANT4 (1110b-4). As an example, when the first array antenna ANT1 (1110b-1) and the second array antenna ANT2 (1110b-2) transmit a signal, the third array antenna ANT3 (1110b-3) and the fourth array antenna ANT4 (1110b-4) may receive the signal. As another example, when the first array antenna ANT1 (1110b-1) and the second array antenna ANT2 (1110b-2) receive a signal, the third array antenna ANT3 (1110b-3) and the fourth array antenna ANT4 (1110b-4) may transmit a signal. In relation to this, the RFIC module 1250 may be controlled not to receive a signal while the RFIC module 1250 is transmitting a signal.

A state of connection with a plurality of peripheral electronic devices may be maintained through a plurality of array antennas. In relation to this, a state of connection with a first device is maintained using a beam directed toward in a front direction, and a state of connection with a second device may be maintained using a beam directed toward a lower direction. As an example, communication with the first device may be performed through the first array antenna ANT1 (1110*b*-1) or the third array antenna ANT3 (1110*b*-3). Communication with the second device may be performed through the second array antenna ANT2 (1110*b*-2) or the fourth array antenna ANT4 (1110*b*-4).

Meanwhile, while a state of connection with a plurality of peripheral electronic devices is maintained through a plurality of array antennas, MIMO may be performed with each of the peripheral electronic devices. As an example, MIMO may be performed with the first device through the first array antenna ANT1 (1110*b*-1) or the third array antenna ANT3 (1110*b*-3). Alternatively, MIMO may be performed with a second device through the second array antenna ANT2 (1110*b*-2) or the fourth array antenna ANT4 (1110*b*-4).

In relation to dual connectivity (DC)+MIMO operations, a peripheral electronic device may provide a plurality of beams in different directions. Accordingly, an electronic device may perform DC+MIMO operation with the first device through antenna beams in different directions. In addition, the electronic device may perform DC+MIMO operation with the second device through antenna beams in different directions. As an example, while MIMO is performed with the first device through the first array antenna ANT1 (1110*b*-1) and the second array antenna ANT2 (1110*b*-2), MIMO may be performed with the second device through the third array antenna ANT3 (1110*b*-3) and the fourth array antenna ANT4 (1110*b*-4). As another example, a configuration of an array antenna may be changed to enhance isolation between MIMO streams. In relation to this, while MIMO is performed with the first device through the first array antenna ANT1 (1110*b*-1) and the fourth array antenna ANT4 (1110*b*-4), MIMO may be performed with the second device through the second array antenna ANT2 (1110*b*-2) and the third array antenna ANT3 (1110*b*-3).

Referring to FIG. 11C, the first array antenna ANT1 (1110*c*-1) may be arranged in a first region R1*c* and provide a first beam directed toward a first direction (a front direction) and having horizontal polarization. The second array antenna ANT2 (1110*c*-2) may be arranged in a second region R2*c* and provide a second beam directed toward a first direction (a front direction) and having vertical polarization. That is, the first array antenna ANT1 (1110*c*-1) and the second array antenna ANT2 (1110*c*-2) may operate in horizontal polarization and vertical polarization, respectively.

In relation to this, an antenna element of the first array antenna ANT1 (1110*c*-1) may be an end-fire radiating element. In addition, the second array antenna ANT2 (1110*c*-2) may be a broadside radiating element. As an example, an antenna element of the first array antenna ANT1 (1110*c*-1) may be a dipole radiating element, and an antenna element of the second array antenna ANT2 (1110*c*-2) may be a slot radiating element.

The first feeding portion F1*c* arranged in the first region R1*c* is arranged in a bended region bended at a predetermined angle, and the first array antenna ANT1 (1110*c*-1) arranged in the first region R1*c* may provide a beam in a front direction. A second feeding portion F2*c* arranged in the second region R2*a* may be connected to the second array antenna ANT2 (1110*c*-2) arranged in the second region R2*c*, and the second array antenna ANT2 (1110*c*-2) may provide a beam in a lower direction.

In relation to this, the first region R1*b* and the second region R2*b* may be provided to be bent with respect to the flexible substrate at different angles. In detail, the first feeding portion F1*c* arranged in the first region R1*c* may be arranged in a bended region bended substantially at 90 degrees. The second feeding portion F2*b* in the second region R2*b* may be arranged in a bended region bended twice substantially at 90 degrees.

The antenna module 1100 may be configured to further include the third array antenna ANT3 (1110*c*-3) adjacent to the first array antenna ANT1 (1110*c*-1) and the fourth array antenna ANT4 (1110*c*-4) adjacent to the second array antenna ANT2 (1110*c*-2). That is, the third array antenna ANT3 (1110*c*-3) and the fourth array antenna ANT4 (1110*c*-4) may operate in horizontal polarization and vertical polarization, respectively.

The third array antenna ANT3 (1110*c*-3) may be arranged in the third region R3*c* and provide a third beam directed toward a second direction (a lower direction) and having horizontal polarization. The fourth array antenna ANT4 (1110*c*-4) may be arranged in the fourth region R4*c* and provide a fourth beam directed toward a second direction (a lower direction) and having vertical polarization. In relation to this, the first array antenna ANT1 (1110*c*-1) and the second array antenna ANT2 (1110*c*-2) may provide a beam in a front direction. On the other hand, the third array antenna ANT3 (1110*c*-3) and the fourth array antenna ANT4 (1110*c*-4) may provide a beam in a lower direction.

An antenna element of the third array antenna ANT3 (1110*c*-3) may be an end-fire radiating element. In addition, the fourth array antenna ANT4 (1110*c*-4) may be a broadside radiating element. As an example, an antenna element of the third array antenna ANT3 (1110*c*-3) may be a dipole radiating element, and an antenna element of the fourth array antenna ANT4 (1110*c*-4) may be a slot radiating element.

The third array antenna ANT3 (1110*c*-3) arranged in the third region R3*c* and connected to the third feeding portion F3*c* may provide a beam in a lower direction. The fourth feeding portion F4*c* arranged in the fourth region R4*c* may be connected to the fourth array antenna ANT4 (1110*c*-4) arranged in the fourth region R4*c*, and the fourth array antenna ANT4 (1110*c*-4) may provide a beam in a lower direction.

In relation to this, the third region F3*c* may be provided not to be bent with respect to the flexible substrate. On the other hand, the fourth region F4*c* may be provided to be bent with respect to the flexible substrate at a predetermined angle. In detail, the fourth feeding portion F4*c* in the fourth region R4*c* may be arranged in a bended region bended substantially at 90 degrees.

In relation to a configuration of an antenna of FIG. 11C, the first array antenna ANT1 (1110*c*-1) and the second array antenna ANT2 (1110*c*-2) may provide a beam in a front direction. On the other hand, the third array antenna ANT3 (1110*c*-3) and the fourth array antenna ANT4 (1110*c*-4) may provide a beam in a lower direction.

In relation to a bending structure of the flexible substrate of FIG. 11C, the first array antenna ANT1 (1110*c*-1) and the fourth array antenna ANT4 (1110*c*-4) may be arranged in a bended region bended substantially at 90 degrees. The second array antenna ANT2 (1110*c*-2) may be arranged in a bended region further bended substantially at 90 degrees with respect to a region in which the first array antenna ANT1 (1110*c*-1) is arranged.

MIMO may be performed with a peripheral device through the first array antenna ANT1 (1110*c*-1) and the second array antenna ANT2 (1110*c*-2). Alternatively, MIMO may be performed with a peripheral device through the third array antenna ANT3 (1110*c*-3) and the fourth array antenna ANT4 (1110*c*-4).

A state of connection with a plurality of peripheral electronic devices may be maintained through a plurality of array antennas. In relation to this, a state of connection with a first device is maintained using a beam directed toward in a front direction, and a state of connection with a second device may be maintained using a beam directed toward a lower direction. As an example, communication with the first device may be performed through the first array antenna ANT1 (1110c-1) or the second array antenna ANT2 (1110c-2). Communication with the second device may be performed through the third array antenna ANT3 (1110c-3) or the fourth array antenna ANT4 (1110c-4).

Meanwhile, while a state of connection with a plurality of peripheral electronic devices is maintained through a plurality of array antennas, MIMO may be performed with each of the peripheral electronic devices. As an example, MIMO may be performed with the first device through the first array antenna ANT1 (1110c-1) or the second array antenna ANT2 (1110c-2). Alternatively, MIMO may be performed with the second device through the third array antenna ANT3 (1110c-3) or the fourth array antenna ANT4 (1110c-4).

In relation to dual connectivity (DC)+MIMO operations, a peripheral electronic device may provide a plurality of beams in different directions. Accordingly, an electronic device may perform DC+MIMO operation with the first device through antenna beams in different directions. In addition, the electronic device may perform DC+MIMO operation with the second device through antenna beams in different directions. As an example, while MIMO is performed with the first device through the first array antenna ANT1 (1110c-1) and the third array antenna ANT3 (1110cb-3), MIMO may be performed with the second device through the second array antenna ANT2 (1110c-2) and the fourth array antenna ANT4 (1110b-4).

As another example, a configuration of an array antenna may be changed to enhance isolation between MIMO streams. In relation to this, while MIMO is performed with the first device through the first array antenna ANT1 (1110b-1) and the fourth array antenna ANT4 (1110b-4), MIMO may be performed with the second device through the second array antenna ANT2 (1110b-2) and the third array antenna ANT3 (1110b-3). When MIMO is performed through the first array antenna ANT1 (1110b-1) and the fourth array antenna ANT4 (1110b-4), beam directions and polarizations are different, and thus, isolation between MIMO streams is enhanced. In addition, when MIMO is performed through the second array antenna ANT2 (1110b-2) and the third array antenna ANT3 (1110b-3), beam directions and polarizations are different, and thus, isolation between MIMO streams is enhanced.

Subject matters to be claimed with respect to the antenna module 1100 that may be implemented in various configurations of FIGS. 11A to 11C as described above are summarized below, but are not limited thereto.

1) A horizontally/vertically/horizontally and vertically polarized antenna module implemented on one flexible substrate, and having a coverage extended according to a direction of a bended surface provided to be bended along one or more lines and a radiation pattern of an antenna.

2) A horizontally polarized antenna module arranged on a first bended surface horizontal to a front surface to have front directivity, and arranged on a second bended surface vertical to the front surface to have lower directivity.

3) A vertically polarized antenna module arranged on a first bended surface vertical to a front surface to have front directivity, and arranged on a second bended surface horizontal to the front surface to have lower directivity.

4) An antenna module including a vertically polarized array antenna arranged on a first bended surface vertical to a front surface and having front directivity, a horizontally polarized array antenna arranged on a second bended surface and having front directivity, a vertically polarized array antenna arranged on the second bended surface and having lower directivity, and a horizontally polarized array antenna arranged on a third bended surface vertical to the front surface and having lower directivity to thereby simultaneously cover the front surface and the lower portion and simultaneously support vertical polarization and horizontal polarization.

5) An array antenna module having a part of a same plane bended at 90 degrees and another part of the same plane bended at −90 degrees to implement front directivity and rear directivity 6) An array antenna module capable of providing left, right, and side directivity according to a direction of a bending line The antenna module 1100 described herein may be coupled to be operable with the transceiver circuit 1250 and the processor 1400. In relation to this, the antenna module 1100 may include a plurality of antenna modules arranged in different regions of an electronic device. A partial configuration of a transceiver circuit, and a processor may be arranged in an image display device. In relation to this, FIG. 13 illustrates a configuration of a plurality of antenna modules and a processor according to one embodiment.

Figure 13:
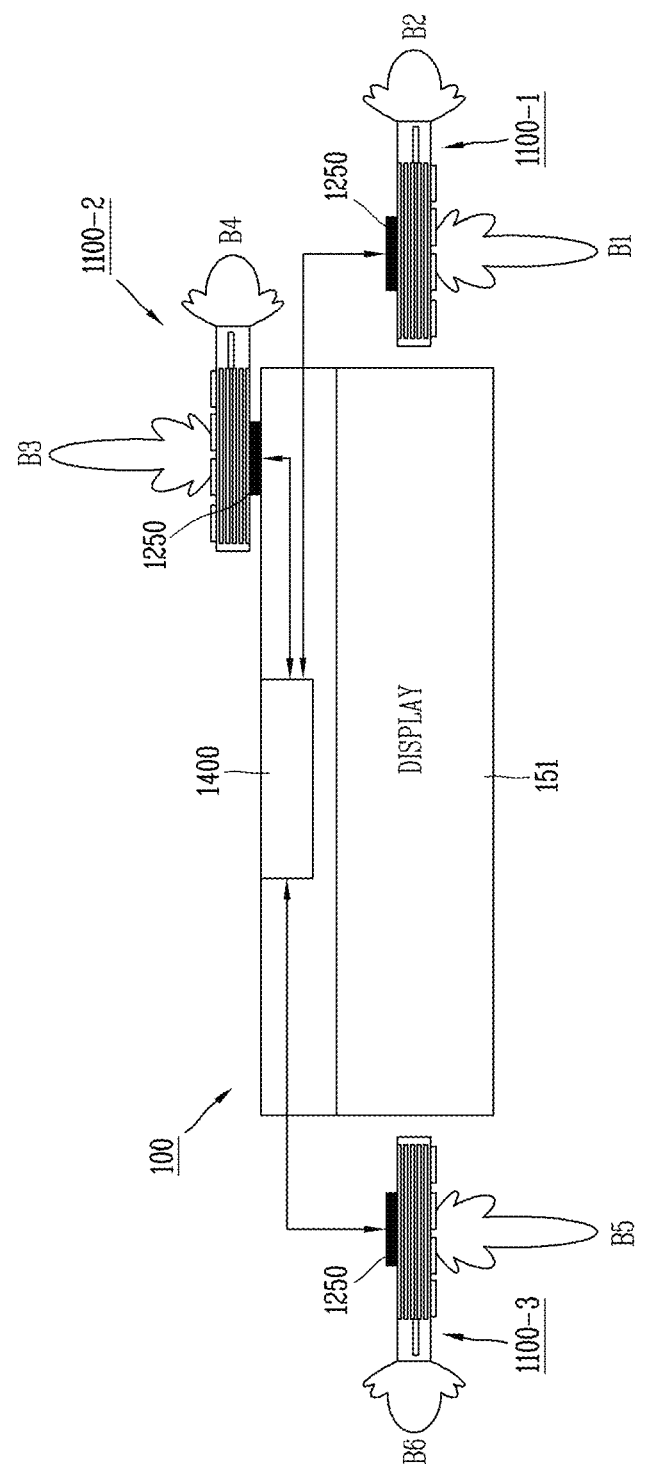
FIG. 13 illustrates a configuration of a plurality of antenna modules and a processor according to one embodiment.

Referring to FIG. 13, the first antenna module 1100-1 to the third antenna module 1100-3 may be arranged in different regions of an electronic device. In relation to this, an arrangement location and a number of antenna modules are not limited to those shown in FIG. 13, and may be variously changed according applications. The respective antenna modules of FIG. 13 may be configured as different types of array antennas, i.e., a first type array antenna having end-fire radiating characteristics and a second type array antenna having broad-side radiation characteristics, but are not limited thereto. As an example, the respective antenna modules may be configured as a same type of array antennas as illustrated in FIGS. 11A and 11B. In relation to this, radiating elements in the respective antenna modules are not limited to a patch antenna and a dipole/monopole antenna. In this case, the radiating elements in the respective antenna modules may be implemented as a slot radiating element and a Yagi antenna or a Vivaldi antenna.

The first beam B1 in a front direction and the second beam B2 in a lower direction may be generated through the first antenna module 1100-1. The second beam B2 in a rear direction and the fourth beam B4 in a lower direction may be generated through the second antenna module 1100-2. In addition, a fifth beam B5 in a front direction and a sixth beam B6 in an upper direction may be generated through the third antenna module 1100-3. However, a configuration of antenna arrangement and a number of beams are not limited thereto, and may be various changed according to applications. As an example, the second antenna module 1100-2 or the third antenna module 1100-3 may be configured as an array antenna in a form of a transparent electrode i a display region on not a rear surface but a front surface of an electronic device. In addition, one antenna module may be configured as two or more, e.g., four array antennas to provide 4 beams as illustrated in FIGS. 11A to 11C.

Referring to FIGS. 5 to 13, the electronic device 100 may further include the transceiver circuit 1250 and the processor 1400. The transceiver circuit 1250 may be coupled to be operable with the antenna module 1100. The processor 1400 may be coupled to be operable with the transceiver circuit 1250 to be configured to control the transceiver circuit 1250. In relation to this, the processor 1400 may be a baseband processor. However, the processor 1400 is not limited thereto, and may alternatively be any processor that controls the transceiver circuit 1250.

Figure 14A:
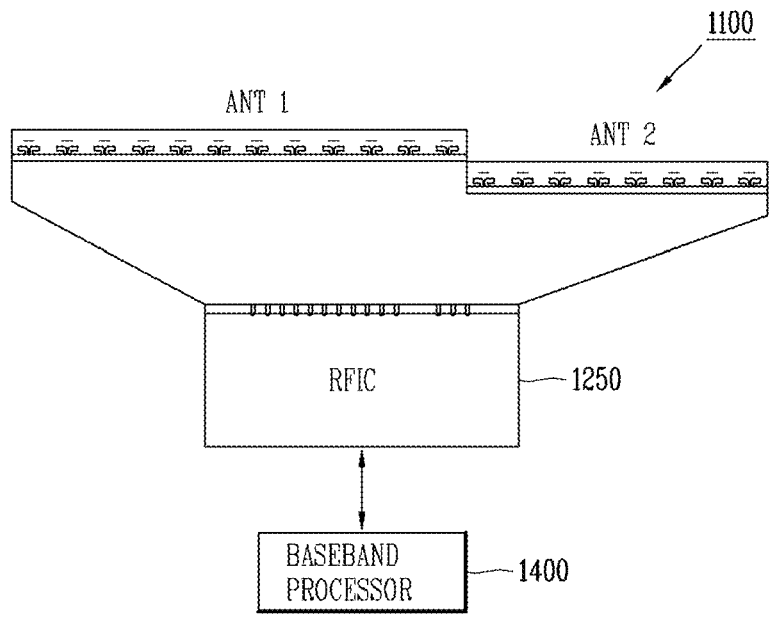
FIGS. 14A and 14B illustrates configurations of an antenna module and a radio frequency integrated chip (RFIC) module arranged on a flexible substrate according to various embodiments.
Figure 14B:
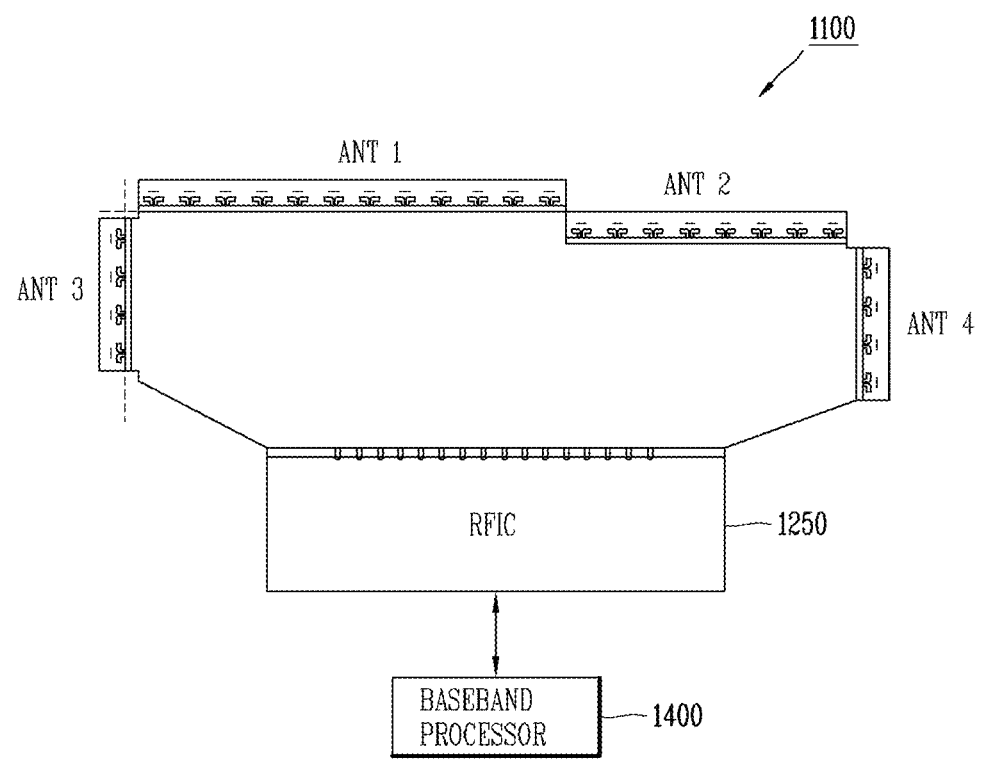

Meanwhile, as illustrated in FIG. 13, the processor 1400 may be configured to control the transceiver 1250 of each of the first antenna module 1100-1 to the third antenna module 1100-3. However, a configuration of the processor 1400 is limited thereto, and one processor may be configured to control one transceiver circuit 1250 as shown in FIGS. 14A and 14B.

Referring to FIGS. 11A to 13, the transceiver circuit 1250 may be coupled to be operable with the first array antenna ANT1 and the second array antenna ANT2 through a first feeding portion and a second feeding portion, respectively. The processor 1400 may be coupled to be operable with the transceiver circuit 1250 and configured to control the transceiver circuit 1250. In relation to this, when the first array antenna ANT1 and the second array antenna ANT2 generate different polarized signals, the processor 1400 may be configured to control the transceiver 1250 to perform MIMO through the first array antenna ANT1 and the second array antenna ANT2. Referring to FIG. 11C, MIMO or dual connection may be performed through antenna modules having different polarizations.

The transceiver circuit 1250 may be coupled to be operable with the first to fourth array antennas ANT1 to ANT4. The processor 1400 may control the transceiver circuit 1250 to transmit or receive a signal through the second array antenna ANT2 or the fourth array antenna ANT4 while transmitting or receiving a signal through the first array antenna ANT1 or the third array antenna ANT3. In relation to this, referring to FIGS. 11A and 11B, a signal may be transmitted or received through antenna modules having a same polarization, and MIMO or dual connection may be performed through antenna modules having different polarizations.

Meanwhile, antenna modules described herein may be arranged in different regions of a flexible substrate, e.g., on a front surface and a side surface. In relation to this, FIGS. 14A and 14B illustrate configurations of an antenna module and a radio frequency integrated chip (RFIC) module arranged on a flexible substrate according to various embodiments.

Referring to FIG. 14A, array antennas having a same polarization may be arranged on a front surface of the flexible substrate. Referring to FIG. 14B, array antennas having different polarizations may be arranged on a front surface and side surface of the flexible substrate.

Referring to FIG. 14A, the first array antenna ANT1 and the second array antenna ANT2 may be both arranged on a front surface of the flexible substrate and provide a first beam and a second beam having horizontal polarization. The first array antenna ANT1 and the second array antenna ANT2 may be arranged on a region of a front surface end portion of the flexible substrate. By differentiating positions of the front surface end portion of the flexible substrate, arrangement positions of the first array antenna ANT1 and the second array antenna ANT2 may be offset on one axis. A number and locations of antenna elements of the first array antenna ANT1 and the second array antenna ANT2 may vary according to a device environment and a configuration of transmitting and receiving ends of an RFIC. The processor 1400 may control the transceiver circuit 1250 to transmit a signal through one of the first array antenna ANT1 and the second array antenna ANT2 and receive a signal through another of the first array antenna ANT1 and the second array antenna ANT2.

Referring to FIGS. 14A and 14B, the antenna module 1100 may further include the third array antenna ANT3 and the fourth array antenna ANT4. The third array antenna ANT3 and the fourth array antenna ANT3 may be arranged on a side surface of the flexible substrate and provide a third beam and a fourth beam having vertical polarization. The third array antenna ANT3 and the fourth array antenna ANT4 may be arranged on a region of a side surface end portion of the flexible substrate. Respective antenna elements in a vertically polarized antenna arranged on a side surface are orthogonally arranged, compared to those in a horizontally polarized antenna arranged on a front surface. In addition, when the vertically polarized antenna arranged on a side surface is bended substantially at about 90 degrees, the vertically polarized antenna may operate as a front directional antenna. In addition, when the horizontally polarized antenna arranged on a front surface is bended substantially at about 90 degrees, the horizontally polarized antenna may operate as a front directional antenna.

Accordingly, by arranging a same type of antennas on front surface and side surface regions of the flexible substrate, the antenna module may be expanded to a horizontally/vertically dual polarized antenna module. In relation to this, the first to fourth array antennas ANT1 to ANT4 may be configured as end-fire radiating elements such as dipole or monopole elements. The processor 1400 may control the transceiver circuit 1250 to perform MIMO or dual connection through one of the first array antenna ANT1 and the second array antenna ANT2 and one of the third array antenna ANT3 and the fourth array antenna ANT4.

The transceiver circuit 1250 may be controlled to transmit a signal through one, and receive a signal through the other.

The antenna module described herein may be configured as a plurality of antenna modules, and a transceiver circuit and a processor may be operably coupled to each other to control the antenna modules. In relation to this, FIG. 15 illustrates a configuration of a plurality of antenna modules, a transceiver circuit, and a processor each implementable on a flexible substrate according to the present disclosure.

Referring to FIGS. 5 to 15, the electronic device 100 may include the antenna module 1100, the transceiver circuit 1250, and the processor 1400. The transceiver circuit 1250 may be coupled to be operable with the antenna module 1100. The processor 1400 may be coupled to be operable with the transceiver circuit 1250 to be configured to control the transceiver circuit 1250. In relation to this, the processor 1400 may be a baseband processor. However, the processor 1400 is not limited thereto, and may alternatively be any processor that controls the transceiver circuit 1250.

The antenna module 1100 may be configured to include the first antenna module 1100-1 and the second antenna module 1100-2. The first antenna module 1100-1 may be configured using the slot array antenna 1110 including a plurality of slot radiating elements configured to radiate vertically polarized signal toward a front direction of the electronic device 100, and the feeding portion 1110*f*, i.e., a first feeding portion. The second antenna module 1100-2 may be configured using an array antenna 1120 including a plurality of radiating elements configured to radiate horizontally polarized signals toward a front direction of the electronic device 100, and a second feeding portion 1120*f*.

Figure 15:
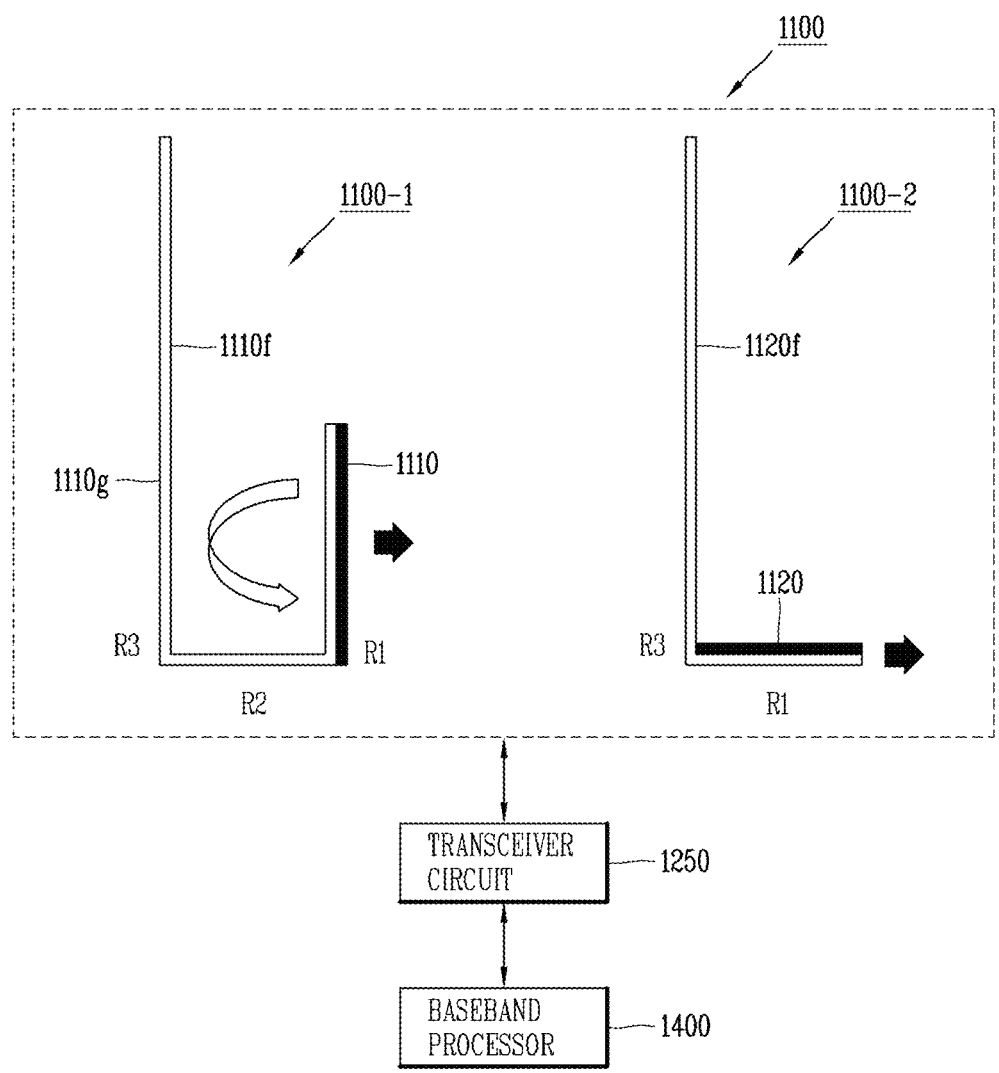
FIG. 15 illustrates a configuration of a plurality of antenna modules, a transceiver circuit, and a processor each implementable on a flexible substrate according to the present disclosure.

In relation to this, referring to FIGS. 11C and 15, the first antenna module 1100-1 and the second antenna module 1100-2 may correspond to the first array antenna ANT1 (1110*c*-1) and the second array antenna ANT2 (1110*c*-2), respectively, but is not limited thereto. The processor 1400 may control the transceiver circuit 1250 so that the first and second array antenna modules 1100-1 and 1100-2 transmit or receive signals through a same beam or different beams. In relation to this, when an electronic device performs MIMO with a peripheral set-top box or another electronic device, the processor 1400 may transmit or receive a signal through a same beam. Alternatively, when an electronic device performs DC operation with a peripheral set-top box and another electronic device simultaneously, the processor 1400 may transmit or receive a signal through different beams. However, even when an electronic device performs MIMO with one peripheral device, the processor 1400 may transmit or receive a signal through different beams.

The processor 1400 may control the transceiver circuit 1250 to beamform a vertically polarized signal by controlling a phase of a signal applied to respective slot radiating elements of the first antenna module 1100-1. In addition, the processor 1400 may control the transceiver circuit 1250 to beamform a horizontally polarized signal by controlling a phase of a signal applied to respective slot radiating elements of the second antenna module 1100-2.

As described above, the processor 1400 may perform MIMO with another electronic device using the first antenna module 1100-1 and the second array antenna 1100-2. In relation to this, the processor 1400 may control the transceiver circuit 1250 to perform MIMO with another electronic device by simultaneously generating a vertically polarized signal through the first antenna module 1100-1 and generating a horizontally polarized signal through the second antenna module 1100-2.

In addition, the processor 1400 may perform beamforming and MIMO using the first antenna module 1100-1 and the second antenna module 1100-2. In relation to this, the processor 1400 may perform beamforming on a vertically polarized signal through the first antenna module 1100-1 and a horizontally polarized signal through the second antenna module 1100-2 simultaneously. Meanwhile, the processor 1400 may control the transceiver circuit 1250 to receive or transmit a vertically polarized signal provided in a first direction and a horizontally polarized signal provided in a second direction from/to another electronic device.

In addition, the processor 1400 may perform carrier aggregation (CA) operation by transmitting or receiving signals in different bands using the first antenna module 1100-1 and the second antenna module 1100-2. In relation to this, the processor 1400 may control the transceiver circuit 1250 to transmit a horizontally polarized signal in a second band through the second antenna module 1100-2 while transmitting a vertically polarized signal in a first band through the first antenna module 1100-1. In addition, the processor 1400 may control the transceiver circuit 1250 to receive a horizontally polarized signal in a second band through the second antenna module 1100-2 while receiving a vertically polarized signal in a first band through the first antenna module 1100-1. In relation to this, the vertically polarized signal in the first band and the horizontally polarized signal in the second band may be signals in different bands in a mmWave band.

Various modifications and alternations of the aforementioned embodiments regarding a vertically/horizontally polarized antenna and an electronic device controlling the same disclosed herein may be apparent to those skilled in the art within the spirit and scope of the present disclosure. Therefore, it should be understood that such various modifications and alternations for the embodiments fall within the scope of the appended claims.

The electronic device 100 including the antenna module 1100 according to an aspect of the present disclosure has been described above. Hereinafter, the antenna module 1100 included in the electronic device 100 according to another aspect of the present disclosure will be described. In relation to this, a description provided above with respect to the electronic device 100 including the antenna module 1100 may be applied to the antenna module 1100 to be described hereinafter.

In this regard, referring to FIGS. 1 to 15, the antenna module 1100 may be configured to include the first array antenna ANT1 and the second array antenna ANT2. In addition, the antenna module 1100 may be configured to include the transceiver circuit 1250. In relation to this, the antenna module 1100 may be configured to include a partial configuration of the transceiver circuit 1250 to directly control array antennas. In this case, the electronic device 100 may be configured to include a remaining configuration of the transceiver circuit 1250 and the processor 1400. As another example, the antenna module 1100 may be configured to include the transceiver circuit 1250 and a partial configuration of the processor 1400 to directly control array antennas. In this case, the electronic device 100 may be configured to include a remaining configuration of the processor 1400.

The first array antenna ANT1 may be arranged in a first region of a flexible substrate to radiate a signal in a mmWave band, and configured to provide a beam in a first direction. The second array antenna ANT2 may be arranged in a second region adjacent to the first region, and configured to provide a beam in a second direction. The first region of the flexible substrate may be provided to be bent with respect to the second region at a predetermined angle. The transceiver circuit 1250 may be coupled to be operable with the first array antenna ANT1 and the second array antenna ANT2 through a first feeding portion and a second feeding portion, respectively.

Antenna elements of the first array antenna ANT1 and the second array antenna ANT2 may be end-fire radiating elements configured to provide an antenna beam in a direction parallel to the flexible substrate. The first array antenna ANT1 and the second array antenna ANT2 may operate in horizontal polarization. The transceiver circuit 1250 may be configured to transmit a signal through one of the first array antenna ANT1 and the second array antenna ANT2 and receive a signal through another of the first array antenna ANT1 and the second array antenna ANT2.

As another example, antenna elements of the first array antenna ANT1 and the second array antenna ANT2 may be slot radiating elements configured to provide a beam in a direction vertical to the flexible substrate. The first array antenna ANT1 and the second array antenna ANT2 may operate in vertical polarization. The transceiver circuit 1250 may be configured to transmit a signal through one of the first array antenna ANT1 and the second array antenna ANT2 and receive a signal through another of the first array antenna ANT1 and the second array antenna ANT2.

As another example, antenna elements of the first array antenna ANT1 and the second array antenna ANT2 may be an end-fire radiating element and a slot radiating element, respectively. That is the first array antenna ANT1 and the second array antenna ANT2 may operate in horizontal polarization and vertical polarization, respectively. The antenna module 1250 may be configured to perform MIMO through the first array antenna ANT1 and the second array antenna ANT2.

The antenna module 1100 may further include the third array antenna ANT3 adjacent to the first array antenna ANT1 and the fourth array antenna ANT4 adjacent to the second array antenna ANT2. The third array antenna ANT3 and the fourth array antenna ANT4 may be an end-fire radiating element and a slot radiating element, respectively, and operate in horizontal polarization and vertical polarization, respectively. The transceiver circuit 1250 may be configured to perform MIMO with a first device through the first array antenna ANT1 and the second array antenna ANT2. In addition, the transceiver circuit 1250 may be configured to perform MIMO with a second device through the third array antenna ANT3 and the fourth array antenna ANT4. A configuration and operation of the antenna module 1100 including array antennas and a transceiver circuit are not limited thereto, and may be configured to include the configuration and operation of the electronic device described above.

An antenna implemented on a flexible substrate disclosed herein may be implemented as a transparent antenna. In relation to this, when a part of an antenna portion in the antenna module, implemented on a flexible substrate, is exposed to outside or the antenna portion is arranged in a display region, the antenna may be implemented as a transparent antenna. As the antenna is implemented as a transparent antenna, even when the antenna portion is arranged in a display region or adjacent to the display region, the antenna may not be exposed within a viewing angle of a user.

Figure 17:
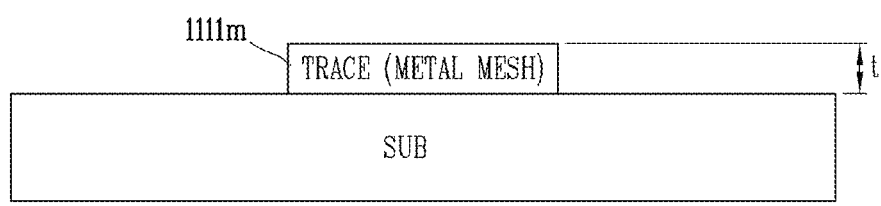
FIG. 17 illustrates a configuration in which a metal mesh structure is provided on a flexible substrate.
Figure 17:
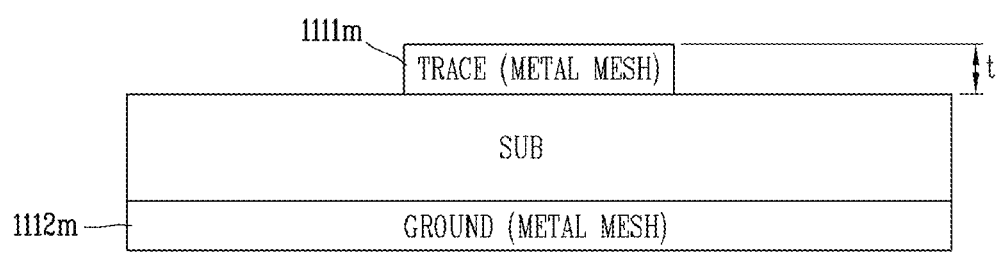

In relation to this, FIG. 16 illustrates a flexible-substrate transparent electrode antenna disclosed herein. Referring to (a) of FIG. 16, a metal mesh region 1110*m* may be provided in a form of a transparent electrode on a substrate SUB. In addition, a full metal region 1120*m* in which metal is arranged may be provided on the substrate SUB. Referring to (b) of FIG. 16, a metal mesh lattice 1111*m* constituting a metal mesh region may be implemented using pitches P provided at certain intervals and line widths W. As an example, a configuration may be provided such that the line width W of the metal mesh grating<5 um, the pitch P>100 um, and a thickness<2 um. In relation to this, FIG. 17 illustrates a configuration in which a metal mesh structure is provided on a flexible substrate. Referring to (a) of FIG. 17, the metal mesh grating 1111*m* may be arranged on a front surface of the substrate SUB in a metal trace form having a certain thickness t. Referring to (b) of FIG. 17, the metal mesh grating 1111*m* may be arranged on a front surface of the substrate SUB in a metal trace form, and a metal mesh grating 1112*m* may be arranged on a rear surface of the substrate SUB in a ground form. Configuration may be such that a material of a flexible film substrate may be polyethylene terephthalate (PET), transparent polyimide (PI), or cyclo olefin polymers (COP) having a substrate thickness>100 um, but is not limited thereto.

An antenna module disclosed herein may be configured such that a transparent flexible substrate is coupled to a substrate as shown in FIGS. 11A to 12C. In relation to this, FIG. 18 illustrates a configuration of an antenna module with a substrate coupled to a flexible substrate according to one embodiment.

Figure 18:
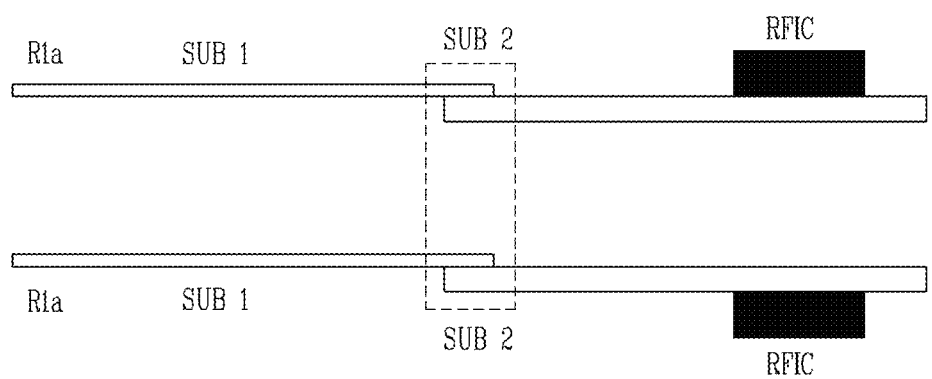
FIG. 18 illustrates a structure of an antenna module in which a substrate is coupled to a flexible substrate according to one embodiment.
Figure 18:
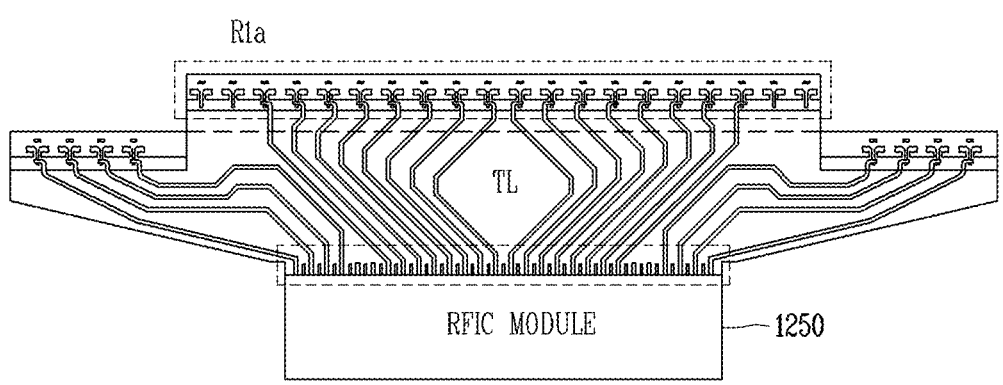

Referring to (a) of FIG. 18, a first substrate SUB1 configured using a flexible substrate may be provided with an antenna and a transmission line TL. In relation to this, the first region R1*a* corresponding to an antenna portion of the first substrate SUB1 may be a transparent flexible substrate region including a transparent antenna. The RFIC 1250 may be arranged on the second substrate SUB2 configured using a rigid substrate. As illustrated in (a) of FIG. 18, the RFIC 1250 may be arranged on a front surface or a rear surface of the second substrate SUB2. The first substrate SUB1, i.e., a flexible substrate may be electrically connected to the second substrate SUB2. i.e., a rigid substrate using highly conductive bonding or soldering.

In other words, the antenna module disclosed herein may include a transparent antenna configured using a transparent electrode on a single surface/both surfaces of a low-loss transparent flexible substrate, and a transmission line configured using a transparent or non-transparent electrode. A module including an RFIC and a baseband circuit connected to each other through soldering may be arranged on one surface of a single surface of/both surfaces of/a multi-layered rigid substrate SUB2. In addition, a transmission may be provided to be routed to have a same phase or a constant phase difference from an RFIC RF terminal to the rigid substrate SUB2. A transmission line on the rigid substrate SUB2 may be connected to an end of a feeding line on the flexible substrate using highly conductive bonding or soldering.

Figure 19A:
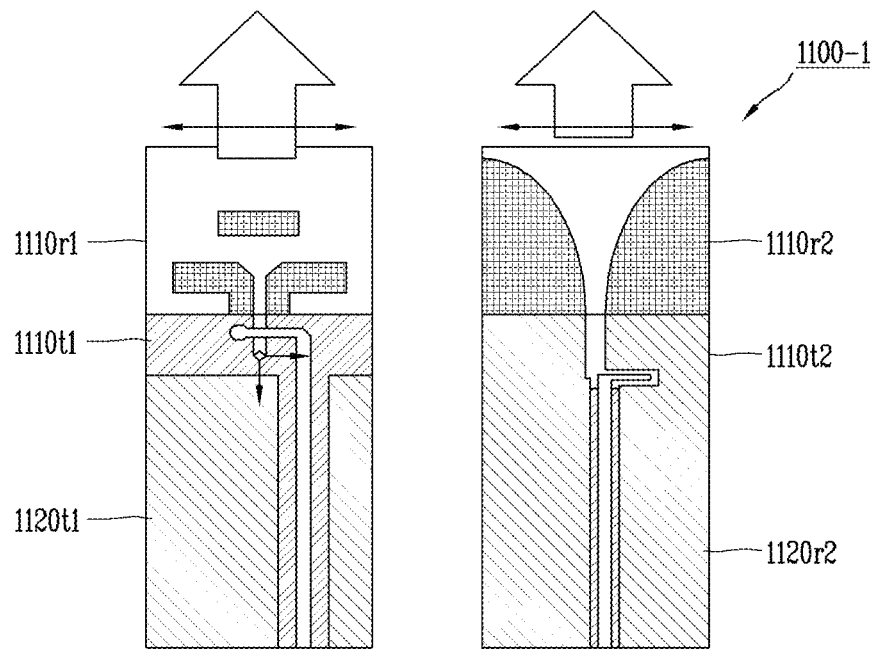
FIGS. 19A and 19B illustrate configurations of antenna modules implemented using different types of antennas.
Figure 19B:
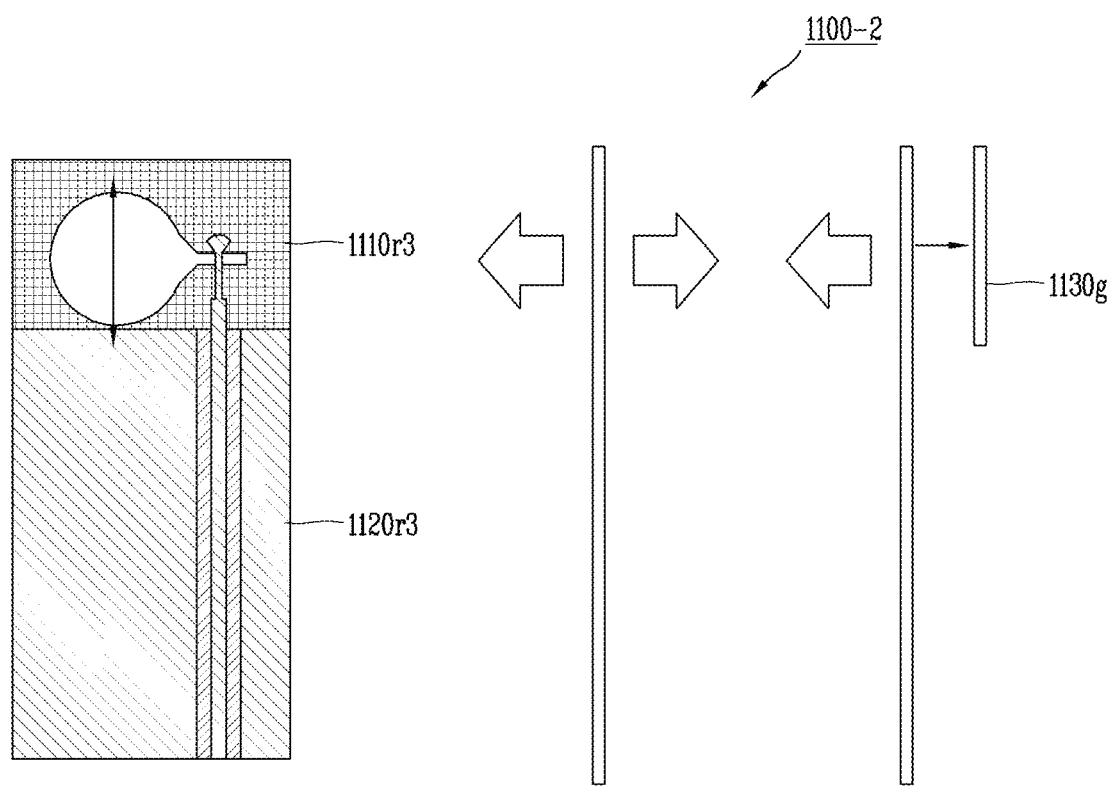

A single antenna element of an antenna module disclosed herein may be implemented using various types of antennas. In relation to this, FIGS. 19A and 19B illustrate configurations of antenna modules implemented using different types of antennas. FIG. 19A illustrates a structure of a first type antenna 1100-1 such as a transparent Yagi antenna or a transparent Vivaldi antenna. On the other hand, FIG. 19B illustrates a structure of a second type antenna 1100-2 such as a transparent slot antenna.

Referring to FIG. 19A, the antenna module 1100-1 such as a transparent Yagi antenna or a transparent Vivaldi antenna may include radiating elements 1110*r*1 and 1110*r*2, converter 1110*t*1 and 1110*t*2, and transmission lines 1120*t*1 and 1120*t*2. The antenna module 1100-1 such as a transparent Yagi antenna or a transparent Vivaldi antenna may operate in horizontal polarization and radiate a signal in a first direction (parallel to a substrate). In other words, a horizontally polarized transparent Yagi (a dipole or Vivaldi (tapered slot antenna)) configured using a transparent electrode and having end-fire radiation characteristics may be provided on a single surface/both surfaces of the low-loss flexible substrate. In this case, a transmission line for feeding a transparent Yagi/Vivaldi antenna and a transmission line converter for impedance matching may be included.

Referring to FIG. 19B, the antenna module 1100-2 such as a transparent slot antenna may include a radiating element 1110*r*3, a converter 1110*t*3, and a transmission line 1120*t*3. The antenna module 1100-2 such as a transparent Yagi antenna or a transparent Vivaldi antenna may operate in vertical polarization and radiate a signal in a second direction (vertical to a substrate). In other words, a vertically polarized transparent slot antenna configured using a transparent electrode and having broad-side radiation characteristics may be provided on a single surface/both surfaces of the low-loss flexible substrate. In this case, a transmission line for feeding a transparent slot antenna and a transmission line converter for impedance matching may be included. In addition, a transparent slot antenna including a reflector 1130*g* configured to change bi-directional directivity to unidirectional directivity may be implemented.

Figure 20A:
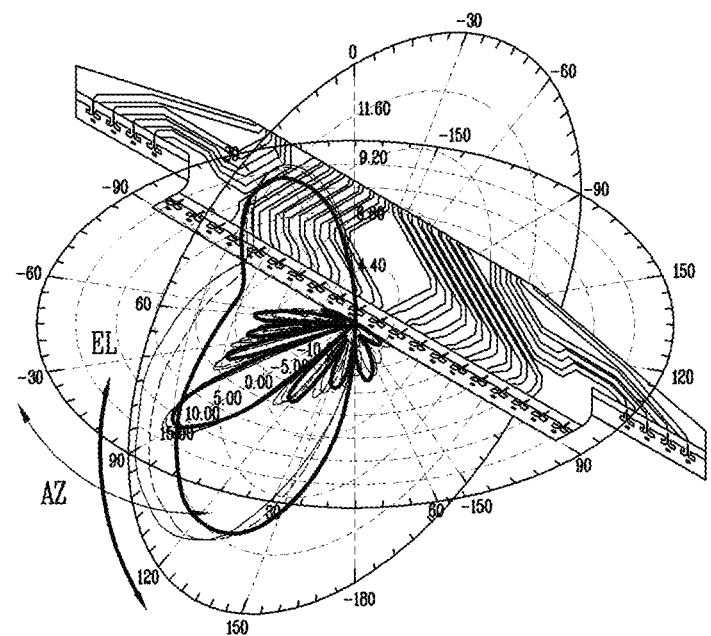
FIG. 20A illustrates a beam pattern in a horizontal/vertical direction according to first and second antenna modules among horizontally polarized antennas of FIG. 11A.
Figure 20A:
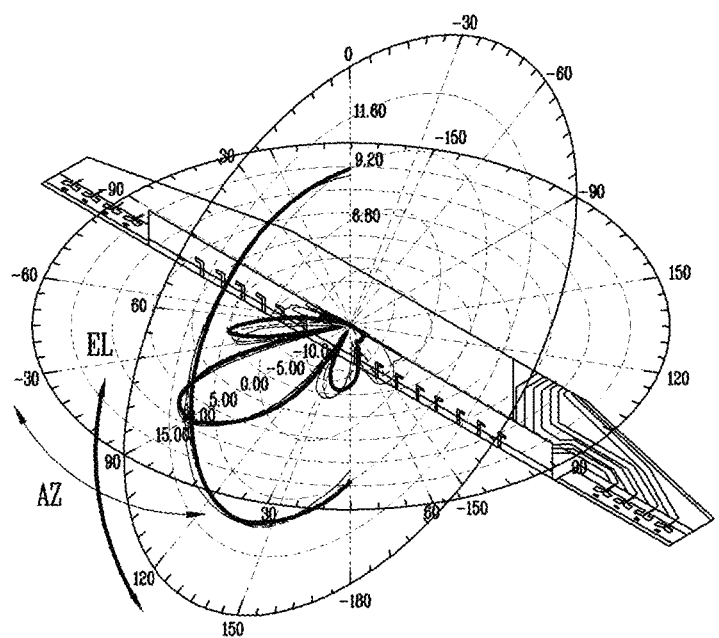

The antenna module disclosed herein may provide a beam in a front direction or lower direction of the electronic device as described above. In relation to this, FIG. 20A illustrates a beam pattern in a horizontal/vertical direction according to first and second antenna modules among the horizontally polarized antennas of FIG. 11A. FIG. 20A illustrates a beam pattern in a horizontal/vertical direction according to first and second antenna modules among horizontally polarized antennas of FIG. 11B.

Referring to FIGS. 11A and 12A and (a) of FIG. 20A, the first array antenna ANT1 among the horizontally polarized antennas may be a 1×8 antenna, and provide the first beam B1 to have directivity in a vertical (elevation) direction EL. The first beam B1 radiated by the first array antenna ANT1 may provide a single antenna radiation pattern not to have directivity in a horizontal (azimuth) direction AZ. In this case, as illustrated in FIG. 12A, as an electronic device is arranged above the first array antenna ANT1, a beam in the horizontal direction AZ may be provided slightly in an asymmetrical form. However, a main beam is provided in a front direction of the electronic device, and signal radiation toward an upper region of the electronic device is not important.

Referring to FIGS. 11A and 12A and (b) of FIG. 20A, the second array antenna ANT2 among the horizontally polarized antennas may be a 1×4 antenna, and provide a second beam B2 to have directivity in a vertical (elevation) direction EL. The second beam B2 radiated by the second array antenna ANT2 may provide a single antenna radiation pattern not to have directivity in the horizontal (azimuth) direction AZ. In this case, as a beam is provided in a lower direction, signal radiation is not constrained due to a frame of the electronic device, a beam in the vertical direction EL and a beam in the horizontal direction AZ are both provided in a symmetrical form.

Figure 20B:
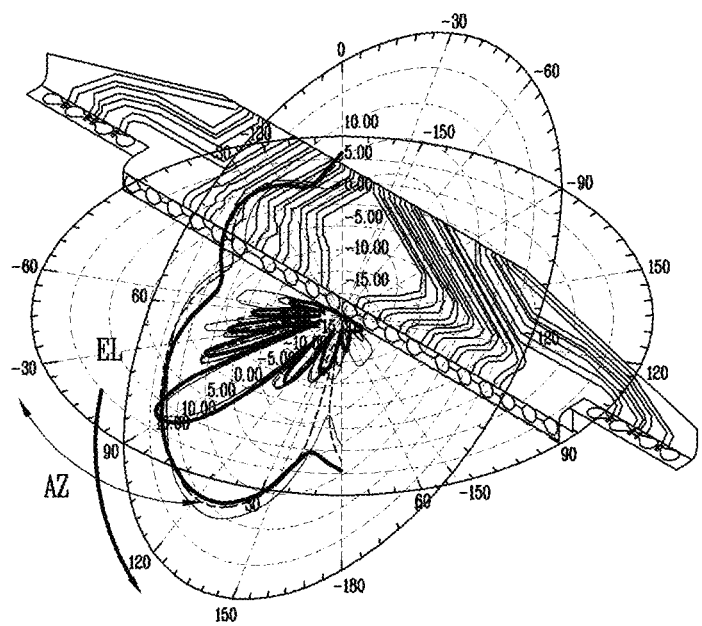
FIG. 20B illustrates a beam pattern in a horizontal/vertical direction according to first and second antenna modules among horizontally polarized antennas of FIG. 11B.
Figure 20B:
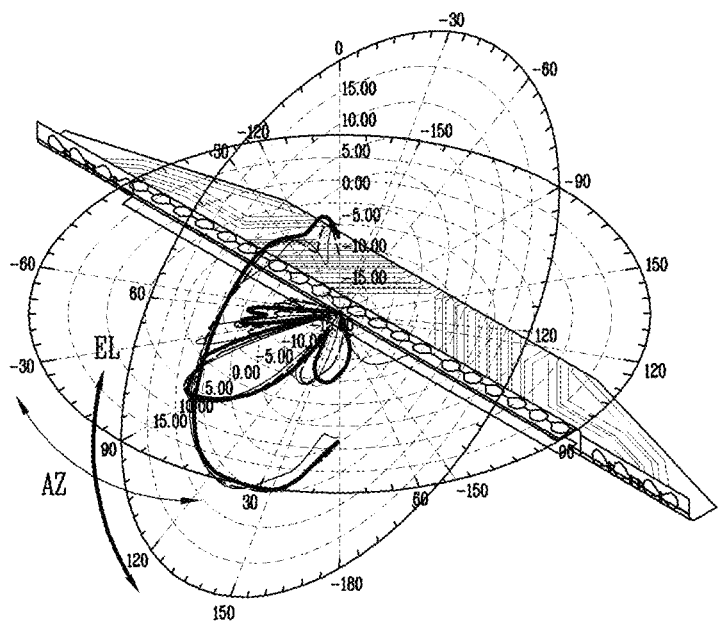

Referring to FIGS. 11B and 12B and (a) of FIG. 20b, the first array antenna ANT1 among vertically polarized antennas may be a 1×8 antenna, and provide a first beam B1 to have directivity in a vertical (elevation) direction EL. The first beam B1 radiated by the first array antenna ANT1 may provide a single antenna radiation pattern not to have directivity in a horizontal (azimuth) direction AZ. In this case, as illustrated in FIG. 12B, as an electronic device is arranged above the first array antenna ANT1, a beam in the horizontal direction AZ may be provided slightly in an asymmetrical form. However, a main beam is provided in a front direction of the electronic device, and signal radiation toward an upper region of the electronic device is not important.

Referring to FIGS. 11B and 12B and (b) of FIG. 20B, the second array antenna ANT2 among vertically polarized antennas may be a 1×4 antenna, and provide a second beam B2 to have directivity in the vertical (elevation) direction EL. The second beam B2 radiated by the second array antenna ANT2 may provide a single antenna radiation pattern not to have directivity in the horizontal (azimuth) direction AZ. In this case, as a beam is provided in a lower direction, signal radiation is not constrained due to a frame of the electronic device, a beam in the vertical direction EL and a beam in the horizontal direction AZ are both provided in a symmetrical form.

Figure 21A:
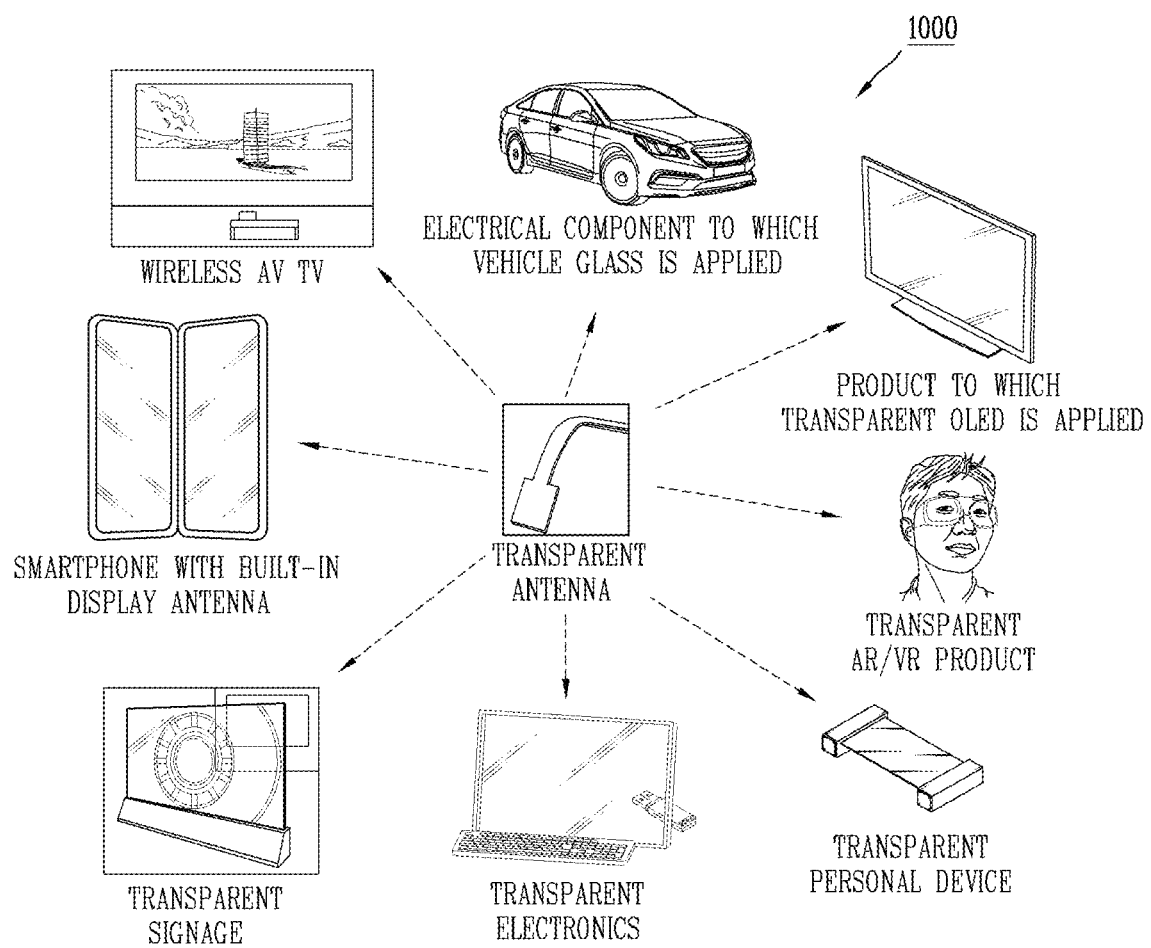
FIG. 21A illustrates an example in which a mmWave antenna module disclosed in the present disclosure is applied to various electronic devices.

A mmWave antenna module described herein may be applied to various electronic devices. In relation to this, FIG. 21A illustrates an example in which a mmWave antenna module described herein is applied to various electronic devices. Referring to FIGS. 1 to 21A, an electronic device 1000 may be at least one from among a mobile terminal, a signage, a display device, a transparent augmented reality (AR)/virtual reality (VR) device, and a vehicle or wireless audio/video apparatus. The first antenna module 1100-1 or the second antenna module 1100-2 constituting the antenna module may be arranged in a lower region or a side surface region of the electronic device 100. As an example, the antenna 1100 operating in vertical/horizontal polarization may be arranged in a lower portion of the electronic device 1100 to have various forms.

Figure 21B:
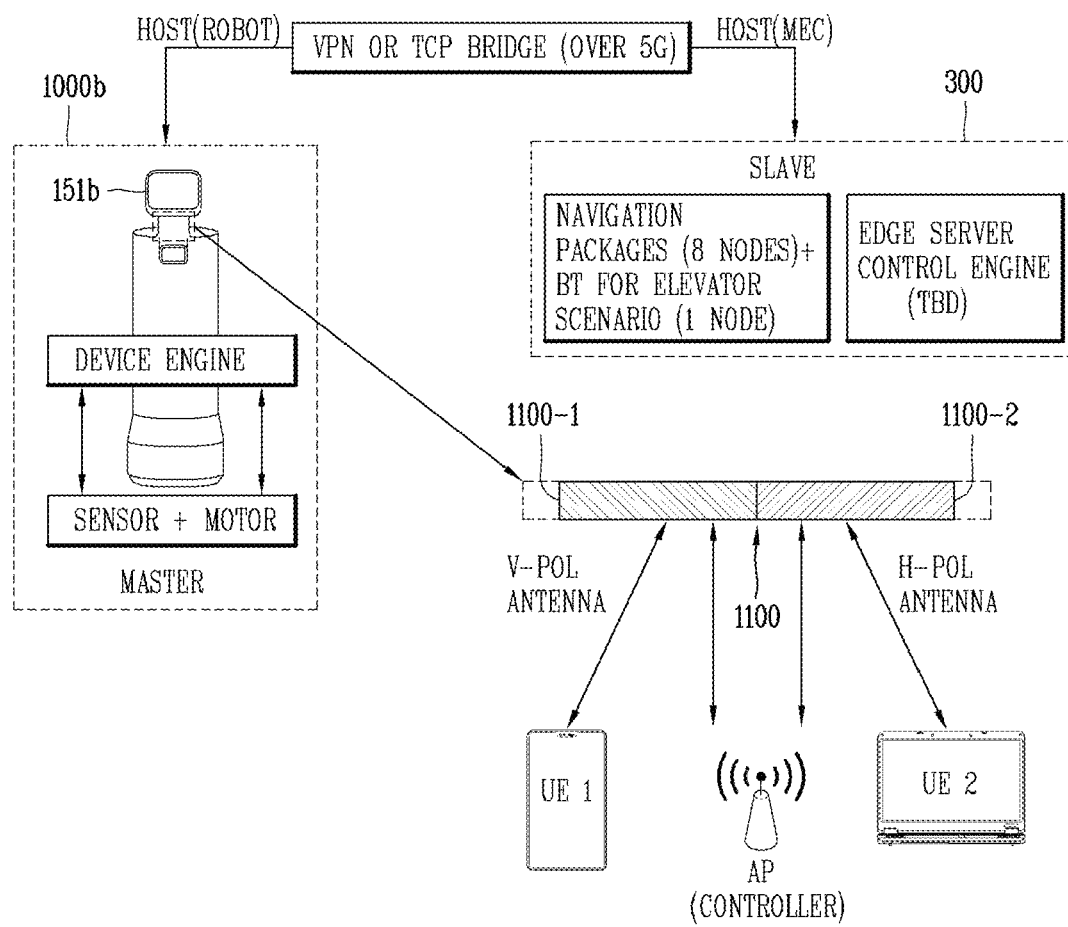
FIG. 21B illustrates an example in which an antenna operating in horizontal/vertical polarization proposed in the present disclosure is applied to a robot.

FIG. 21B illustrates an example in which the antenna 1100 operating in horizontal/vertical polarization disclosed herein is applied to a robot. Referring to FIGS. 1 to 21B, the antenna module 1100 may be arranged below a display 151b of a robot 1000b. The antenna module 1100 may be implemented as one of various combinations of the first antenna module 1100-1 and/or second antenna module 1100-2 to operate as a multi-mode antenna. The antenna module 1100 may operate in a 5G mmWave band. The robot 1000b may transmit or receive large-capacity wireless data at a high speed, e.g., wireless AV data to/from a peripheral electronic device using the antenna module 1100.

The robot 1000b may interoperate with a server 300 via a communication network under control by a controller such as a device engine. In this case, the communication network may be a 5G communication network. The communication network may be implemented as a virtual private network (VPN) or a transmission control protocol (TCP) bridge. The robot 1000b may be connected to the server, i.e., a MEC server 300 via the communication network. Since the robot 1000b interoperates with the MEC server 300, such a robot/network system may be referred to as a cloud robotics system. The cloud robotics system is a system configured to process functions needed for the robot 1000b to perform a given task in a cloud server such as the MEC server 300.

A multi-mode/multi-band antenna according to the present disclosure and an electronic device configured to control the same have been described above. Hereinafter, a wireless communication system including a multi-mode/multi-band antenna, an electronic device configured to control the same, and a base station will be described. In this regard, FIG. 22 illustrates a block diagram of a wireless communication system that is applicable to methods proposed herein.

Figure 22:
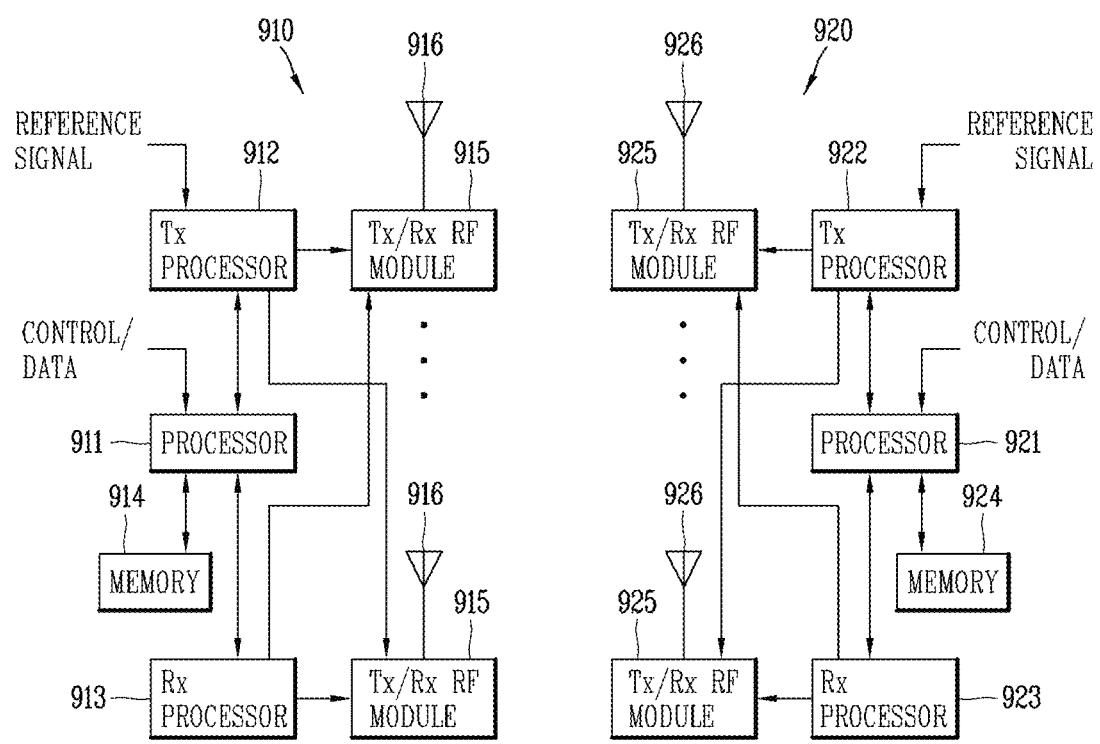
FIG. 22 is an exemplary block diagram of a wireless communication system to which methods proposed in the present disclosure are applicable.

Referring to FIG. 22, the wireless communication system includes a first communication device 910 and/or a second communication device 920. The term 'A and/or B' may be interpreted as having the same meaning as 'at least one of A and B'. The first communication device may denote a base station and the second communication device may denote a terminal (or the first communication device may denote the terminal or the vehicle and the second communication device may denote the base station).

The base station (BS) may be replaced with a term such as a fixed station, a Node B, an evolved-NodeB (eNB), a next generation NodeB (gNB), a base transceiver system (BTS), an access point (AP), a general NB (gNB), a 5G system, a network, an AI system, a road side unit (RSU), robot or the like. In addition, the terminal may be fixed or have mobility, and may be replaced with a term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, a vehicle, a robot, an AI module, or the like.

The first communication device and the second communication device each may include a processor 911, 921, a memory 914, 924, one or more Tx/Rx radio frequency modules 915, 925, a Tx processor 912, 922, an Rx processor 913, 923, and an antenna 916, 926. The processor may implement the aforementioned functions, processes, and/or methods. More specifically, in DL (communication from the first communication device to the second communication device), an upper (high-level) layer packet from a core network may be provided to the processor 911. The processor implements the function of an L2 layer. In DL, the processor may provide multiplexing between a logical channel and a transport channel and radio resource allocation to the second communication device 920, and may be in charge of signaling to the second communication device. The Tx processor 912 may implement various signal processing functions for an L1 layer (i.e., a physical layer). The signal processing function may facilitate forward error correction (FEC) in the second communication device, and include coding and interleaving. The encoded and modulated symbols are divided into parallel streams, and each stream is mapped to an OFDM subcarrier, and multiplexed with a reference signal (RS) in a time and/or frequency domain, and combined together using an Inverse Fast Fourier Transform (IFFT) to create a physical channel carrying a time-domain OFDMA symbol stream. The OFDM stream may be spatially precoded to generate multiple spatial streams. Each spatial stream may be provided to different antennas 916 through individual Tx/Rx modules (or transceivers 915). The Tx/Rx modules may modulate RF carrier waves into the spatial streams for transmission. The second communication device may receive a signal through the antenna 926 of each Tx/Rx module (or transceiver) 925. Each Tx/Rx module may demodulate information modulated to an RF carrier, and provide it to the RX processor 923. The RX processor may implement various signal processing functions of Layer 1. The RX processor may perform spatial processing with respect to the information in order to recover an arbitrary spatial stream destined for the second communication device. When a plurality of spatial streams are destined for the second communication device, the spatial streams may be combined into a single OFDMA symbol stream by a plurality of RX processors. The RX processor may transform the OFDMA symbol stream from a time domain to a frequency domain by using Fast Fourier Transform (FFT). A frequency domain signal may include an individual OFDMA symbol stream on a subcarrier for each OFDM signal. Symbols on each subcarrier and a reference signal may be recovered and demodulated by determining the most probable signal placement points transmitted by the first communication device. These soft decisions may be based on channel estimate values. The soft decisions may be decoded and deinterleaved to recover data and control signal originally transmitted over the physical channel by the first communication device. The corresponding data and control signal may then be provided to the processor 921.

UL (communication from the second communication device to the first communication device) may be processed in the first communication device 910 in a similar manner to that described with respect to the receiver function in the second communication device 920. The Tx/Rx modules 925 may receive signals via the antennas 926, respectively. The Tx/Rx modules may provide RF carriers and information to the RX processor 923, respectively. The processor 921 may be associated with the memory 924 that stores program codes and data. The memory may be referred to as a computer-readable medium.

An array antenna and an electronic device including the same have been described.

Hereinafter, a technical effect of the array antenna and the electronic device including the same will be described.

According to one embodiment, a configuration of a slot array antenna configured to provide wireless AV service to an electronic device, and an electronic device including the slot array antenna are provided.

According to one embodiment, an antenna module operating in a mmWave band may be implemented on a low-loss flexible substrate.

According to one embodiment, an antenna module operating in a mmWave band may be arranged on a non-conductive material surface of an electronic device.

According to one embodiment, antennas may be arranged on different bent surfaces of a substrate to implement antenna directivity toward front, rear, and side surfaces, According to one embodiment, an antenna module may be expanded to an antenna module having vertical/horizontal single polarization or vertical and horizontal dual polarization according to arrangement of antennas.

According to one embodiment, array antennas having different polarization may be arranged to transmit or receive large-capacity data at a high speed, and thus, dual connection and/or MIMO may be provided.

Further scope of applicability of the present disclosure will become apparent from the following detailed description. It should be understood, however, that the detailed description and specific examples, such as the preferred embodiment of the present disclosure, are given by way of illustration only, since various modifications and alternations within the spirit and scope of the disclosure will be apparent to those skilled in the art.

In relation to the aforementioned disclosure, design and operations of an antenna module including an array antenna and an electronic device controlling the same can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller of the terminal. The foregoing embodiments are merely exemplary and are not to be considered as limiting the present disclosure. Therefore, all changes and modifications that fall within the metes and bounds of the claims, or equivalents of such metes and bounds are therefore intended to be embraced by the appended claims.

The invention claimed is:
1. An electronic device having antennas, the electronic device comprising:
a display provided on a front surface of the electronic device and configured to display information on a screen;
a flexible printed circuit board (FPCB) arranged on a side surface or at the display of the electronic device; and
an antenna module configured to radiate a specific-directional polarized signal in a front or side direction of the electronic device,
wherein the FPCB comprise:
a first region on which lines connected with a transceiver circuit is formed and arranged at a rear surface of the display,
a second region connected to bent from the first region and arranged toward a side surface of the display, and
a third region connected to bent from the second region and arranged toward a front surface of the display,
wherein a first array antenna is arranged in the second region; and configured to radiate a horizontally polarized signal toward the front surface of the display;

a second array antenna is arranged in the third region, and configured to radiate a vertically polarized signal toward the front surface of the display;

a third array antenna is arranged in the first region, and configured to radiate a horizontally polarized signal toward a lower direction; and a fourth array antenna is arranged in the second region, and configured to radiate a vertically polarized signal toward the lower direction.

2. The electronic device of claim 1, wherein antenna elements of the first array antenna and the third array antenna are end-fire radiating elements configured to provide an antenna beam in a direction parallel to the flexible substrate, and the first array antenna and the third array antennas operate in horizontal polarization.

3. The electronic device of claim 1, wherein a first feeding portion is connected to the first array antenna arranged in the second region, and the first array antenna provides a beam in a front direction, and a third feeding portion is connected to the third array antenna arranged in the first region, and the third array antenna provides a beam in a lower direction.

4. The electronic device of claim 1, wherein antenna elements of the second array antenna and the fourth array antenna are slot radiating elements configured to provide a beam in a direction vertical to the flexible substrate, and the second array antenna and the fourth array antenna operate in vertical polarization.

5. The electronic device of claim 1, wherein a second feeding portion is connected to the second array antenna arranged in the third region, and the second array antenna provides a beam in a front direction, and a fourth feeding portion is connected to the fourth array antenna arranged in the second region, and the fourth array antenna provides a beam in a lower direction.

6. The electronic device of claim 5, wherein the first feeding portion arranged in the first region is arranged in a bended region bended twice substantially at 90 degrees, and the second feeding portion arranged in the second region is arranged in a bended region bended substantially at 90 degrees.

7. The electronic device of claim 1, wherein an antenna element of the first array antenna and an antenna element of the second array antenna are an end-fire radiating element and a slot radiating element, respectively, and the first array antenna and the second array antenna operate in horizontal polarization and vertical polarization, respectively.

8. The electronic device of claim 7, wherein the third array antenna and the fourth array antenna are an end-fire radiating element and a slot radiating element, respectively, and the third array antenna and the fourth array antenna operate in horizontal polarization and vertical polarization, respectively.

9. The electronic device of claim 1, further comprising:

a transceiver circuit operably coupled to the first array antenna and the second array antenna through a first feeding portion and a second feeding portion, respectively; and a processor operably coupled to the transceiver circuit and configured to control the transceiver circuit, wherein, when the first array antenna and the second array antenna generate different polarized signals, the processor controls the transceiver circuit to perform multiple-input-multiple-output (MIMO) through the first array antenna and the second array antenna.

10. The electronic device of claim 9, wherein the transceiver circuit is operably coupled to the first array antenna to the fourth array antenna, and wherein the processor controls the transceiver circuit to transmit or receive a signal through the second array antenna or the fourth array antenna while transmitting or receiving a signal through the first array antenna or the third array antenna.

11. The electronic device of claim 10, wherein the first array antenna and the second array antenna are both arranged on a front surface of the flexible substrate and provide a first beam having horizontal polarization and a second beam having vertical polarization, respectively, and wherein the processor configured to control the transceiver circuit to transmit a signal through one of the first array antenna and the second array antenna and receive a signal through another of the first array antenna and the second array antenna.

12. The electronic device of claim 10, further comprising the third array antenna and the fourth array antenna arranged on a side surface of the flexible substrate, and provide a third beam having horizontal polarization and a fourth beam having vertical polarization, respectively, wherein the processor controls the transceiver circuit to perform MIMO through one of the first array antenna and the third array antenna and one of the second array antenna and the fourth array antenna.

13. The electronic device of claim 1, wherein the electronic device is a mobile terminal, a signage, a display device, a transparent augmented reality (AR)/virtual reality (VR) device, a vehicle, or a wireless audio/video apparatus, and a plurality of different array antennas constituting the antenna module are arranged in a lower region or a side surface region of the electronic device.

14. An antenna module comprised in an electronic device, the antenna module comprising:

a flexible printed circuit board (FPCB) arranged on a rear surface and a side surface of a display and configured to radiate a signal in a millimeter wave band; and at least one array antenna configured to radiate a specific-directional polarized signal in a front or side direction of the display, wherein the FPCB comprise:

a first region on which lines connected with a transceiver circuit is formed and arranged at a rear surface of the display, a second region connected to bent from the first region and arranged toward a side surface of the display, and a third region connected to bent from the second region and arranged toward a front surface of the display, wherein a first array antenna is arranged in the second region, and configured to radiate a horizontally polarized signal toward the front surface of the display;

a second array antenna is arranged in the third region, and configured to radiate a vertically polarized signal toward the front surface of the display;

a third array antenna is arranged in the first region, and configured to radiate a horizontally polarized signal toward a lower direction; and a fourth array antenna is arranged in the second region, and configured to radiate a vertically polarized signal toward the lower direction, and wherein a transceiver circuit is operably coupled to the first array antenna and the second array antenna through a first feeding portion and a second feeding portion, respectively.

15. The electronic device of claim 14, wherein antenna elements of the first array antenna and the third array antenna are end-fire radiating elements configured to provide an antenna beam in a direction parallel to the flexible substrate, and
   the first array antenna and the third array antennas operate in horizontal polarization, and the transceiver circuit transmits a signal through one of the first array antenna and the third array antenna and receives a signal through another of the first array antenna and the second array antenna.

16. The electronic device of claim 14, wherein antenna elements of the first array antenna and the second array antenna are slot array antennas configured to provide a beam in a direction vertical to the flexible substrate,
   the second array antenna and the fourth array antenna operate in vertical polarization, and
   the transceiver circuit transmits a signal through one of the second array antenna and the fourth array antenna and receives a signal through another of the second array antenna and the fourth array antenna.

17. The electronic device of claim 14, wherein an antenna element of the first array antenna and an antenna element of the second array antenna are an end-fire radiating element and a slot radiating element, respectively,
   the first array antenna and the second array antenna operate in horizontal polarization and vertical polarization, respectively, and
   the transceiver circuit performs multiple-input-multiple-output (MIMO) through the first array antenna and the second array antenna.

18. The electronic device of claim 14, wherein
   the third array antenna and the fourth array antenna are an end-fire radiating element and a slot radiating element, respectively, and operate in horizontal polarization and vertical polarization, respectively, and
   the transceiver circuit performs MIMO with a first device through the first array antenna and the second array antenna, and performs MIMO with a second device through the third array antenna and the fourth array antenna.

* * * * *